United States Patent
Tselniker et al.

(10) Patent No.: US 9,083,471 B2
(45) Date of Patent: Jul. 14, 2015

(54) COHERENT AND SELF-COHERENT SIGNAL PROCESSING TECHNIQUES

(75) Inventors: Igor Tselniker, Haifa (IL); Netta Sigron, Haifa (IL); Moshe Nazarathy, Haifa (IL)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 0 days.

(21) Appl. No.: 14/005,302

(22) PCT Filed: Mar. 1, 2012

(86) PCT No.: PCT/IB2012/050977
§ 371 (c)(1),
(2), (4) Date: Apr. 10, 2014

(87) PCT Pub. No.: WO2012/117374
PCT Pub. Date: Sep. 7, 2012

(65) Prior Publication Data
US 2014/0219666 A1    Aug. 7, 2014

Related U.S. Application Data

(60) Provisional application No. 61/448,803, filed on Mar. 3, 2011.

(51) Int. Cl.
*H04B 10/61* (2013.01)
*H04L 25/03* (2006.01)
*H04L 27/00* (2006.01)
*H04L 27/233* (2006.01)
*H04L 27/38* (2006.01)

(52) U.S. Cl.
CPC ...... *H04B 10/6165* (2013.01); *H04L 25/03019* (2013.01); *H04L 27/0014* (2013.01); *H04L 27/2331* (2013.01); *H04L 27/38* (2013.01); *H04L 2027/0024* (2013.01)

(58) Field of Classification Search
USPC .......................................... 375/340, 346, 316
See application file for complete search history.

(56) References Cited

U.S. PATENT DOCUMENTS 7,606,498 B1 * 10/2009 Wu et al. .................. 398/152
2001/0017897 A1 * 8/2001 Ahn .......................... 375/261

\* cited by examiner

*Primary Examiner* — Vineeta Panwalkar
(74) *Attorney, Agent, or Firm* — Reches Patents

(57) ABSTRACT

A receiver and a multi-symbol-differential-detection (MSDD) module, the MSDD may include an input node for receiving an input signal having a noisy phase; a summation and rotation unit; and an output unit; wherein the output unit is arranged to output an output signal and a normalized output signal; wherein the output signal represents the input signal but has a reconstructed phase; wherein the summation and rotation unit is arranged to receive the input signal and the output signal and to provide a reference signal that reflects a weighted sum of phase rotated and delayed previously received input signals; wherein the output unit comprises a phase difference calculator, a slicer, a delay unit and a normalizer; wherein the phase difference calculator is arranged to generate a difference signal indicative of a phase difference between the reference signal and the input signal; wherein the slicer and the delay unit are arranged to generate the output signal by slicing the difference signal to provide a sliced signal and by delaying the sliced signal; and wherein the normalizer is arranged to normalize the output signal to provide the normalized output signal.

20 Claims, 41 Drawing Sheets

Recursive single-tap U-notU MSDD

US 9,083,471 B2

COHERENT AND SELF-COHERENT SIGNAL PROCESSING TECHNIQUES

RELATED APPLICATIONS

This application claims the benefit of U.S. provisional patent 61/448,803, filing date Mar. 3, 2011 which is incorporated herein by reference.

BACKGROUND OF THE INVENTION

There is a growing need to provide efficient receivers and transmitter, especially those fitted to optical communication networks.

SUMMARY

There are provided receivers, transmitters and components as claimed in this application.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which

Figure 1:
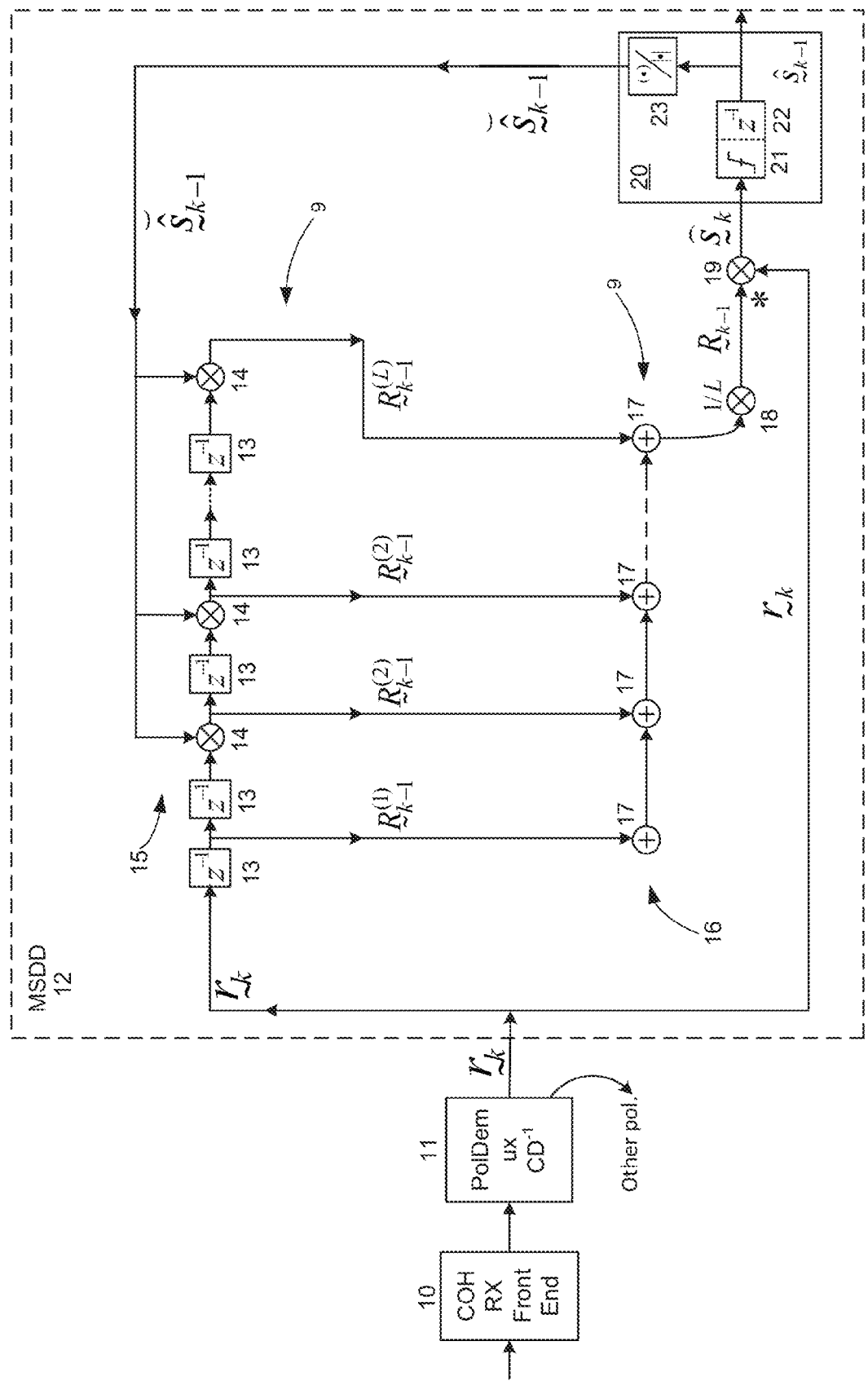
FIGS. 1-41 illustrate signals, receivers, transmitters, various components and graphs according to various embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The term intermediate signal refers to a signal that may differ from an input signal and an output signal. If a certain figure illustrates a receiver or a module, that an intermediate signal can be any signal generated by any components of the receiver or the module respectively. The terms "first", "second" or any other numerical reference may be used to differentiate between different intermediate signals.

Various Embodiments of the Invention

The current invention pertains to algorithms for digital signal processing (DSP) for broadband optical communication receivers (Rx)—mitigating impairments, while providing improved overall performance. We treat receivers with either coherent optical detection or self-coherent optical detection, where self-coherent (SC) refers to attaining coherent-grade performance without having a local-oscillator (LO) laser incorporated in the Rx. We treat SC receivers which use Delay Interferometer (DI) front-ends rather than using a local oscillator (LO) laser, as in a coherent Rx. The disclosed Rx structures allow transmission of higher-order constellations, such as QPSK, m-QAM, or other constellations. We focus on three of the modules in the signal processing chain: (i): IQ-Rebalance (IQR)—a unit intended to compensate for the IQ-imbalance inherent in having the amplitudes and phases of the two quadrature components not-quite perfect in the optical front-end (FE) of the Rx, be it a coherent of SC Rx. IQ rebalance modules are illustrated in various figures such as FIGS. 22 and 27. (ii): Field Reconstructor (FR)—this is a module present only in a self-coherent Rx, intended to reconstruct the complex field (magnitude and phase or equivalently I and Q components of the optical field samples) based on detection of the IQ DI outputs. The FR module in a SC Rx comes in lieu of the hybrid FE with LO laser in a coherent Rx. (iii): Carrier-Recovery (CR). This is a module intended to compensate for the frequency offset and phase drift and noise inherent in optical detection, prior to extracting decisions on the transmitted symbols. Notice that unit (ii), the FR is only present in SC Rx, whereas the two other modules of interest here, namely the IQR and CR, are present in both coherent and self-coherent detection. In fact, in our disclosure we may use almost identical embodiments the respective units of IQR and CR for either coherent or SC detection.

Having listed the three main units (the IQR, FR and CR) for which we present novel embodiments let us mention that the operation of these three units for SC detection is better when two or three of these units work in unison re-enforcing and assist each other and compensating for one-another's faults. It is the combination of the three novel disclosed modules that is the enabler for highest-grade SC detection, which provides a substantial advantage relative to COH detection, in that the LO laser is eliminated from the Rx, replaced just by some low-complexity extra digital processing in the Rx FR module.

The current invention pertains to algorithms for digital signal processing (DSP) for broadband optical communication receivers (Rx)—mitigating impairments, while providing improved overall performance. We treat receivers with either coherent optical detection or self-coherent optical detection, where self-coherent (SC) is a less-known term, referring to attaining coherent-grade performance without having a local-oscillator (LO) laser incorporated in the optical Rx. We address SC receivers which use IQ Delay Interferometer (DI) front-ends, rather than using local oscillator (LO) lasers, as in conventional coherent receivers.

The disclosed Rx structures allow transmission of higher-order constellations, such as QPSK, m-QAM, or other multi-amplitude/multi-phase constellations such as multi-ring constellations in the I-Q plane.

Figure 8:
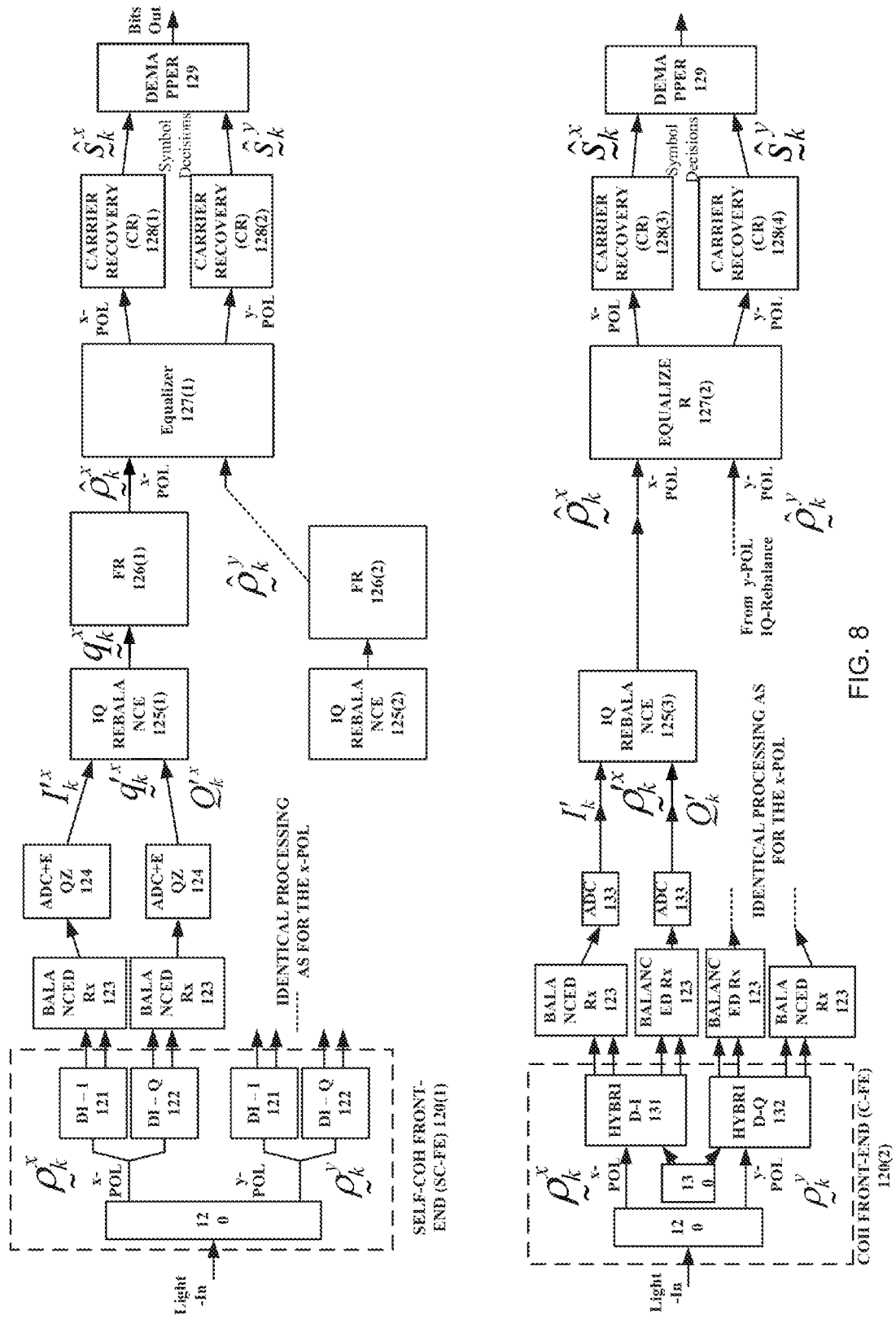

A coherent or self-coherent receiver of the type which may be implemented using the novel modules disclosed here, includes a chain of modules as shown in FIG. 8. In this application we shall focus on three of the modules in the signal processing chain as listed next, in the order in which the flow proceeds through the signal processing chain:

IQ-Rebalance (IQR)—a unit intended to compensate for the IQ-imbalance due to having the amplitudes and phases of the two quadrature components not-quite perfect in the optical front-end (FE) of the Rx, be it a coherent or SC Rx.

Field Reconstructor (FR)—this is a module present only in a self-coherent Rx, intended to reconstruct a digital representation of the received complex field (magnitude and phase, or equivalently, the I and Q components of the optical field samples) based on detection of the IQ DI outputs, rather than coherent detection. The FR module in a SC Rx comes in lieu of the hybrid FE, which is equipped with an LO laser in a coherent Rx. As the FR is accomplished in DSP with low-complexity, using SC detection with FR is a worthwhile tradeoff, saving the cost and complexity and power consumption of the LO laser, and even eliminating certain detrimental effects associated with the LO laser such as the effect of equalization-enhanced-phase noise (EEPN).

Carrier-Recovery (CR). This is a module intended to compensate for the frequency offset and phase drift and noise inherent in optical detection, prior to extracting decisions on the transmitted symbols. The disclosed CR schemes also apply to wireless coherent detection.

Notice that unit (ii), the FR is only present in SC Rx, whereas the two other modules treated in this application here, namely the IQR and CR, are present in both coherent and self-coherent detection. In fact, in our disclosure we may use almost identical embodiments for the respective units of IQR and CR for either coherent or SC detection.

Other main units of the optical Rx, not addressed in this disclosure, but required in the overall receiver processing chain are the Optical Front-End (which differs between the coherent and self-coherent cases), the ADC (or ADC+EQZ in the SC case, with the EQZ performed conventionally), the CD+POL+NL EQZ/COMP+Timing Recovery (TR) module, which equalizes (EQZ) the Chromatic Dispersion (CD) in the fiber and compensates for Polarization mixing (i.e. demultiplexes the two polarizations while also equalizing Polarization Mode Dispersion, and other polarization dependent linear impairments) and possibly also performs compensation of non-linearity (NL), and the DEMAPPER, which is standard, mapping decided-upon symbols into bits. The realization of these additional units, is according to conventional principles and prior art.

Having listed the three main units (the IQR, FR and CR) for which we present novel embodiments (all three applicable to SC detection, just the IQR and CR applicable to COH detection) let us mention that the operation of these three units for SC detection is improved or in certain cases enabled when two or three of these units work in unison re-enforcing and assist each other and compensate for one-another's faults. It is the combination of the three novel disclosed modules that is the joint enabler for highest-grade SC detection, which provides a substantial advantage relative to COH detection, in that the LO laser is eliminated from the Rx, replaced just by some low-complexity extra digital processing in the Rx, namely the FR module and the extra (short) equalizer (EQZ) for the ADC. However, each one of the three main modules treated here (at least in some of their embodiments) may also be used independently, i.e. with more conventional complementary modules.

NLMS adaptive algorithms: The three main units treated here use adaptive LMS algorithms in some of their embodiments. It should be possible to use a Normalized LMS (NLMS) adaptive algorithm instead of the LMS algorithms in some or all of the implementations of the three units. The changes from NLSM to LMS are small—essentially NLMS required the additional normalization step, thus there is some extra HW complexity involved.

In the next three sub-sections we elaborate on the novel characteristics and advantages of the respective modules (IQR, FR and CR) for each of which several alternative embodiments with various tradeoffs will be disclosed according to the teachings of this invention.

Field Reconstructor (FR) Module

The field reconstructor, which only pertains to SC detection, is tasked with reconstructing the complex field from differential measurements from the DI front-end pair of balanced photo-detector outputs. We disclose here novel FR embodiments, which reconstruct both the magnitude and the phase at once, operating on complex numbers, rather than separating the tasks of magnitude and phase reconstruction. Moreover, the magnitude reconstruction according to the current invention is more accurate than suggested in other solution that engage in a gross approximation replacing the magnitude of each field sample by the geometric mean of the magnitudes of two successive field samples. Here that imperfect magnitude reconstruction procedure is replaced by one which generates a precise recursion for the complex amplitudes of the field samples, in effect extracting the correct magnitudes and phases from the DI outputs. We disclose several embodiments for the FR, the preferred one being one which is based on distant feedback rather than immediate feedback, i.e. applying feedback on a polyphase basis, i.e. amenable to parallelization. Moreover, we also show that the FR is amenable to calibration by the same single-tone training sequence disclosed for calibration of the IQR procedure, i.e. one type of training sequence enables calibration of both the IQR and FR (although the IQR should be trained first, during the initial part of the training sequence then the FR should be trained during the final part of the training sequence).

Adaptive MSDD-Based Carrier Recovery (CR)

The unique carrier recovery methods disclosed here are based on Multi-Symbol-Differential-Detection (MSDD) also referred to as Multi-Symbol-Phase-Estimation (MSPE).

The CR is unique in twelve main respects:

An adaptive version of MSDD is provided which automatically optimizes performance by finding the best CPE operating point (optimal coefficients/parameters of the CR) in the wake of arbitrary statistics of the various phase noise sources. Our MSDD system comprises for the first time an optimal Wiener combiner further enhancing performance in the wake of Laser Phase Noise (LPN), tracking arbitrary channel statistics by means of an LMS algorithm converging to optimal coefficients, while concurrently enabling automatic cancellation of arbitrary, time-varying FO, as explained in the next point.

Various manners for implementing an MSDD are listed in U.S. provisional patent Ser. No. 61/357,097 which is incorporated herein by reference.

We eliminate the doubly differential encoding and decoding and just require a single stage of differential encoding (a differential precoder) at the Tx and a single differential stage consisting of an MSDD structure at the Rx. Despite the removal of the extra stage of differential decoding at the Rx, we still retain here immunity to frequency offsets (FO), achieved now by means of a novel approach without adverse tradeoffs: we compensate for FO by introducing tunable MSDD combining coefficients and allowing those coefficients to be automatically adjusted by an LMS algorithm such that the frequency offset is canceled. Thus, a remarkable feature of our disclosed system is in what it has not. Our novel CR system for QAM lacks dedicated FOE hardware, yet is totally immune to arbitrarily large frequency offset. Surprisingly, our CPE hardware manages to further accomplish the FOE function as well, i.e. at no additional HW cost, in addition to its original CPE role, in effect "piggybacking for free" the FOE function on top of a basic MSDD CPE structure.

Our FO capture range is the largest reported—we are able to withstand and automatically cancel very large frequency offsets, even exceeding the baud-rate. Our FO capture range is essentially unlimited—in contrast, existing FOEs become quite complex once required to accommodate FO exceeding quarter-baud rate. Although this large an FO does not arise, yet this underscores the robustness of our FOE function, which we re-iterate, is attained with no extra dedicated hardware.

Adaptability and joint CPE+FOE: Both CPE and FOE functions are achieved simply and robustly by turning the original CPE MSDD structure into a novel adaptive one (never disclosed before in the wireless literature—it is also applicable there): The MSDD Wiener combining coefficients automatically adjust to track and cancel any frequency offset, in addition to nicely adapting to the slowly time-varying statistics of the various phase noise sources (FO is effectively treated as yet another phase noise impairment, in addition to ASE-induced PN, laser PN (LPN), and NL PN). Thus, we disclose a self-learning CPE, adapting to the statistical characteristics of the various phase noise sources (ASE vs. LPN), as achieved by optimal Wiener combining of multiple partial estimators. Our CR system automatically adapts to and optimally tracks all time-varying phase and frequency impairments. In particular, the amount of frequency offset is one of the time-varying parameters to which the system adapts—this is how FO is automatically mitigated. Our disclosed MSDD CR is then a joint adaptive FOE+CPE: the frequency and phase estimation functions, previously always treated in isolation by means of two distinct sub-systems, are integrated here in a joint carrier recovery structure with lowest complexity, high overall performance and self-learning the channel statistics, based on multi-symbol differential detection enhanced by adaptive Wiener optimal combining Our system is transparent to the m-QAM order. The HW structure and its (low) complexity are not altered when proceeding from QPSK to 16-QAM to 64-QAM (or higher); Our novel CR structure introduced here is capable of seamlessly accommodating either QPSK, 16-QAM or 64-QAM. In contrast, all other CRs require distinct hardware structures for each of the m-QAM formats and for QPSK, therefore, in conventional schemes, hardware would have to be inefficiently replicated for "on-the-fly" adaptation of m-QAM for arbitrary m (e.g. QPSK, 16-QAM, 64-QAM). The "on-the-fly constellation switching" capability is useful for reconfigurable dynamic networks, where link conditions change and the system selects different routes. This is a key feature essential for the next generation of dynamic optical networks, wherein transmission rate is to be rapidly traded off for OSNR when link routes and conditions change.

The novel CR module is based on linear rather than non-linear elements (linear processing of complex samples rather than non-linear extraction of the phase). Phase ambiguity effects such as cycle slips are entirely eliminated.

The proposed system has least hardware complexity, i.e. it is most efficient relative to state-of-the-art FOE+CPE systems. Part of our significant complexity savings is traced to the elimination of the FOE (note that state-of-the art QAM FOE systems, typically involve large sizes FFT blocks, eliminated here). No additional hardware is required to have our novel phase estimator accomplish the function of frequency estimator as well; a single CR module performs joint FOE and CPE, providing comparable or better performance vs. the cascade of individual state-of-the-art FOE and CPE modules, while exhibiting much lower complexity. However, even considering our CPE standalone, its complexity is already lower than that of state-of-the-art BPS-based CPEs, which are burdened by numerous phase rotations, and multiple comparisons. Our CR complexity is substantially lower, itemizing the counts of various DSP components for a QAM-16 CR system realized by our method relative to state-of-the-art FOE+CPE;

Our CR system performance exceeds that of state-of-the-art M-power based CPE for QPSK by 1-2 dB, and for 16-QAM our CPE is very close (lagging by just ~⅓ dB) to state-of-the-art BPS+2ML CPE (Nakagawa et al., We.7.A.2 ECOC'10 (2010) but it is ~2 dB worse for 64-QAM (when using standard 100 KHz linewidth (LW) ECL sources). To further compare our system to other CRs on a complete end-to-end system bases, we also model the interactions between the FOE and CPE sub-systems of state-of-the-art CR systems, our simulations of which reveal degradations due to the residual FO and PN from the FOE stage interacting with the CPE stage. In contrast, such impairments are entirely eliminated in our joint FOE+CPE CR, which is both simple and robust, attaining better overall HER performance in the wake of arbitrarily large FO. Thus, when considering the full CPE system (both FOE and CPE) our system performance exceeds that of the state-of-the-art BPS+2ML CPE for both 16-QAM and 64-QAM. Thus, once the deterioration of the prior-art system due to the FOE+CPE interaction is accounted for, the performance comparison is dominantly reversed in our favor.

Best non-parallelized LPN tolerance for any given sampling delay, consistent with the MSDD being asymptotically optimal for high SNR in the ML sense, and the Wiener combiner being Minimum Mean Square Error (MMSE) optimal. However, this is true as long as we do not parallelize the CR DSP (e.g., in the context of a PON coherent system operating at a baud-rate slower than the available processing clock). The main disadvantage of our decision-feedback driven MSDD system is its loss of LPN tolerance associated with the multiple parallel processing paths as used for high-speed long-haul systems at current CMOS clock speeds. Parallelizing by a factor of p increases processing latency by the same factor, which amounts to having a p times wider effective LW. Although, the normalized phase noise tolerance of the MSDD method is exceptional to begin with, the effective LPN tolerance will be p-fold degraded. Thus, the only disadvantage of our MSDD data-aided CPE scheme is some reduction in LPN tolerance due to the Distant Feedback Penalty (DFP) inherent in DSP-parallelizing of feedback based schemes[8,9]. Nevertheless, we show that due to the overall PN resilience of our scheme, the practical DFP price incurred upon comparing CPE performance alone for QAM-16 is very small (~⅓ dB). When using standard 100 KHz linewidth (LW) ECL sources, we lag the state-of-the-art long-haul CR Thus, we do great for 16-QAM, while for 64-QAM our system incurs 2 dB DFP—yet notice that 64-QAM is to be dynamically switched in just over links with high OSNR margin, so our performance loss would typically be inconsequential, whereas the complexity of the other 64-QAM systems would be prohibitive.

The net result is that DFB lasers are unusable, however good 16-QAM performance is still attained with standard ECL lasers having 100 KHz LW, for which the penalty relative to the BPS+2ML CPE (ignoring the FOE stage) is just ~⅓ dB. However, such comparison is for the CPE only, ignoring the impact of the FOE; once a practical FOE subsystem such as the coarse stage of Nakagawa et al., We.7.A.2 ECOC'10 (2010) precedes the BPS or BPS+2ML stage, the overall performance of the cascade of the two prior-art subsystems is degraded (residual FO from the FOE impairs CPE) to the point where our joint FOE+CPE MSDD scheme outperforms the prior-art FOE+CPE cascade.

We also simulated a next generation coherent PON system operating at lower-baud rate, indicating that for this PON system our DFP is negligible. Thus, our DFP penalty is a non-issue for PON system where our CPE system clearly wins.

Opto-electronic feedback: Our CR enables improved correction of the FO and acoustic disturbance phase impairments by means of PLL and FLL (Frequency Locked Loop) feedback systems. In fact our CR enables improved phase-detector and frequency-detector capabilities, assisting in realizing the following two subsystems (a): applying a controlled coarse frequency offset to the LO laser, rather than have it freely running. (b): introducing an extra CR sub-stage, preceding our CR, in order to achieve mid-speed phase correction of acoustic disturbances to the lasers. There are actually two types of PLL structures we consider to this end, in addition to the high-speed decision-directed MSDD CR:
a) Slow-speed mixed signal analog-digital opto-electronic phase-locked-loop (OE-PLL), essentially acting as a coarse frequency locked loop (FLL) or (otherwise called frequency tracking loop).
(b) Mid-Speed Digital phase-locked-loop (D-PLL) for following acoustic and ultra-sonic disturbances Built-in AGC for QAM: For a QAM Rx (or more generally for a Rx used with any multi-level, multi-phase transmitted signal constellation) a critical sub-system, required in the overall processing chain, is an automatic gain control (AGC) system resealing the signal just prior to slicing (decisions). If the overall scale of the signal entering the slicer is incorrect, the QAM decisions will be significantly impaired, thus the AGC subsystem must select the correct scaling factor for the noisy QAM constellation at the slicer input. Our adaptive CPE+FOE CR automatically provides this AGC capability. The combining coefficients are automatically adjusted for best AGC-like setting.

The disclosed IQR, FR an CR families of embodiments algorithms are suitable for long-haul high-bitrate coherent optical transmission systems due to their performance strength, simplicity and robustness to sloppy lasers and environmental conditions. Alternatively, the local oscillator laser may be eliminated altogether using instead self-coherent detection, along with the improved carrier phase estimation algorithms disclosed here. Another key application of the algorithms is in robust low cost practical optical metro and access systems (PON) based on self-coherent detection (attaining the advantages of coherent detection without the local oscillator laser in the receiver). Given the cost-intolerance of the (home) end terminal applications, the advantage of eliminating the LO laser from the end-terminals is key. In another variant, it also possible to use the algorithms with tunable local oscillator lasers in the PON home terminal (Optical Network Unit (ONU)), which are also used as upstream transmission lasers, taking advantage of the fact that when setting the ONU laser to a particular frequency for upstream transmission, the same laser can be used to coherently detect downstream light in a neighboring spectral region, despite the frequency offset between the upstream spectral region where the laser is positioned and the downstream spectral region, where the received signal is positioned. This flexibility allows simple realizations of coherent ONUs, but it is also possible to use ONU realizations which lack the laser altogether, by means of the self-coherent detection in the downstream (aided by the disclosed carrier phase estimation and frequency offset mitigation algorithms), as well as by means of using reflective ONU designs in which the downstream light is re-directed upstream and is re-modulated.

The IQ-rebalance and the CR embodiments are also suitable for wireless receivers, void of any optical transmission context. However, the FR embodiments are not applicable to wireless communication but are rather are specific to optical detection.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Adaptive MSDD-Based Carrier Recovery (CR)

In this chapter we disclose novel MSDD-based CR alternative schemes, which may operate either with fixed coefficients or adaptively, and which provide carrier phase estimation (CPE) and compensation and/or frequency offset estimation (FOE) compensation.

These CR schemes are mainly applied here in the context of coherent or self-coherent optical detection, but it turns out that these CR embodiments are also fully applicable to electronic detection in wireless communication, in which case, evidently, the Tx and Rx systems preceding the CR are non-optical but are rather electronic (and so is the CR). As the input to the CR is electronic, nothing is to be changed in the application of the disclosed CR embodiments, however as the wireless channel is different the statistics of the noise and the performance features may be different than those over the optical channel.

Figure 9:
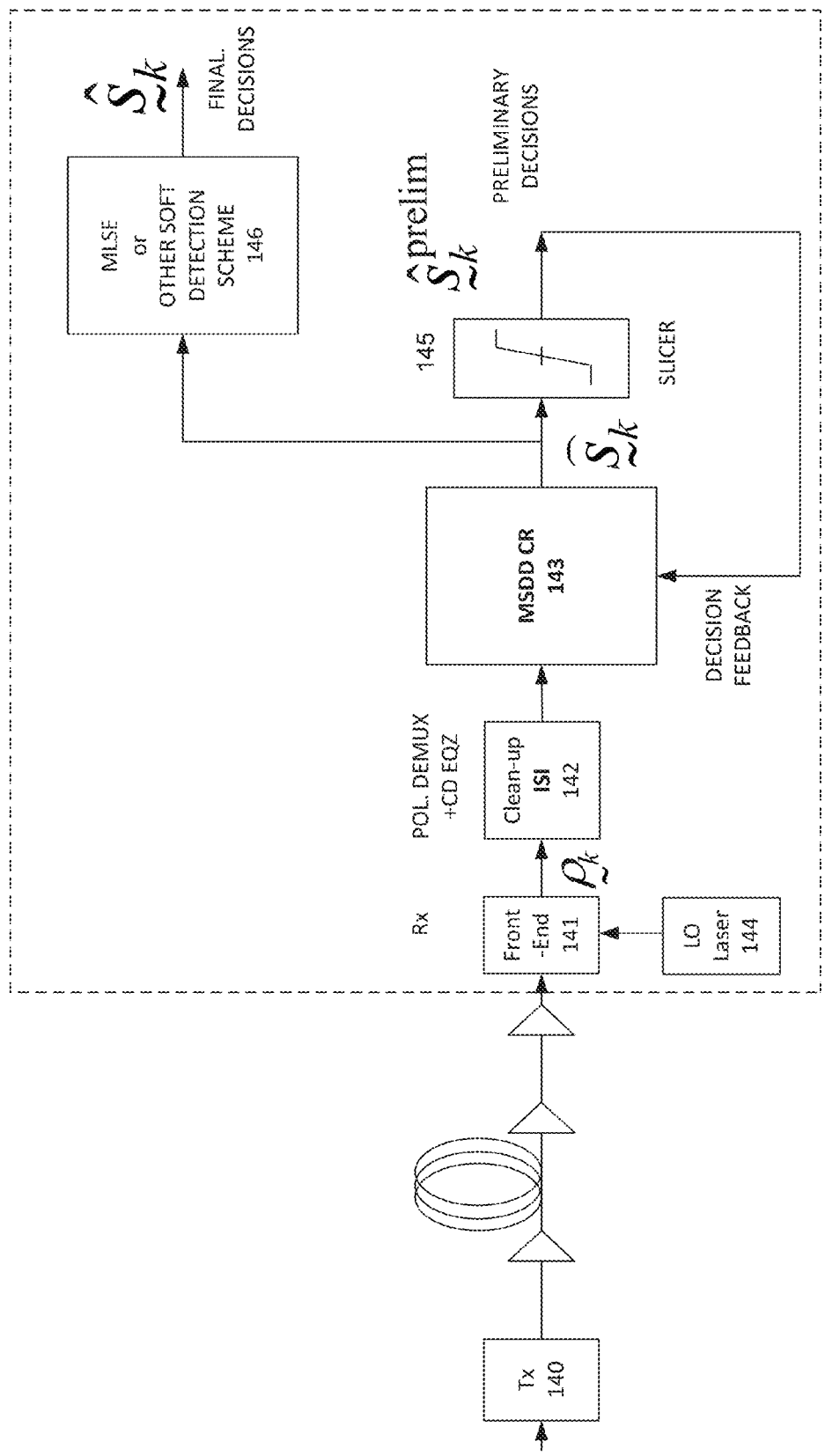

Let us further mention here that it is possible, for either of our embodiments, to tap or split the input into the slicer, namely the phase and frequency-offset corrected signal which is passed by the CR to the slicer associated with the CR, and send the tapped off phase and frequency corrected signal to feed an additional detection stage, such as one based on Maximum Likelihood Sequence Estimation (MLSE). In this case the decisions generated by the slicer associated with the CR are viewed as preliminary or auxiliary decisions, while the final decisions are generated by the MLSE or other soft-detection stage. FIG. 9 presents a generic top-level diagram showing the CR, the slicer and the optional detection stage. In this mode, some ISI may be tolerated at the input of the CR, and the ISI will be corrected by the additional MLSE detection stage, which will benefit from having cleaner samples at its input (with less phase noise and FO free), as generated by our CR.

MSDD CR—Rx Model and the U-U, U-notU and U-U Embodiments

In response to the line symbols $A_k$ launched into the optical channel, the samples received at the carrier recovery (CR) module input are denoted by $r_k$. These "received samples" at the CR input are obtained from the raw received samples $\rho_k$ at the Rx front-end input ($\rho_k$ notation unrelated to the APO notation below), after extensive processing along the chain of Rx modules, as illustrated in FIG. 8, including sampling and timing recovery, IQ-rebalance, field reconstruction (if self-coherent), CD equalization and polarization demux, etc.

In the absence of noise, under the channel model, we have $r_k = A_k$

However, this self-homodyne demodulator (SHD) is quite noisy and is not useful by itself. Our interpretation of the MSDD principle is to generate multiple sparse SHDs, largely uncorrelated, each of which is modified to provide a partial estimate of the Tx symbol $s_k$. Averaging over the partial SHDs yields our improved estimate of $s_k$. We proceed to show how additional SHD-like estimates of $s_k$ may be obtained.

Let our CR generate the following vector of aligned prior observations (APO):

$$\rho_{k-1} = \left[ r_{k-1}, r_{k-2}\breve{s}_{k-1}, r_{k-3}\breve{s}_{k-2}\breve{s}_{k-1}, \cdots, r_{k-L}\breve{s}_{k-L+1}\breve{s}_{k-L+2}\cdots \breve{s}_{k-1} \right]^T$$

In order to form the APOs, the prior observations $r_{k-2}$, $r_{k-3}, \ldots, r_{k-L}$ are rotated by respective unimodular complex factors, obtained as products of normalized versions of the s-symbols which have been transmitted. The s-symbols are assumed to be known at the Rx either by virtue of using training sequences, or in a decision-directed mode, by using the slicer decisions as estimates of the s-symbols).

The i-th APO is denoted, $$\rho^{(i)}_{k-1} \equiv [\rho_{k-1}]_i = r_{k-i}\breve{s}_{k-i+1}\breve{s}_{k-i+2}\cdots \breve{s}_{k-1}$$

and is seen to be generated from the received $r_{k-i}$ time k–i, by rotating $r_{k-i}$ into near alignment with the observation $r_{k-1}$ at time k–1 (the "plain" reference).

Let us UN each of the APOs i.e. apply the U-normalization, $$\breve{\rho}^{(i)}_{k-1} = \breve{r}_{k-i}\breve{s}_{k-i+1}\breve{s}_{k-i+2}\cdots \breve{s}_{k-1}$$

then collect all these normalized rotated observations into a normalized APO vector (with the over-hat over the vector indicating that UN normalization is to be applied element-wise):

$$\breve{\rho}_{k-1} = \left[ \breve{r}_{k-1}, \breve{r}_{k-2}\breve{s}_{k-1}, \breve{r}_{k-3}\breve{s}_{k-2}\breve{s}_{k-1}, \cdots, \breve{r}_{k-L}\breve{s}_{k-L+1}\breve{s}_{k-L+2}\cdots \breve{s}_{k-1} \right]^T \quad (0.1)$$

The i-th Aligned Self-Homodyne Demodulator (ASHD) is defined as:

$$\hat{s}^{(i)}_k = r_k \breve{\rho}^{(i)*}_{k-1} = r_k \breve{r}^*_{k-1}\breve{s}^*_{k-i}\breve{s}^*_{k-i+1}\breve{s}^*_{k-i+2}\cdots \breve{s}^*_{k-1} \quad (0.2)$$

i.e., the i-th ASHD is obtained by demodulating against a reference consisting of the i-th rotated observation (APO), $$\rho^{(i)*}_{k-1}.$$

Collecting all ASHDs in a column yields the following ASHD vector:

$$\hat{s}_{k-1} = \left[ \hat{s}^{(1)}_k, \hat{s}^{(2)}_k, \cdots, \hat{s}^{(L)}_k \right]^T \quad (0.3)$$
$$= \left[ r_k\breve{\rho}^{(1)*}_{k-1}, r_k\breve{\rho}^{(2)*}_{k-1}, \cdots, r_k\breve{\rho}^{(L)*}_{k-1} \right]^T$$
$$= r_k \breve{\rho}^*_{k-1}$$
$$= \left[ \begin{array}{c} r_k\breve{r}^*_{k-1}, r_k\breve{r}^*_{k-2}\breve{s}^*_{k-1}, r_k\breve{r}^*_{k-3}\breve{s}^*_{k-2}\breve{s}^*_{k-1}, \cdots, \\ r_k\breve{r}^*_{k-L}\breve{s}^*_{k-L+1}\breve{s}^*_{k-L+2}\cdots \breve{s}^*_{k-1} \end{array} \right]^T$$

Thus, each ASHD $s_k^{(i)}$ provides a partial estimator of the transmitted QAM symbol, $s_k$. The noises accompanying each of the ASHD partial estimators are just partially correlated (fully uncorrelated if the only source of noise were white, i.e. in the presence of ASE but no LPN—as Wiener-laser noise introduce correlations between successive samples). This suggests averaging over all ASHD partial estimators, in order to improve the signal-to-noise ratio, or more generally taking a linear combination $$\hat{s}_k \equiv \sum_{i=1}^{L} \bar{c}_i \hat{s}^{(i)}_k$$

of the ASHD partial estimators, with coefficients optimized in order to more effectively average out the noise. Notice that arithmetic averaging process $$\left(\overline{c}_i = 1/L, \hat{\underline{s}}_k \equiv \frac{1}{L}\sum_{i=1}^{L} \hat{s}_{k}^{(i)}\right)$$

would be particularly effective for white noise, while the presence of Wiener LPN correlated noise would detract from the efficiency of the arithmetic averaging process. In the presence of LPN, we shall optimize over $\{\overline{c}_i\}$ coefficients used to linearly combine the individual ASHDs.

Our final improved estimator (to be input into the slicer) for the transmitted QAM symbol $\underline{s}_k$ is then a linear combination $$\sum_{i=1}^{L} \overline{c}_i \hat{\underline{s}}_k^{(i)}$$

of partial ASHD estimators, further expressed as follows:
Improved estimator for $\underline{s}_k$:

$$\hat{\underline{s}}_k \equiv \overline{c}^T \hat{\underline{s}}_k = \sum_{i=1}^{L} \overline{c}_i \hat{\underline{s}}_k^{(i)} = \sum_{i=1}^{L} \overline{c}_i \underline{r}_k \overline{\rho}_{k-1}^{(i)*} = \underline{r}_k \left(\sum_{i=1}^{L} c_i \overline{\rho}_{k-1}^{(i)}\right)^* = \underline{r}_k \underline{R}_{k-1}^*$$

In the last form we alternatively express our improved estimator demodulation of the k-th received sample against an improved reference $$\underline{R}_{k-1}$$

(as opposed to the "plain" reference, $$\breve{r}_{k-1}$$

using in SHD differential detection, $$\hat{\underline{s}}_k^{(1)} = \underline{r}_{k-1} \breve{r}_{k-1}^*).$$

In turn the improved reference is given by:
Improved Reference:

$$\underline{R}_{k-1} \equiv \sum_{i=1}^{L} c_i \overline{\rho}_{k-1}^{(i)}$$
$$= c_1 \breve{r}_{k-1} + c_2 \breve{r}_{k-2} \breve{s}_{k-1} + c_3 \breve{r}_{k-3} \breve{s}_{k-2} \breve{s}_{k-1} + \ldots + c_L \breve{r}_{k-L} \breve{s}_{k-L+1} \breve{s}_{k-L+2} \ldots \breve{s}_{k-1}$$

It is convenient to introduce three additional variants of the CR structure, all of which always have their s-symbols (used to generate the APOs) normalized, however these variants differ by whether the prior r-samples entering into the APO formation are/aren't normalized and whether the overall improved reference is/isn't normalized Note on notation: In the sequel, U indicates application of to the unimodular-normalization (UN) operator; notU refers to an unnormalized (non-unimodular) quantity; We have four cases: (i): notU-notU. (ii): U-U. (iii): U-notU. (iv): notU-U. The first U/notU qualifier refers to whether or not the APOs $$\rho_{k-1}^{(i)}$$

are/aren't normalized; The second notU/U qualifier refers to whether the improved reference $$\underline{R}_{k-1}$$

formed from the APOs is/isn't normalized.

Figure 12:
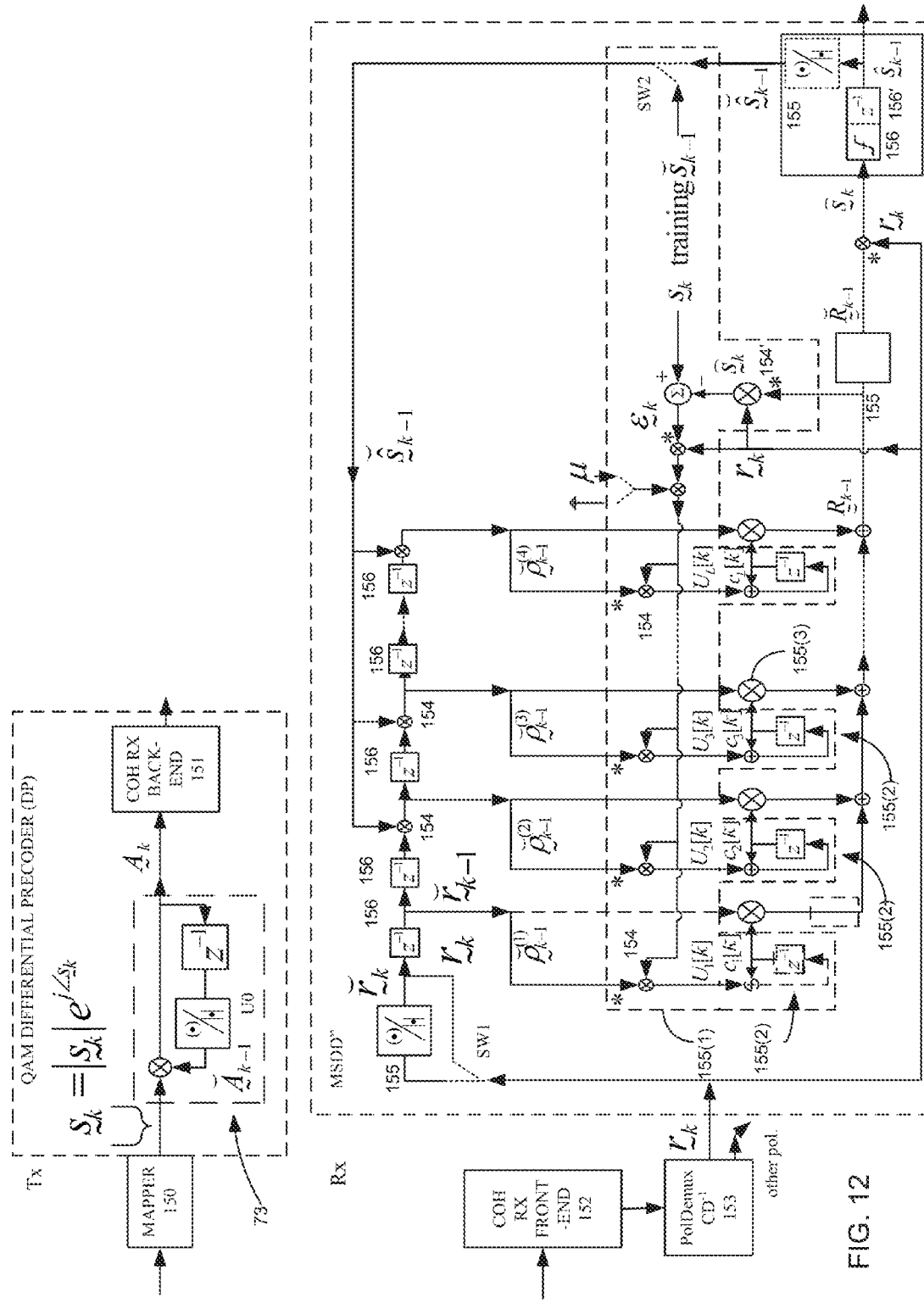

The performance of the last three versions is compared in FIG. 12, where it is shown that the last version notU-U provides the highest performance, with its LMS converged coefficients yielding lowest BER at any given Optical Signal to Noise Ratio (OSNR). Here we comment on some highlights of the comparison between the various CR structures. It turns out that the advantage of the U-notU variant (iii) is that it is analytically amenable to optimized coefficients evaluation, as carried out next (in contrast, an MMSE solution for our preferred version notU-U is not analytically tractable). Curiously, if the optimal coefficients analytically derived for the tractable U-notU are actually plugged into our (analytically intractable) preferred notU-U variant, the resulting performance is almost indistinguishable from that obtained upon using converged LMS coefficients in our preferred notU-U variant. Thus, our preferred notU-U CR variant yields best performance with either offline optimized coefficients (though optimized for a different variant, the U-notU one), as well as with its native LMS coefficient.

The analytical evaluation of optimal coefficients for U-notU version (iii) (which curiously perform even better when applied not to the same system but to notU-U), is carried out next.

Evaluating Optimal MMSE Coefficients for the U-notU Embodiment

We now address, in the context of the U-notU CR variant (iii) above the problem of optimizing the c-coefficients in order to minimize the Mean Square Error (MSE) between the QAM symbols $\underline{s}_k$ and their estimate $$\hat{\underline{s}}_k,$$

which is alternatively expressed as an inner product between the coefficients vector and the ASHD vector:

$$\hat{\underline{s}}_k = \overline{c}^T \hat{\underline{s}}_k = c^\dagger \hat{\underline{s}}_k;$$
$$\hat{\underline{s}}_k \equiv \underline{r}_k \breve{\rho}_{k-1}^*$$

with $^\dagger$ denoting the conjugate transpose.

Introduce the estimation error or residual:

$$\varepsilon_k = s_k - \hat{s}_k = s_k - \bar{c}^T \hat{\underline{s}}_k = \hat{s}_k - c^\dagger \hat{\underline{s}}_k$$

We seek the optimal coefficients vector c minimizing the MSE:

$$\langle |\varepsilon_k|^2 \rangle = \langle |s_k - \hat{s}_k|^2 \rangle = \langle |s_k - c^\dagger \hat{\underline{s}}_k|^2 \rangle,$$

By the orthogonality principle of linear estimation, the optimal coefficients vector is obtained from the condition that the error be orthogonal to each of the "observations" (i.e. inputs into the linear estimator):

$$0 = \left[ \langle \varepsilon_k \hat{s}_k^{(1)*} \rangle, \langle \varepsilon_k \hat{s}_k^{(2)*} \rangle, \ldots, \right.$$

$$\left. \langle \varepsilon_k \hat{s}_k^{(2)*} \rangle \right] = \langle \varepsilon_k [\hat{s}_k^{(1)*}, \hat{s}_k^{(2)*}, \ldots, \hat{s}_k^{(L)*}] \rangle = \langle \varepsilon_k \hat{\underline{s}}_k^\dagger \rangle$$

$$0 = \langle (s_k - c^\dagger \hat{\underline{s}}_k) \hat{\underline{s}}_k^\dagger \rangle = \langle s_k \hat{\underline{s}}_k^\dagger \rangle - c^\dagger \langle \hat{\underline{s}}_k \hat{\underline{s}}_k^\dagger \rangle \Leftrightarrow c^\dagger \langle \hat{\underline{s}}_k \hat{\underline{s}}_k^\dagger \rangle =$$

$$\langle s_k \hat{\underline{s}}_k^\dagger \rangle \Leftrightarrow \langle \hat{\underline{s}}_k \hat{\underline{s}}_k^\dagger \rangle c = \langle \hat{\underline{s}}_k s_k \rangle$$

with the last equality obtained from the middle one by applying $^\dagger$. Introducing the correlation matrix $\Gamma_A \equiv \langle AB^\dagger \rangle$ of two column vectors A, B (and $\Gamma_A \equiv \Gamma_{AA}$).

$$\Gamma_{\hat{\underline{s}}} c = \Gamma_{\hat{\underline{s}},s}$$

which is known as the Wiener-Hopf (W-H) equation to be solved for an offline calculation of the optimal coefficients:

$$\hat{c} = \Gamma_{\hat{\underline{s}}}^{-1} \Gamma_{\hat{\underline{s}},s}$$

Our final form of our W-H equation for the coefficients of the U-notU CR variant:

$$\sum_{j=1}^{L} \left(1 + \langle snr_k^{Tx} \rangle^{-1} (1 + \delta_{i-j})\right) e^{-\pi \Delta \hat{\nu} |i-j|} c_j = e^{-\pi \Delta \hat{\nu} \cdot i},$$

$$i = 1, 2, \ldots, L$$

where the time-varying transmission SNR is defined as $\langle snr_k^{Tx} \rangle \equiv \langle |r_k|^2 \rangle / \sigma_n^2$, with the expectation taken over all QAM constellation points, i.e., the inverse averaged SNR equals $$\langle snr_k^{Tx} \rangle^{-1} = \sigma_n^2 / \langle |s_k|^2 \rangle = \frac{\sigma_n^2}{\frac{1}{m} \sum_{\alpha=1}^{m} |s_k^{(\alpha)}|^2}$$

The W-H equation for the U-notU combining coefficients may be offline evaluated numerically, provided that the statistical/physical parameters (signal power and ASE noise variance and laser linewidth) are known. A more practical approach is to use an LMS adaptation of the Wiener combiner coefficients, such that the coefficients are iteratively adjusted, tending to the optimal MMSE value.

Figure 11:
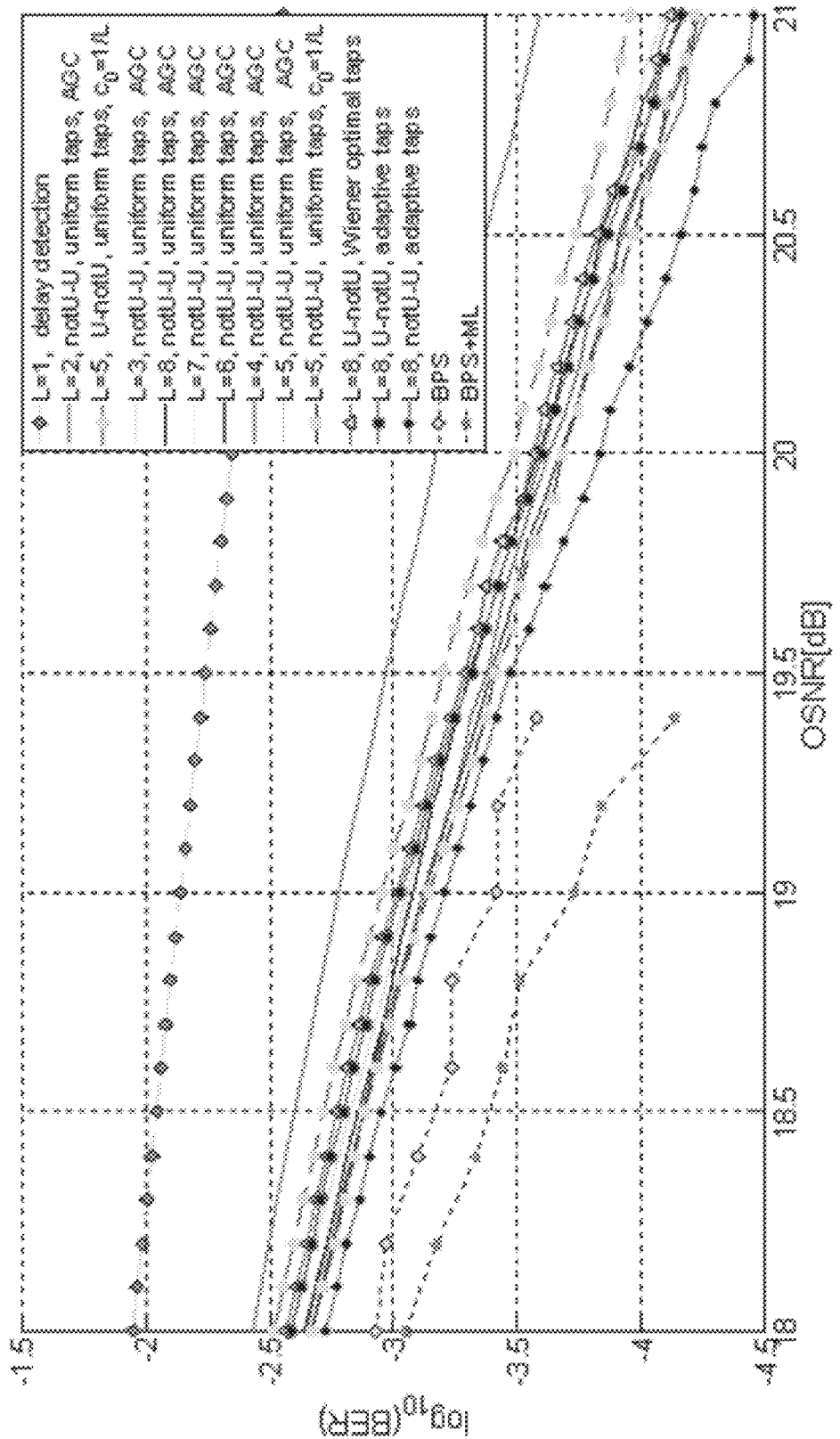

FIG. 11 illustrates a comparison of BER vs. OSNR performance for three carrier recovery systems, our MSDD or BPS and BPS+2ML. The last two conventional systems correspond to the lowest two curves. The poor performance top curve is a naïve delay detector (corresponding to an MSDD with an L=1 window). From the top down we generally progress through increasingly larger window sizes, L, for the MSDD, selecting either notU-U vs. notU-U structures, and uniform fixed or AGC-ed taps, vs. adaptive taps. Key conclusions are that the notU-U variant generally performs better than the U-notU variant. Our best system is an adaptive notU-U MSDD with L=8, performing only 0.3 dB worse than the BPS+2ML, but being less complex. MSDD complexity may be significantly further reduced by using a uniform taps structure with fixed taps, falling just 0.15 dB behind our MSDD adaptive "leader".

Adaptive LMS MSDD CR—U-notU Embodiment

This leads to the U-notU MSDD LMS CR embodiment shown in FIG. 12.

Figure 13:
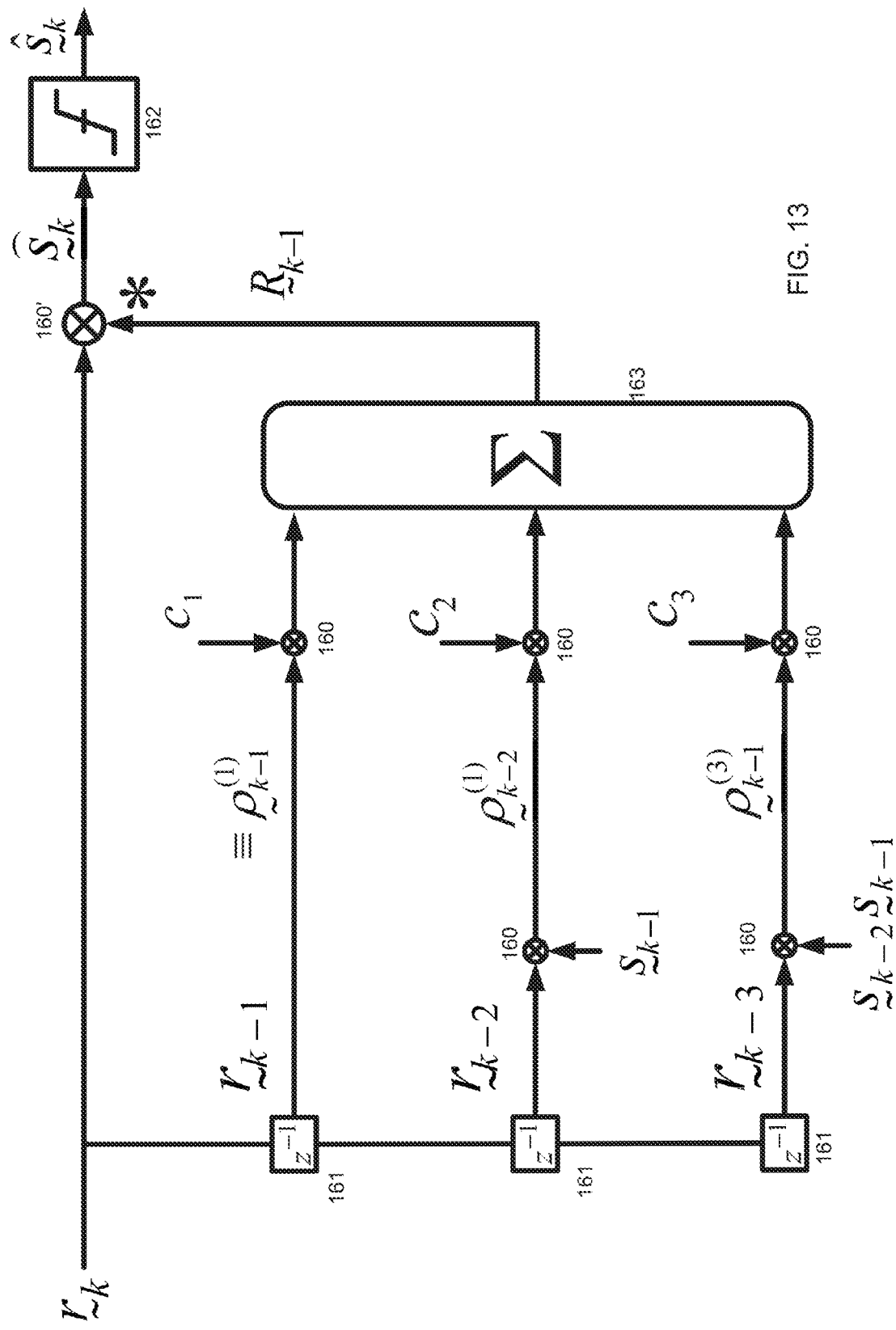

FIG. 13 shows a conceptual non-adaptive MSDD for a QPSK transmitted signal (without unimodular normalizations).

Figure 14:
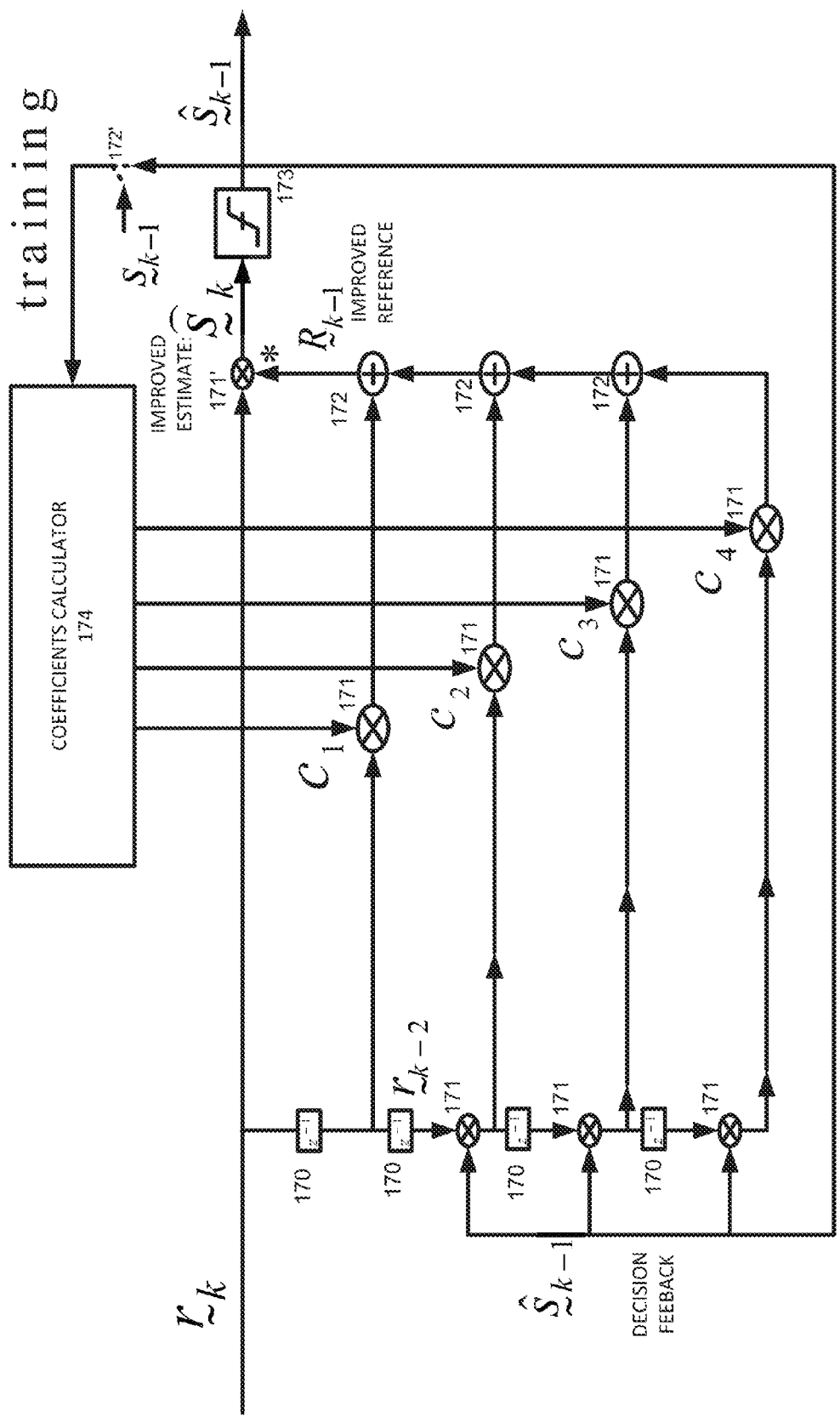

FIG. 14 shows the adaptive version.

Figure 15:
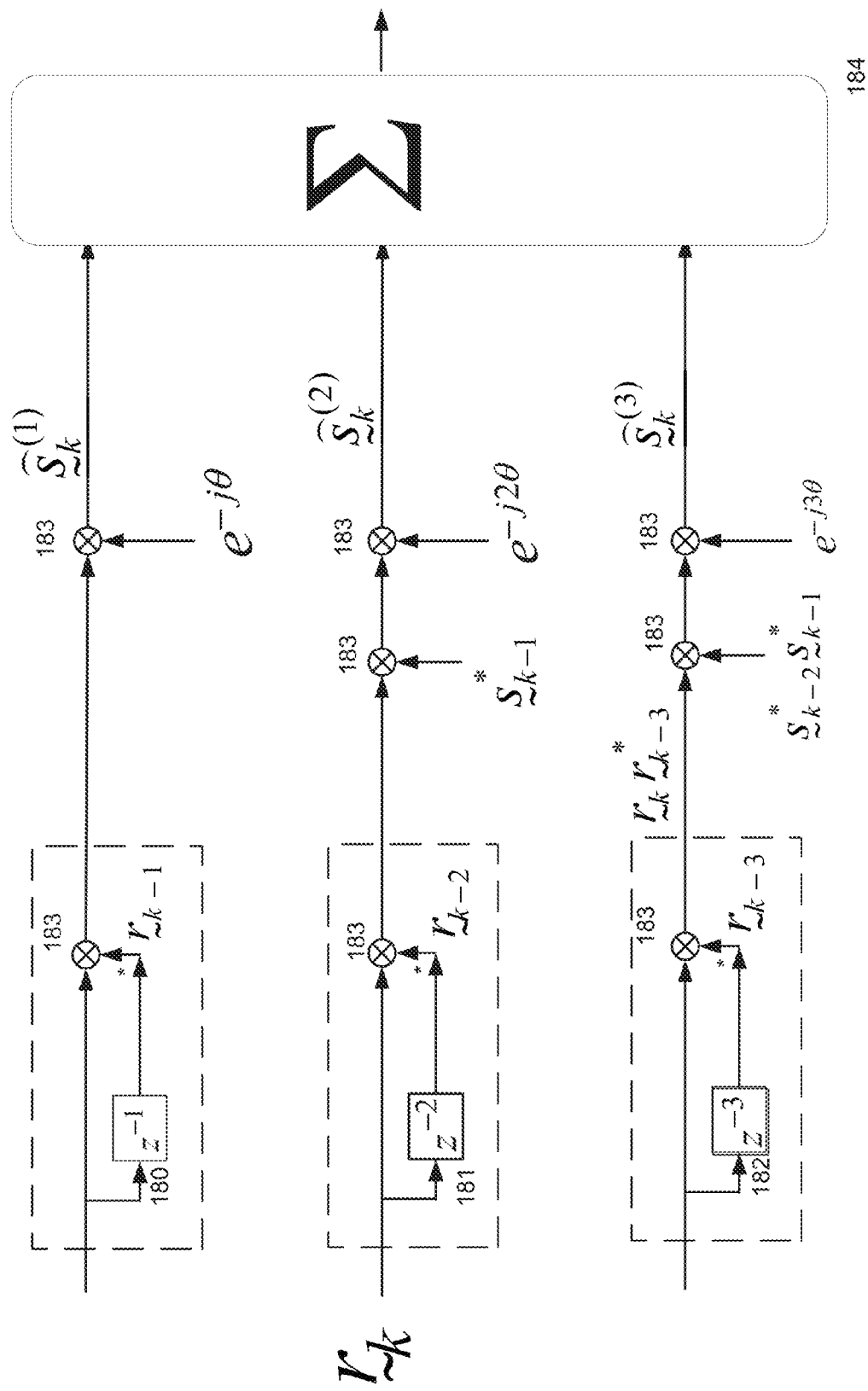

FIG. 15 shows how the QPSK MSDD may be developed from a linear combination of sparse aligned SHDs.

Adaptive LMS MSDD CR—Preferred notU-U Embodiment

In this case the MMSE solution is analytically intractable, yet the LMS algorithm tends in any case to the optimal MMSE coefficients (although those cannot be evaluated analytically).

The notU-U CR embodiment linearly combines unnormalized APOs, yielding the improved reference, $$R_{k-1} \equiv \sum_{i=1}^{L} c_i \rho_{k-1}^{(i)},$$

then U-normalizes it:

$$\tilde{R}_{k-1} \equiv R_{k-1} / |R_{k-1}| = R_{k-1} / \sqrt{R_{k-1}/\bar{R}_{k-1}} = \sqrt{R_{k-1}/\bar{R}_{k-1}}$$

Our final notU-U estimator of $s_k$ is then $$\hat{s}_k = r_k \tilde{R}_{k-1}^* = r_k \sqrt{\bar{R}_{k-1}/R_{k-1}}$$

The corresponding estimation error and its absolute square (the SE) are then:

$$\varepsilon_k = s_k - \hat{s}_k = s_k - r_k \sqrt{\bar{R}_{k-1}/R_{k-1}}$$

$$|\varepsilon_k|^2 = \varepsilon_k \bar{\varepsilon}_k = \left(s_k - r_k \sqrt{\bar{R}_{k-1}/R_{k-1}}\right)\left(\bar{s}_k - \bar{r}_k \sqrt{R_{k-1}/\bar{R}_{k-1}}\right)$$

Yet Another Adaptive LMS MSDD CR—U-U Embodiment

Figure 16:
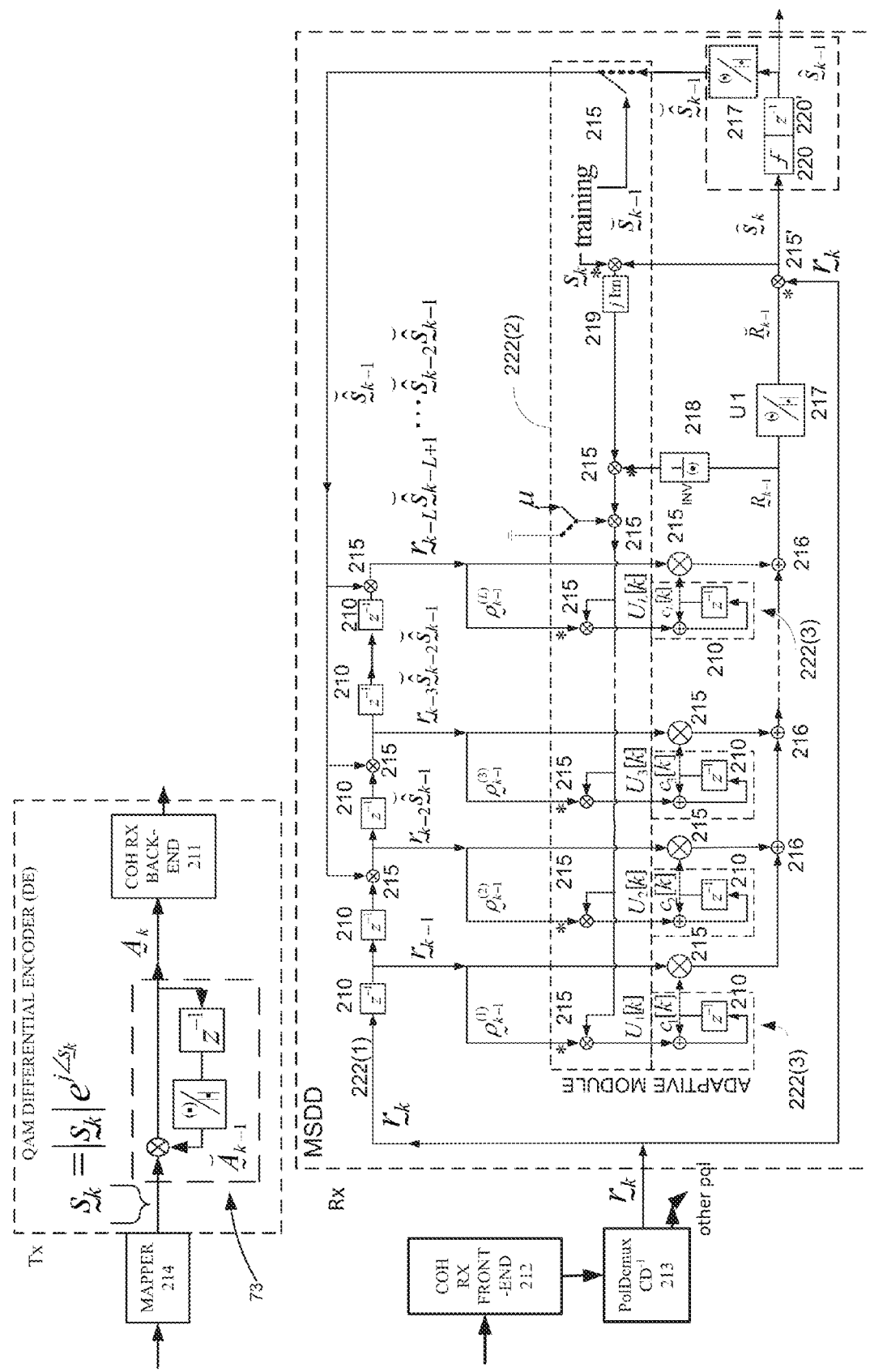

We note that the same LMS adaptive sub-module as in FIG. 16 will also work if we normalize all the $$\tilde{\rho}_{k-1}^{(i)*}$$

i.e. we place a normalizer on $r_k$ in the upper left corner.

Evidently the APOs $\rho_{k-1}^{(i)*}$ are now replaced by normalized APOs, $$\tilde{\rho}_{k-1}^{(i)*},$$

however, the algorithm will work all the same—the converged coefficients and performance will evidently be different.

Figure 17:
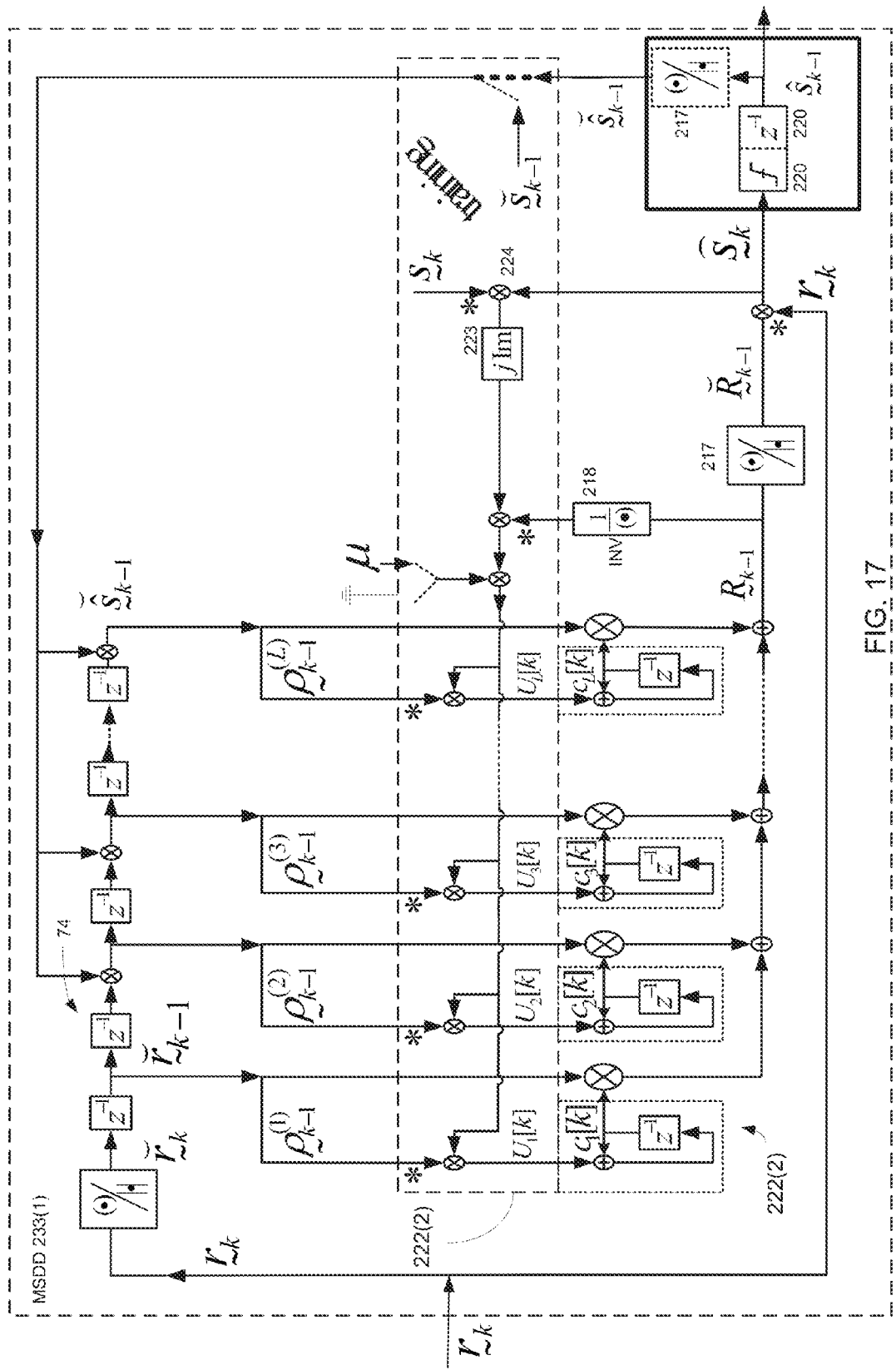

This leads to a U-U LMS MSDD CR embodiment of FIG. 17. This embodiment performs slightly worse than our preferred notU-U LMS MSDD CR embodiment of FIG. 16.

We have already discussed why normalizing the improved reference is a good idea, ensuring modulus preservation. To complete the heuristic justification why our notU-U ends up with best performance, let us make a qualitative remark regarding why it is not a good idea to U-normalize the APOs, Indeed, stretching or compressing all APOs to common unity magnitude also stretches or compresses the ASE white noise associated with each APO. For a QAM constellation the modulus of the transmitted symbol is a random variable (hence so is the modulus of the noiselessly received symbol) dependent on the transmission index. E.g. for a 16QAM constellation the symbols fall on three concentric rings. When applying a normalization on the APOs, symbols of small modulus will be stretched more than symbols of larger modulus, hence the additive white noise will be enhanced more for the smaller modulus symbols, which will contribute disproportionately more noise. The better approach is to leave all APO phasors at their original length, linearly combining them without normalization.

Our MSDD CR as Frequency Offset Estimator and Compensator

It should be noted that upon demodulation with the improved reference, the frequency offset $e^{j\Theta k}$ Tx signal $A_k$ got (i.e. $r_k = A_k e^{j\Theta k}$)

interacts with an identical frequency offset in $$R_{-k-1},$$

such that the resulting demodulated signal is free of frequency offset.

There is one issue though: the magnitude of $$R_{-k-1}$$

may get suppressed considerably if the FO $\Delta f$ becomes too large (larger than $f_s/(2L)$ which amounts to having the argument of the dine in larger than 0.5, i.e. getting in the outskirts of the main-lobe or getting into the sidelobes of the dine). To mitigate this amplitude roll-off we may use a smaller L, but this may be counter-productive, as a larger L may be required for noise averaging (but not too large due to the LPN). A desired trade-off may include shaping the complex coefficients—by selecting a phase-tilt to the optimal coefficients $\{c_i^o\}$ which would have been used if there were no FO. The modified coefficients are then $c_i = c_i^o e^{j\theta \cdot i}$:

$$c_i = c_i^o e^{j\theta \cdot i} \Rightarrow c_i^{\theta} \equiv c_i e^{-j\theta \cdot i} = c_i^{\theta} \equiv \underbrace{c_i^o e^{j\theta \cdot i} e^{-j\theta \cdot i}}_{c_i} = c_i^o$$

Remarkably the FO coefficients $c_i^{\theta}$ now coincide with the optimal coefficients: $c_i^{\theta} = c_i^o$, Most importantly, the W-H MMSE solution may be shown to yield real-valued coefficient, i.e. here we have a summation of real-valued coefficients all aligned.

One remaining challenge is to determine what phase increment $\theta$ should be used in the phase-tilted coefficients which are required to mitigate the rolloff of the improved reference. At first sight it appears that we ought to introduce a frequency estimator in order to evaluate $\theta$. However, it turns out that in the training-based LMS algorithm embodiments disclosed here for the MSDD CR, the LMS coefficients will automatically adapt to derotate the frequency offset. That is, the converged coefficients tend to the correct ones for mitigating the FO, $c_i = c_i^o e^{j\theta \cdot i}$ The reason is that LMS converges to the MMSE solution, which does not tolerate the signal roll-off accompanying the wrong coefficients, which tends to decrease the SNR, which in turn increases the MSE away from its minimum. A formal analytically justification of this intuitive explanation for the automatic FO compensation, will be presented in the next subsection.

It follows that seeking the MMSE in the LMS algorithm automatically ensures optimally phase-tilted coefficients. Our simulations using the LMS MSDD CR algorithm indicate that this is indeed the case. Thus at the end of each training sequence, assuming the FO is stable over the duration of the training sequence, the converged coefficients bear the correct phase tilt required to counteract the FO.

To the extent that over the working interval, until the next training sequence, the FO drifts, then we may get some attenuation of the improved reference (as we start wandering off the peak of the dint), as now the coefficients are frozen, but the frequency cancellation still works, though the SNR may somewhat get degraded. Then comes the next training sequence and the coefficients are converged again to the new phase-tilt, etc. This indicates that the repetition rate of the training sequence should be sufficient to make sure that the frequency is stable just over one repetition period, say the condition $|f|<f_s/(2L)$ be maintained until the next training sequence arrives.

Training sequences rate and impact on FO: We propose that the duration of the training burst used by our MSDD CR embodiments be of the order 10 μsec, which simulations show is sufficient to converge the LMS algorithm (at $f_s=14$ GHz, 10 μsec corresponds to 140,000 training sequence samples), hence we propose a repetition period for the training sequence of 10 msec repetition scale implies negligible overhead of $10^{-3}$.

Generally laser FO variations related to temperature drift are slow, so a ~10 msec scale repetition period for the training sequence may suffice to keep the laser stable in-between training bursts. Typically, coarsely-temperature-stabilized lasers (both the Tx laser and the Rx LO laser) will not wander off in frequency more than say +/−0.1 GHz over ~10 msec, (which corresponds to 10 GHz/sec chirp rate), then for $f_s=14$ GHz (for 16-QAM) and L=20 we would have $f_s/(2L)=0.35$, i.e. with our frozen phase-tilted coefficients acquired during one training burst, despite some drift of the laser, we would still be within the dine main lobe over the 10 msec interval until the next training burst arrives, experiencing little rolloff in the wake of the FO drift. Moreover, as shown in the next section we may apply some coarse frequency stabilization of the LO laser by means of an OE-PLL, further reducing the rate of drift, and providing even more margin against FO drifts. So, if the only slower scale disturbance to the laser was its temperature related drift, there would be no problem.

Impact of FO on the LMS Estimate and Automatic Tracking of FO

The FO gets automatically corrected by our adaptive LMS CPE structure, which then doubles up as FOE. In the course of the derivation we also obtain an alternative interpretation of FOE operation.

Thus, if we use the new optimal coefficients which are tilted versions of the original optimal coefficients, we retrieve our original estimator, which was optimal, and the MSE remains minimal. This indicates that when using the MSDD LMS algorithm, once the FO is applied, the coefficients actually evolve to the optimal MMSE ones, i.e. develop a phase-tilt, such that the overall optimal estimator at the slicer input remains the same:

$$\hat{s}_k = \hat{s}_k^o \approx s_k.$$

Our MSDD CR acts as AGC, resealing the received QAM constellation

For a QAM Rx (or more generally for a Rx used with any multi-level, multi-phase transmitted signal constellation) a critical sub-system, required in the overall processing chain, is an automatic gain control (AGC) system resealing the signal just prior to slicing (decisions). If the overall scale of the signal entering the slicer is incorrect, the QAM decisions will be significantly impaired, thus the AGC subsystem must select the correct scaling factor for the noisy QAM constellation at the slicer input. Our adaptive CPE+FOE CR automatically provides this AGC capability. The combining coefficients are automatically adjusted for best AGC-like setting.

Remarkably, when a non-unity end-to-end gain, g emerges, the optimal Wiener coefficients get scaled down by the inverse of the g-gain. This has the effect of compensating for the increase of the overall estimate at the slicer input by the g-factor.

Upon using the new resealed MMSE coefficients the optimal estimate does not change, and the MSE remains minimal.

In the adaptive LMS setting, the LMS coefficients automatically tend to their optimal MMSE value, hence they will end up resealed relative to the case wherein g=1, and will thus automatically compensate for the scaling. To the extent the end-to-end gain scaling varies slowly, then the LMS algorithm can track it well.

Note: This AGC property of the adaptive MMSE CR will become very handy in the sequel, when the CR will be parallelized into sub-blocks, each processing one polyphase of the signal at the CR input, and it will be shown that in the self-coherent case each polyphase will be afflicted by a different gain factor, due to the structure and operation of the FR module. Nevertheless, each polyphase CR will be able to correct its own gain factor, such that the net result is that the different gain factors imparted to each of the polyphases in our FR module, get corrected by the polyphase CR.

Parallelized Realization of Our MSDD CR—Polyphases Interleaving

Figure 19:
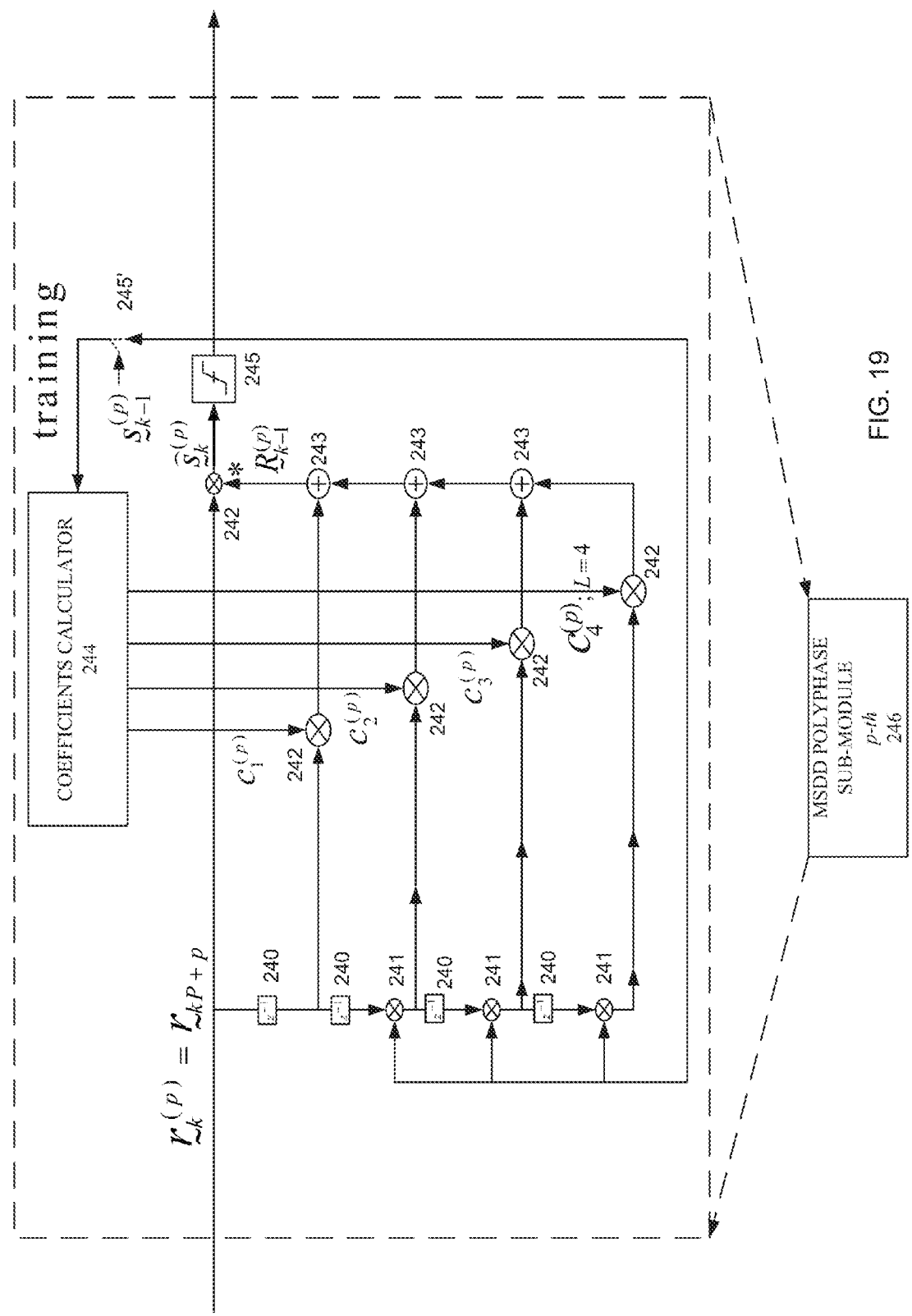
Figure 20:
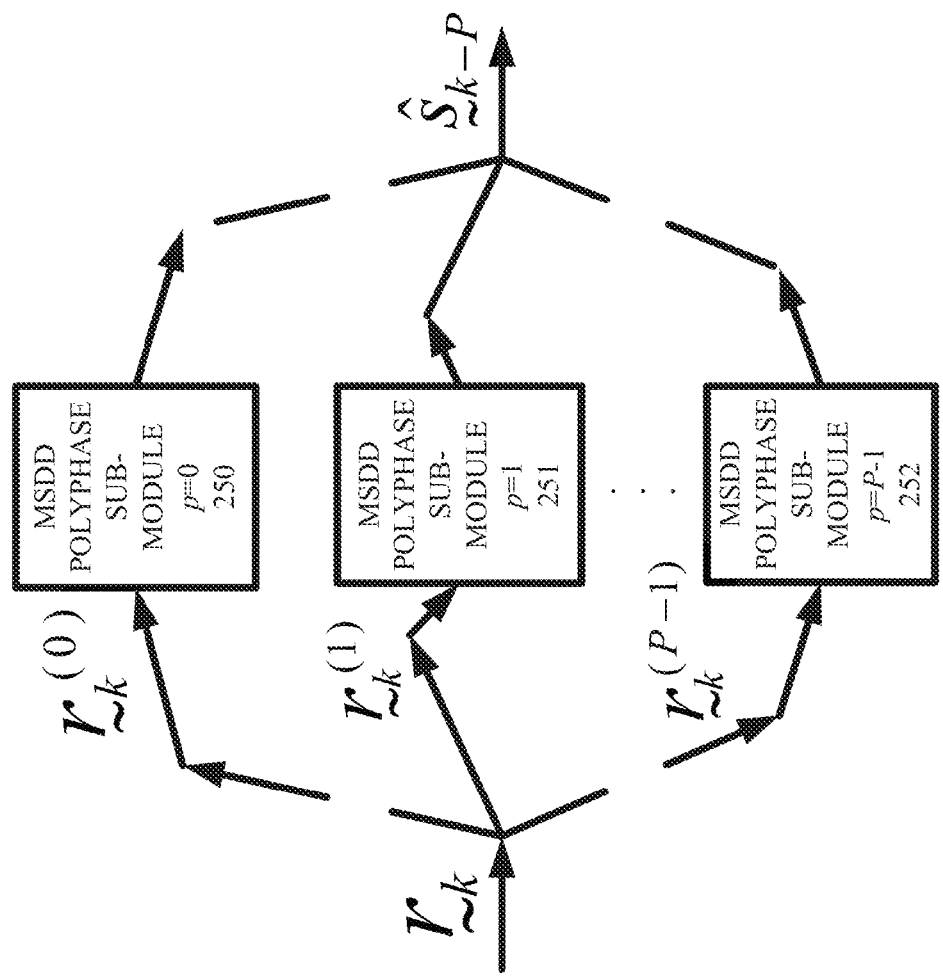

FIGS. 19 and 20 show a parallelized realization of the CR MSDD. Processing is partitioned into P parallel sub-modules, each acting on a polyphase of the received signal. The p-th parallel processing sub-module is detailed on the LSH of the drawing. The objective of the parallelization is to allow processing by digital hardware with lower clock rate. The clock-rate of each of the MSDD CR sub-modules for p=0, 1, . . . , P−1, is P times slower than the sampling rate of the incoming signal, thus, by taking the number of parallel blocks, F, sufficiently large, the processing clock rate can be brought down to accommodate the speed of available ASIC technology.

The disadvantage of a parallelized realization as shown in FIGS. 20*a* and 20*b*, vs. the unparallelized versions operating at full clock-speed is that the sampling step has been made P times larger in each polyphase MSDD sub-module, hence the laser phase noise decorrelation is increased P times. However, when using state of the art coherent-grade ECL lasers with linewidth of 100 KHz, the penalty is minimal, just 0.3 dB for 16-QAM for the particular system exemplified there, while QPSK still comes ahead with MSDD.

MSDD CR with Constellation Partitioning

Figure 21:
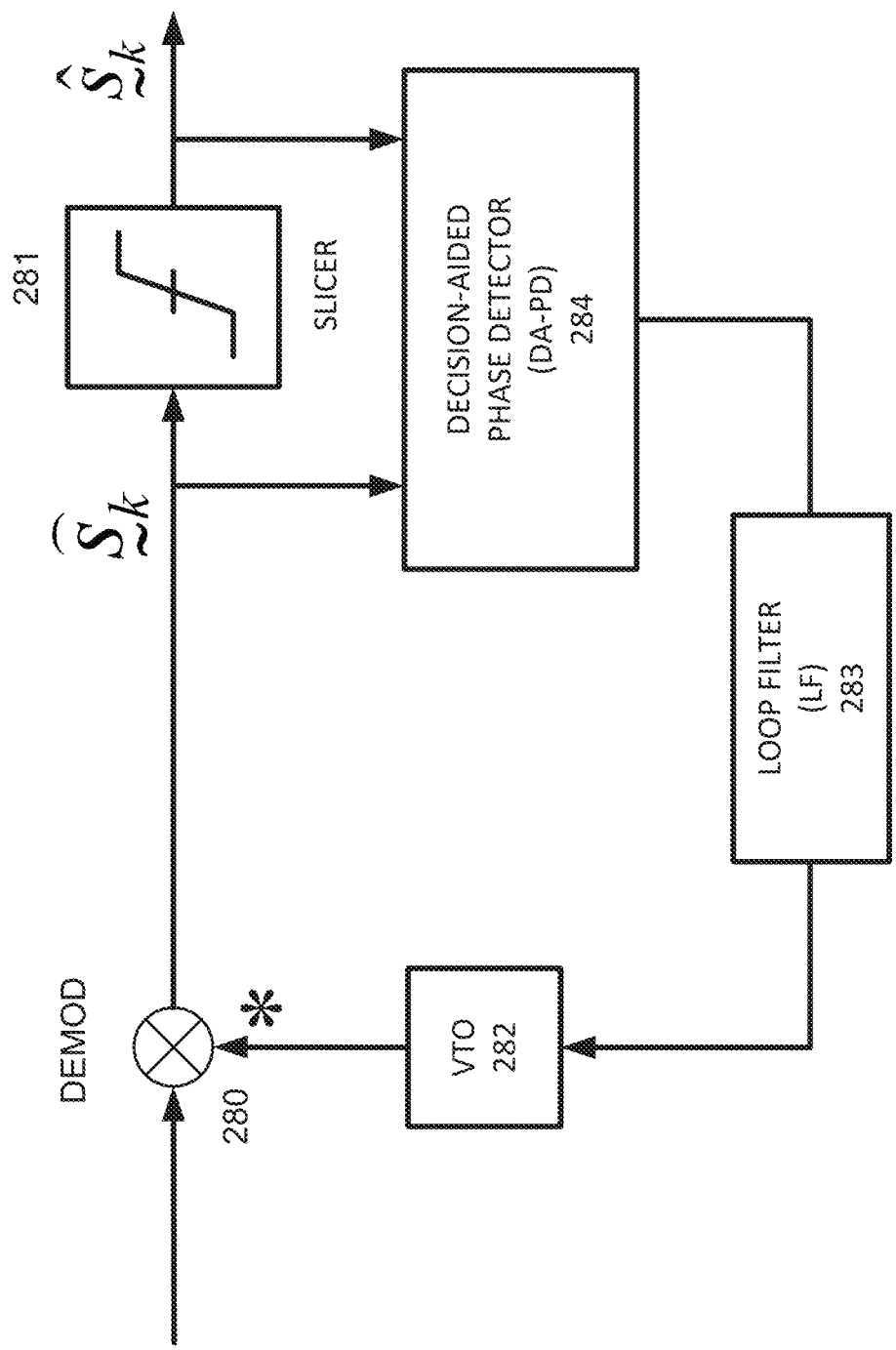

Another MSDD variant is discussed in this section, as applicable for multi-level multi-phase constellations, the points of which may be partitioned into several rings. E.g. for 16-QAM, the 16 constellation points fall onto three rings, the outer ring including the four outer corner points, the inner ring including the 4 points in the inner square and the mid-ring including the 8 points from the outer rim at mid-distance. For such constellations, we propose a variant of CR techniques, whereby a multi-level decision on the modulus (absolute value) of the received point is first taken, and then based on the decision the points are partitioned into the multiple rings, each with a particular modulus—but unlike prior art, here the subsequent processing for the points falling in each ring is performed based on our disclosed MSDD CR (FIG. 21).

The modulus of the received sample is sliced in a multi-level slicer, with multi-level decision thresholds optimized for the particular moduli of the constellation under test. E.g. for 16-QAM constellation $\{\pm 1, \pm 3\}++j\{\pm 1, \pm 3\}$, there are P=3 rings with radii, $\sqrt{2}, \sqrt{10}, 3\sqrt{2}$. In FIG. 20*b*, the variable P denotes now the number of rings distinct moduli of the constellation points. For 16-QAM we have P=3. The decision thresholds may be set at half-way between these points, i.e. at $$Thr_1 = \frac{1}{2}(\sqrt{2} + \sqrt{10}),$$

$$Thr_2 = \frac{1}{2}(\sqrt{10} + 3\sqrt{2}).$$

Now, based on the result of the modulus-slicing operation, the received sample is assigned to one and only one of the three sub-sets, labeled $Ring_1$, $Ring_2$, $Ring_3$, as follows:

$$, |r_k| < Thr_1 \Rightarrow r_k \in Ring_1; Thr_1 < |r_k| < Thr_2 \in Ring_2; Thr_1 < |$$

$$r_k| \Rightarrow r_k \in Ring_3 \qquad (0.4)$$

Note: A statistical analysis of the noises in the modulus will reveal that the conditional PDFs are not identically shaped. Thus the thresholds may be optimized to slightly different values than the mid-way values, however in high SNR, the setting of threshold at half-way is sufficiently accurate.

As the data, $r_k$, arrives bearing random 16-QAM modulation, with probability (W.P.) ¼ to fall in the inner and outer rings, and W.P. ½ to fall in the mid-ring, the number of arrivals and the inter-arrival times for the arrivals diverted to each ring sub-set, experience statistical fluctuations. The samples diverted to each ring sub-set are then collected in an input buffer large enough, introducing sufficient latency such that buffer contains at least L points, with probability close to unity. (L is the size for subsequent MSDD processing)

Thus, each of the three buffers now contains samples for a corresponding ring, i.e. all sharing the same modulus. In fact in $Ring_1$, $Ring_3$ the samples are essentially QPSK-like, whereas the data falling in $Ring_2$ is an 8-PSK constellation with distorted angular positions.

The samples in each of the three buffers, corresponding to each of the three rings, are then synchronously passed to an MSDD CR sub-module, which operates on them at an appropriate clock rate equal to their average rate of arrival (¼ of the full sampling-rate for $Ring_1$, $Ring_3$ and half the full sampling-rate for $Ring_2$). The decisions of the three MSDD CR sub-modules are accumulated in three output buffers (again sufficiently large so that they do not underflow and introducing sufficient latency in the data extraction out of the buffers so that they do not overflow). Finally, a multiplexer interleaves the decisions from the three buffers, in the proper order, corresponding to the original input samples. To this end, a control unit keeps track of the ring sub-set assigned to each input sample, associating a decision index $RING_k \in \{1, 2, 3\}$ obtained at the output of modulus slicer with the k-th input sample. The controller also keeps tabs of the association of the stream of samples $r_n^{(1)}$, $r_n^{(2)}$, $r_n^{(3)}$ in each of the three buffers vs. the original samples, e.g., $r_{31}^{(2)} = r_{178}$, i.e. the $31^{st}$ sample in the $Ring_2$ buffer is actually the $178^{th}$ sample in the original input stream. Thus the control unit properly controls the re-interleaving of decisions from the three partitioned streams, by means of the output multiplexer, such that output decisions are properly associated in sequence, rather than out of order.

Note 1: The final interleaved decisions come out with a delay of D samples; D may be of the order of several tens due to the delays incurred in the input and output buffers.

Note 2: If the input buffer ahead of each MSDD CR overflows to less than L points, it is possible to temporarily run the corresponding MSDD CR with a moving window less than L deep, by essentially nulling out the coefficients belonging to the missing samples. This may incur some loss of SNR performance, but the system will still function as long as there are at least two points in the buffer (in which case the MSDD CR amounts to a simple differential-decoder—the self-homodyne demodulator).

COH Detection: O-E & Digital PLLs for LO Laser Fed by Our MSDD CR

In this section we address two missions: (i): applying a controlled coarse frequency offset to the LO laser, rather than have it freely running. (ii): introducing an extra CR stage to achieve mid-speed phase correction of acoustic disturbances to the lasers. We show that both missions are facilitated by using auxiliary outputs from our novel MSDD CR, in order to drive PLL or FLL structures as disclosed here.

The acoustic disturbances impairment: Another impairment affecting coherent lasers is acoustic disturbances, which may have KHz or even MHz rates, translating into KHz-MHz rate extraneous phase modulation much exceeding the repetition rate of our MSDD training. The MSDD CR outlined here may then be no longer adequate by itself, since the update rate of the coefficients is on a ~KHz scale, while the acoustic disturbances may be faster. To mitigate these acoustic disturbances, one can always enhance the repetition rate of the MSDD FOE training, however this would not be desirable, as the training overhead would then become excessive. The D-PLL to be introduced below addresses this issue.

There are actually two types of PLL structures we consider, in conjunction to the high-speed decision-directed MSDD CR as already disclosed in previous section:

(i) Slow-speed mixed signal analog-digital opto-electronic phase-locked-loop (OE-PLL), essentially acting as a frequency locked loop (FLL) or (otherwise called frequency tracking loop) to tune approximately tune the LO laser in order to partially mitigate FO (the residual FO left by the OE-PLL is then corrected by the MSDD FOE capability).

(ii) Mid-Speed Digital phase-locked-loop (D-PLL) to track and mitigate faster scale acoustic and ultra-sonic impairments.

Both of these structures are in fact driven by auxiliary outputs from our novel MSDD CR. We mention that both PPL types here are data-aided (DA), i.e. there is a means provided to strip the data demodulation on the incoming signal, by means of feedback from the decisions or from the training sequence, so whenever we say "PLL" here, it is understood that we refer to a DA-PLL, i.e. a PLL fed by feedback from the data decisions.

Discussing the motivation for (i), although our MSDD CR has the capability to mitigate any FO, in principle, some coarse FO control of the LO laser is nevertheless highly desirable; having small FO to begin with reduces the spectral shift of the baseband demodulated signal. Lacking such coarse FO control, would lead to cutting off the spectrum of the coherently demodulated signal at the ADC anti-aliasing filter. Thu, despite the MSDD CR being able to cope with arbitrarily large FO that presumes that the FO has been properly digitized which requires larger and larger ADC bandwidth, unless the FO is not partially removed in the analog opto-electronic domain, to begin with.

To recap, the purpose of the slow OE-PLL is to reduce (but not overburden its design to strive to eliminate completely) the spectral frequency offset of the baseband demodulator electrical signal at the coherent hybrid output, in order to prevent cutting off the spectrum of the coherently demodulated signal at the ADC anti-aliasing filter (or equivalently eliminate the requirement for a faster ADC and broader anti-aliasing filter, which would be needed to accommodate spectral shifts of the baseband signal). E.g. if the sampling rate is 28 GHz, it would be desired to control the initial FO to several hundred MHz.

The O-E PLL disclosed here is then proposed as an addition to the MSDD CR, rather than in lieu of it. We re-iterate that the phase noise suppression capability of the O-E PLL is not critical (as phase jitter is well suppressed by the MSDD CR), but what we are after is to have the LO laser coarsely track the incoming optical in frequency, to a coarse accuracy of the order of 100 MHz.

It turns out that our O-E PLL realization is enabled and facilitated by a set of auxiliary outputs provided by the MSDD CR; it is these auxiliary outputs of the MSDD CR which are used to feed the Phase Detector of the OE-PLL. When our MSDD CR embodiment is used rather than other types of CR, the realization of our O-E PLL becomes simpler and more precise, as detailed below.

How slow may the OE-PLL be? Typically, coarsely-temperature-stabilized lasers (both the Tx laser and the Rx LO laser) will not wander off in frequency more than say +/−0.1 GHz over ~10 msec (~10 msec is our training sequence repetition period, for the MSDD CR), and this much a spectral shift for ADCs operating at sampling rate of tens of GHz would represent a small spectral deviation of a few percent, to be tolerated within the oversampling margin provided by the ADCs. Hence, a crude specification for our O-E PLL design might be to mitigate FO ramps of the order of +/−0.1 GHz/(10 msec)=10 GHz/sec.

Having discussed the OE-PLL, next, the purpose of the mid-speed D-PLL (ii) is to mitigate phase impairments induced by acoustic (sonic and ultra-sonic, mechanical vibration induced) disturbances on a scale faster than the update scale of the OE-PLL, namely KHz to MHz scale.

The overall CR system, including the two PLL types (opto-electronic and digital) would then compensate for phase/frequency impairments over three different time scales, the ultra-fast scale of the MSDD CR, the mid-scale of the D-PLL and the slow scale of the OE-PLL.

As is well-known, a generic (data-aided) PLL essentially comprises a (data-aided) Phase Detector (PD), a loop filter (LF) and a Voltage Tuned Oscillator (VTO) and a digital complex demodulator (DCD). A generic FLL comprises the same elements except for replacing the phase detector by a frequency detector (FD).

Several alternative novel embodiments will be provided for the generic constituent PLL units, namely the PD/FD, LF and VTO for each of the OE-PLL and D-PLL types. We shall see that the two PLL types, (i), (ii), in certain of their respective embodiments, may share their PD and part of the LF whereas, evidently, each has to have its own DD and VTO—the VTO is built-in into the laser in OE-PLL, whereas the D-PLL has to be provided with a digital VTO. Due to their shared elements, the D-PLL may be provided economically, once the OE-PLL has already been provided.

The most critical (and innovative) component of both types of PLLs are their PDs, which will be seen to be based on feeds by appropriate signals from our MSDD CR structure. Let then us cover the novel MSDD data-aided PD first.

Novel phase Detector, driven by the MSDD CR

A conventional DA-PD for a conventional data-aided PLL (FIG. 21) operates on the (delayed) input, $$\hat{s}_{k-1}$$

(in our notation) as well as output $$\hat{\hat{s}}_{k-1}$$

of the slicer (decision device, which has at least one time unit built-in delay) and generates the following phase difference $$\phi_{k-1}^{PD} \equiv \angle \hat{s}_{k-1} - \angle \hat{\hat{s}}_{k-1} = \angle\{\hat{s}_{k-1}\hat{\hat{s}}_{k-1}^*\}$$

This DA-PD output has the data component removed from it, due to the subtraction of the phase of the decisions (as long as the decisions are correct, i.e.

$$\hat{\hat{s}}_{k-1} = s_{k-1}.$$

The phase difference is then passed to the LF, closing the loop through the VTO (in our case this would be the LO laser) feeding the digital complex demodulator (DCD) (in our case this would be realized as the coherent hybrid followed by sampling by the ADCs), with the DCD fed by the incoming signal and the VTO output.

It may be of comparative interest below to see how noisy the phase estimate would be, in case we attempted to implement such system, with the VTO+demod corresponding to a digital representation of our mixed opto-electronic system.

$$\phi_{k-1}^{PD} = \angle\{\tilde{s}_{k-1}^{notU-U}\hat{\hat{s}}_{k-1}^*\} = \angle\{\underline{r}_{k-1}\overline{R}_{k-2}^*\hat{\hat{s}}_{k-1}^*\} = \angle\underline{r}_{k-1} - \angle\overline{R}_{k-2} - \angle\hat{\hat{s}}_{k-1}$$

The decisions $$\hat{\hat{s}}_{k-1}$$

do not evidently carry phase noise, hence the sources of phase noise here are $$\angle\underline{r}_{k-1}, \angle\overline{R}_{k-2},$$

dominated here by $$\angle\underline{r}_{k-1}$$

as the variance of $$\angle\overline{R}_{k-1}$$

is much lower than the variance of $\angle\underline{r}_{k-1}$, due to the noise averaging effect entailed in linearly combining multiple APOs Unfortunately, constructing a data-aided PD in this conventional way, with its DA-PD fed by the input and output of the slicer in the MSDD CR, would not provide a functioning FLL, as such a DA-PLL would lack the ability to track frequency offsets. Indeed, the FO is removed from our improved estimator input $$\hat{s}_k = r_k \breve{R}_{k-1}^*$$

into the slicer, as any FO factor $e^{j\theta k}$ appearing in $r_k$ also appears in the improved reference $$\breve{R}_{k-1},$$

thus the two FO factors cancel out, and $$\hat{s}_k$$

is FO-free. Therefore, a conventional DA PLL, fed by our slicer input and output, is incapable of tracking FO of the incoming signal, and cannot be used for our O-E PLL, which aims at having the LO laser track the FO. However, the conventional DA PLL may still be used as a building block in the D-PLL intended to cancel mid-speed (KHz and MHz scale) acoustic disturbances. In this case the feedback would not be to the LO laser but rather to an actual digital VTO.

We then propose, for the purpose of O-E PLL realization, novel alternative phase detector and frequency detector structures taking advantage of the signals available within our MSDD CR, in order to sense the frequency offset and feed it back to the laser.

PLL vs. FLL: As is well-known, we do not have to have an FLL in order to track FO; a PLL is capable of tracking frequency offset (as FO translates into a frequency ramp and a well-designed PLL can track the frequency ramp). Structurally, the difference between a PLL and an FLL is whether the sensing element is a phase-detector (PD) or frequency detector (FD). As the performances and capture ranges of PLL and FLL systems are different, it is worth exploring both types of systems. In our context, in order to implement an OE-FLL, we require an FD, the output of which should indicate the deviation between the frequency of the incoming signal and that of the LO laser, which error signal can be fed back into the LO laser frequency control port (via a DAC), closing the loop with negative feedback such that the FO be minimized (reduced to zero in principle) by the frequency tracking loop.

DA-PD turned into FD: If we terminate our DA-PD by a frequency offset estimator (FOE) module, then we will have generated an FD. As the output of the DA-PD disclosed above is given by $\phi_{k-1} = \theta k + \text{phase\_noise}$, what we then require in this case is a phase-domain FOE. In turn the phase-domain FOE may be realized by evaluating a linear fit through the phase samples, over a moving window or a block of consecutive phase points, $\{\phi_{k-D}, \phi_{k-D+1}, \phi_{k-D+1}, \ldots, \phi_{k-2}, \phi_{k-1}\}$. The slope of the linear fit simply equals our estimate $\hat{\theta}$ for the FO measure $\theta$ (the slope of the phase ramp $\theta k$). As the phase increment $\theta$ is proportional to $\Delta f$, $\theta = 2\pi\Delta f T = 2\pi\Delta f / f_s$ then the FO estimate is represented up to a multiplicative constant by the evaluated $\hat{\theta}$.

Formulas for evaluating a linear fit (and in particular its slope) based on the method of least squares are well-known, hence will not be reproduced here. Adaptive methods can also be used for the task of converging onto the slope of the sequence of points $\{[k-D+i, \phi_{k-D+i}]\}_{i=1}^{D}$.

DA-FD/DA-PD Embodiments—MSDD Combining Coefficients

The concept proposed here is to realize DA-FD and DA-PD based on transferring the MSDD converged coefficients, at the end of each training sequence interval, to a frequency offset estimation (FOE) module, wherein the FO, $\Delta f$, would be extracted, as given by the phase increment $\theta = 2\pi\Delta f T = 2\pi\Delta f / f_s$ which is proportional to $\Delta f$. If we further follow the DA-FD by a digital accumulator, then we will have realized another DA-PD embodiment, in which the frequency is integrated (accumulated) to generate the PD output.

Notice that unlike the main FOE used within the CR, this FOE would be very slow, as frequency info would be updated on a time scale of the order of ~10 msec (the period of the training sequence). On the upside, this allows low-complexity processing as there is a lot of time (~10 msec) to complete the evaluation of the frequency offset imprinted in the coefficients during each training sequence burst. However, the disadvantage is that the frequency is not sampled sufficiently fast to track mid-speed phase disturbances, such as acoustic induced ones. Therefore, this version is more useful for the O-E FLL, than it is for the D-PLL.

It remains to provide some instances of the FOE realization, acting now on the complex coefficients. Multiple frequency estimation techniques could be used:

II(a): Take an FFT of the zero-padded $\{c_i^\theta\}_{i=1}^L$ record and determine $\hat{\theta}$ from the discrete-frequency where the FFT peaks.

II(b): Generate $$\hat{\theta} = \frac{1}{L-1} \sum_{i=1}^{L-1} \angle \{c_{i+1}^\theta (c_i^\theta)^*\}$$

or $$\hat{\theta} = \angle \sum_{i=1}^{L-1} c_{i+1}^\theta (c_i^\theta)^*.$$

III(c): Phase domain FOE: extract the angles of the complex coefficients $\theta_i = \{\angle c_i^\theta\}_{i=1}^L$ and proceed as in the FD disclosed above (based on extracting the slope out of the sequence of phases $\phi_{k-1} = \theta k + \text{phase\_noise}$). Here we evaluate a linear fit through the $\theta_i$ sequence, the slope of which equals our estimate $\hat{\theta}$ of $\theta$.

Once an estimate $\hat{\theta}$ is extracted by either of these FOE methods, we may use it as follows:

For the purpose of DA-PD, digitally generate the phase ramp $\hat{\theta}k$, then map it through $e^{j(\bullet)}$, yielding $e^{j\hat{\theta}k}$, which is then applied to the digital complex demodulator in the D-PLL version. This D-PLL structure however cannot rapidly track the FO variations as those are sampled in each the training sequence burst then extrapolated as fixed FO $e^{j\hat{\theta}k}$ over the information interval until the next training burst arrives. Therefore this version would not be very useful, in the current context, but was presented for completeness.

More usefully, for the O-E FLL version, we may adopt $\hat{\theta}$ as a frequency offset linearly scaled measure and apply it to the input of the LO laser (via a Digital to Analog Converter (DAC)), possibly preceded by a low-pass interpolating filter, if the DAC rate is higher, or decimated down if the DAC rate is lower.

The problem with this approach, based on combining-coefficients, is that the coefficients are only available at the end of each training interval, i.e. the update rate equals that of the training sequence. In contrast, the first approach shown above for the PD (based on processing $$\overline{s}_{k-1},\ \overline{\underline{s}}_{k-1}(\text{or }\overline{\underline{s}}_{k-1}))$$

generates a much higher update rate (in fact too high a rate, such that substantial rate decimation must be applied), and is continuously available (both during the training sequence intervals and during the information intervals (when the decision-directed mode is used). The second point is that under the combining coefficients based method just described, the frequency estimation must be performed just from a short record of L coefficients, hence the frequency offset may not be sufficiently accurate (on the other hand, we recall that it is sufficient that the O-E PLL provide FO accuracy of the order of +/−0.1 GHz, and such accuracy may be reasonably extracted from the phase tilt of the L coefficients.

Loop Filter (LF) embodiment: The input to the LF (representing the phase fluctuations in the improved is very broadband, with bandwidth on a ~10 GHz scale, whereas the input into the VTO (the digital VTO for the D-PLL and the LO laser itself for the O-E PLL) is on a MHz or KHz scale respectively. Thus, following the PD, the LP must heavily low-pass filter the phase fluctuations in order to smooth the GHz rate phase fluctuations down to MHz rate for the D-PLL and down to KHz rate for the O-E PLL, i.e., the bandwidth must be narrowed down by 3 to 6 orders of magnitude. To this end we propose a cascade of IIR filters and decimators (the IIRs act as anti-aliasing filters for the decimators). Due to usage of IIRs the implementation proposed here is orders of magnitude more HW efficient than if FIR filters were used to narrow-down the bandwidth by such a large factor, If both the D-PLL and O-E PLL loops are present, then the filters-decimators cascade may be tapped in the middle, to provide the D-PLL mid-speed output into the digital VTO, while the full cascade output provides the low-speed port to drive the O-E PLL (the LO laser) FO control port via a DAC. Another approach is to not use a LF at all, but rely on the low-pass filtering properties of the VTO, but in this case there is less control over the LF response, hence over the overall loop properties.

Test signals for channel ID and inversion: Let us revisit the generation of the two widely linear test vectors $[q_0, q_0]^T$ and $[jq_0, -jq_0]^T$ introduced above as test sequences in the channel ID and inversion procedure, which was mentioned to provide a less preferred alternative relative to our WL LMS procedure.

The first WL test signal $[q_0, q_0]^T$ corresponds to having $q_k=q_0$ real-valued, e.g. obtained by transmitting a single-tone with $\theta_c=0$, i.e. a real-valued line symbol $A_k=A_0$, in turn obtained by constantly transmitting $\underline{r}_k=1$. The second WL test vector $[jq_0, -jq_0]^T$ corresponds to $\theta_c\pi/2$ i.e. transmitting $\underline{s}_k=j$, $\underline{q}_k=jA_0^2$.

Vector Polarization Extension

Heretofore, the treatment of the channel has been scalar ignoring the polarization nature of light. Next let us consider the more sophisticated and more realistic vector channel accounting for the polarization multiplexing at the transmitter and the mixing of the two polarizations in the fiber.

As the Tx independently modulates two symbol streams $A_k^x, A_k^y$, multiplexing them over the two orthogonal x and y polarizations, we actually have a choice of launching our single-tone training sequence either in one of the polarizations, or in both of them, and selecting the relative amplitudes and phases of the two launched polarizations (i.e. selecting the State-Of-Polarization (SOP) of the transmitted calibration signal). Due to polarization mixing, i.e. birefringence and PMD in the fiber, a signal launched into one polarization would typically end up in both polarizations (and more generally a signal launched into a particular SOP would evolve to a different, random SOP).

It can be seen that in the absence of noise, $e^{j\theta_{c,k}}$ is again an eigen-sequence of the vector channel, much as it was for the scalar channel, being reproduced up to a complex multiplicative constant in each polarization path of the Rx.

There may be provided constant sequences that in the absence of noise, allow to train and rapidly converge the widely linear LMS procedure (up to a complex constant, calibrated out by the CR stage further downstream).

Our received calibration signals may randomly and slowly fade to small values, due to the polarization/PMD fluctuations in the fiber. Due to this polarization fading effect, the signal-to-noise (SNR) ratio of our training procedure may be diminished. Notice that the scale over which the SOP randomly varies in long-haul fiber links is about 1 msec (correlation time for 1/e) in the worst case, i.e. the SOP is very nearly constant over 100 µsec (and even more so, i.e. extremely close to constant, over 10 µsec)

Thus the training sequences should be SOPs over a window of 10-100 µsec over which the Jones matrix of the fiber is effectively frozen, such that the polarization fading of the received calibration signal is mitigated.

Our novel concept is to use polarization-diversity, sending two or more training sequences in succession, such that the probability is very close to unity that the response to at least one of these sequences is not in deep fading, and reasonable SNR is achieved for the purposes of calibration. A specific polarization-diversity algorithm we propose, is to send the SOP-training-sequences in orthogonal pairs, and attempt to get them maximally and uniformly spread over the Poincare sphere of polarizations.

Training sequence 1: $[1,0]e^{j\theta_{c,k}}$

Training sequence 2: $[0,1]e^{j\theta_{c,k}}$

Training sequence 3:

$$\frac{1}{\sqrt{2}}[1, 1]e^{j\theta_{c,k}}$$

Training sequence 4:

$$\frac{1}{\sqrt{2}}[1, -1]e^{j\theta_{c,k}}$$

Training sequence 5:

$$\frac{1}{\sqrt{2}}[1, j]e^{j\theta_{c,k}}$$

Training sequence 6:

$$\frac{1}{\sqrt{2}}[1, -j]e^{j\theta_c k}$$

Other three mutually orthogonal axes of the Poincare sphere may be selected, to yield the six states.

The polarization fading-avoidance procedure adopted here is then a polarization diversity technique, whereby multiple polarization states are transmitted for the calibration, over successive training sequences, and the most favorable of the multiple sequences are selected, for each or the two x- and y-output polarizations. The simplest way to accomplish that is to process (in the IQR algorithm) the received calibration signals, for each of the training sequences, and only at the end of the processing to select the best one, e.g. based on maximizing the averaged power. Essentially the IQR is based on recursive LMS in which coefficients converge, and all we have to do is to store for each of the six sequences the resulting converged coefficients, and after comparison of SNRs to select the set of coefficients corresponding to the one with best SNR.

The rationale of using orthogonal pairs is as follows: Assuming the Jones channel matrix at the calibration frequency is unitary, or nearly unitary (deviating slightly from unitarity due to polarization-dependent-loss (PDL)), means that the worst case would be if we launched a SOP which coincides with one of the rows of the Jones matrix. Then, the corresponding output port will be maximized, but the other port will be zero. Thus, when launching both rows of the Jones matrix (if we knew it), then we be assured that in one case we maximize one output polarization while in the other case we maximize the other output polarization. Thus, with two training sequences we make sure that we get good SNR signals in both ports. In practice the receiver does not know (yet) the Jones matrix or the fiber (it will know it later after polarization demultiplexing, once the coherent field is reconstructed and processed, but at this early stage in the processing it does not know it). Thus, we send three pairs of orthogonal polarizations, corresponding to three antipodal SOPs along the x, y, z axes of the Poincare sphere, so no matter what the two antipodal SOPs (points on the Poincare sphere) corresponding to the two rows of the Jones matrix are (corresponding to two antipodal points on the Poincare sphere), then we are not too far away from one of the six training SOPs, which means that we receive our training SOPs with good SNR.

In fact, using the fact that the inner product of Jones vectors equals the inner product of Stokes vectors (points on the Poincare sphere), consider a point on a unit-sphere in the first octant (x>0, y>0, z>0) out of the eight 3D octants.

We seek the worst case SOP (point on the Poincare sphere) which has the smallest inner product with unit vectors along the three positive axes [1,0,0], [0,1,0], [0,0,1]. It is readily seen that the worst (smallest) of the three inner products over all three is obtained for a Stokes vector $$\frac{1}{\sqrt{3}}[1, 1, 1]$$

(the inner product is then $$\frac{1}{\sqrt{3}}).$$

This means that the most we can expect the SNR to drop with this procedure, maximally selecting one of the six training SOPs, relative to a situation where the receiver knows the polarization channel state is a factor of $$\frac{1}{\sqrt{3}}$$

in amplitude, i.e. 4.8 dB.

So, the procedure is one of "maximal gain selection". We average the powers of the received signals (at the actual DI outputs) over the duration of the training sequence, and we elect for each of the two x and y polarization ports the sequence which led to maximal performance.

Actually, it may be sufficient to send just the first orthogonal pair, training sequence 1 and 2.

If experimentally, or by simulation, it is deemed that the SNR may not be sufficient, then we launch the first two pairs, i.e. training sequences 1-4.

Again, if experimentally, or by simulation, it is deemed that the SNR may not be sufficient, then we launch all three pairs, i.e. training sequences 1-6.

The training sequences are sent in succession, such that the SOP is still relatively constant over the duration of the full group of sequences. Actually, the fact that the rate of change of the polarization matrix H which is of the order of 10 KHz, indicates that we should use training sequences of the order of 100 μsec, over which the polarization matrix is relatively constant, i.e. there are about 100 μsec/6≈17 μsec per training sequence if all six pairs are used.

E.g., at 14 Gbaud (as used for transmitting 100 Gb/sec over 16-QAM), over 17 μsec there would be in excess of 230,000 symbols in each of the training sequences, more than sufficient to converge the LMS algorithm, which is very rapid as there is a single complex degree of freedom. In fact, even with 23,000 symbols the IQR algorithm may well converge, so it may be sufficient to shorten the duration of the overall six sequences from 100 μsec to 10 μsec (i.e. 1% of the correlation time of 1 msec) in order to get the polarization channel frozen to a very good approximation.

Improved Field Reconstruction (FR) Algorithms for Self-Coherent Detection FR Overview In this chapter we introduce improved FR algorithms for self-coherent detection, recovering both the amplitude and phase of the incident field on the two DIs, by processing the rebalanced DI outputs (i.e. the FR stage treated here follows the IQR stage, as treated in the last chapter).

Algorithms for reconstructing the phase from the DI outputs have been previously proposed, e.g. in X. Liu's and Kikuchi's prior cited works. However, while of demonstrative interest, such algorithms would not be practically usable, as the process of field reconstruction, as taught there, would be severely degraded by impairments due to imperfections in the DIs (IQ-imbalances), e.g. accumulation of small phase errors. These limitations in the FR process are addressed by the combination of our novel IQR and CR embodiments. Moreover, while it was shown in prior art, in principle, how to obtain phase reconstruction by accumulation of the differential phases measured at the DI outputs, no satisfactory algorithm has been proposed for amplitude reconstruction. In ([Kikuchi] an extra photo-detector was introduced for power measurement, alongside the two DI used for differential phase measurements. In contrast X. Liu simplified the system by eliminating the extra detector, using a crude algorithm reconstructing the magnitudes just from the two DI magnitude outputs. The problem with the amplitude reconstruction in X. Liu is its high inaccuracy, especially when the field changes rapidly or gets close to a null.

Our improved FR embodiments, as detailed in this chapter, have the following characteristics:

Our proposed novel FR algorithms improve on the prior art, satisfactorily addressing both amplitude and phase correction in a highly accurate manner, just based on the two DI outputs, performing joint reconstruction of both amplitude and phase at once, by directly operating in the complex domain, i.e. we do not require two separate sub-systems to retrieve the phase and the amplitude, but we combine both reconstruction stages in one joint step, directly reconstructing the complex-valued $\rho_k$ sequence from the complex DI output sequence by processing the complex sequence $q_k$, avoiding polar-rectangular coordinate conversions, but rather performing processing more efficiently in the complex domain.

We eliminate the extra photo-diode for magnitude measurement, achieving field magnitude reconstruction without it, but unlike in those prior works, we obtain much more accurate magnitude reconstruction as no approximations are made in our algorithm for either magnitude or phase reconstruction, unlike in X. Liu's prior art where the gross approximation $$|\rho_k| \approx \sqrt{|\rho_k||\rho_{k-1}|}$$

was made, in effect assuming that the field hardly changes from sample to sample (which approximation would become a strict equality just for $$|\rho_k| = |\rho_{k-1}|).$$

In contrast to the approximate magnitude reconstruction algorithm our accuracy is just limited by numerical accuracy, i.e. the number of bits used in the complex arithmetic operations.

Critically, according to the teachings of our invention, to make the FR reconstruction system work it is necessary to also augment it with appropriate IQ-rebalance (IQR) system preceding it and with an appropriate carrier recovery (CR) system following it. Without being assisted by the IQR and FR the performance of the FR is severely degraded, making it virtually unusable. This was not recognized in prior art which just sought to propose this or that structure of FR, without realizing the importance of the auxiliary IQR and CR systems, working in unison with the FR and assisting it to attain best performance.

FR problem statement: Assuming that the ADC equalization and IQ imbalance corrections stages have ideally performed their role, we have $$\hat{q}_k = q_k,$$

hence we have gained access to the virtual outputs Q, of two effective ideal IQ DIs, acting on the received field samples.

The input to our FR procedure will then be the ideal DI complexified output:

$$q_k = I_k + jQ_k = \qquad (0.5)$$
$$\operatorname{Re}\{\rho_k \rho_{k-1}^*\} + j\operatorname{Im}\{\rho_k \rho_{k-1}^*\} = \rho_k \rho_{k-1}^* = \rho_k \rho_{k-1} e^{j(\angle\rho_k - \angle\rho_{k-1})},$$

where $$I_k = \operatorname{Re}\rho_k \rho_{k-1}^* = \rho_k \rho_{k-1} \cos(\angle\rho_k - \angle\rho_{k-1})$$
$$Q_k = \operatorname{Im}\rho_k \rho_{k-1}^* = \rho_k \rho_{k-1} \sin(\angle\rho_k - \angle\rho_{k-1})$$

We are given the complex quantity $q_k$ (henceforth referred to as "DI output") which is a complex representation of the two ideally corrected DI outputs (for each of the polarizations). Evidently the sequence $q_k$ is a non-linear function of the field samples sequence $\rho_k$. We wish to reconstruct from $q_k$ the samples $\rho_k$ of the received optical field at the input to the splitter feeding the two DIs. In effect we wish to invert the non-linear mapping $\rho_k \rightarrow q_k$. The novel field reconstruction algorithms proposed here are strikingly simple to implement yet somewhat tricky to comprehend, especially regarding the impact of initial conditions.

a. FR Embodiment I Based on Recursive Complex Division

Figure 23:
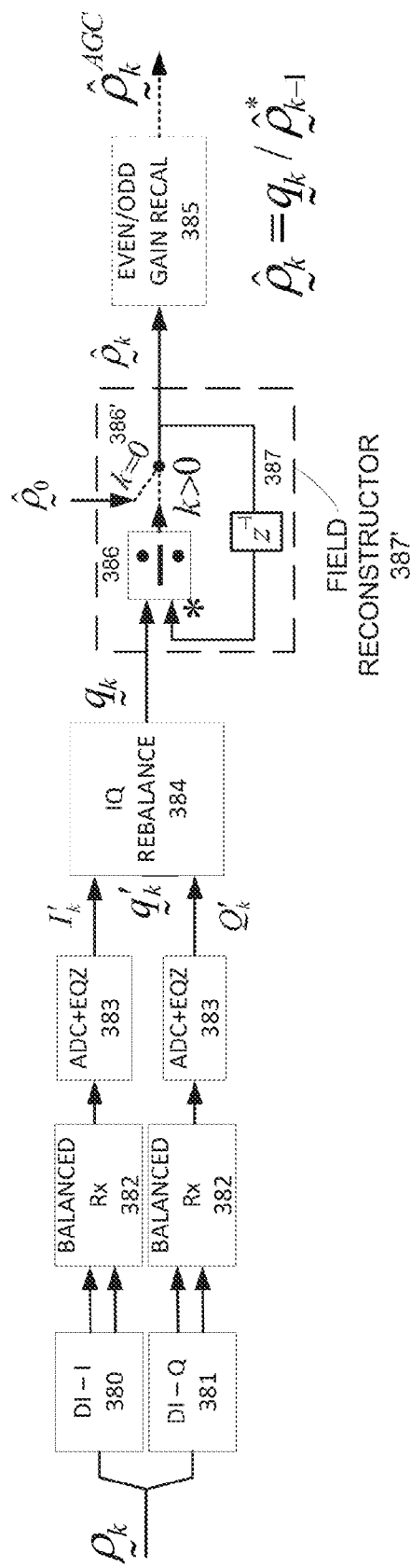

A first novel FR embodiment is shown in FIG. 23. The simple yet elusive key concept is that the field samples may be reconstructed by the following recursion, realizable just with a single complex conjugate divider (i.e. division of one complex number by the CC of another):

FR embodiment I:

$$\hat{\rho}_k = \frac{q_k}{\hat{\rho}_{k-1}^*}$$

with arbitrary initial condition $$\hat{\rho}_0$$

Where $$\hat{\rho}_k$$

denotes our estimate of the true $\underaccent{\tilde}{\rho}_k$. This recursion is simply obtained by solving for $\underaccent{\tilde}{\rho}_k$ in $q_k \equiv \underaccent{\tilde}{\rho}_k \underaccent{\tilde}{\rho}_{k-1}^*$, (but designating the $\underaccent{\tilde}{\rho}_k$-s by hatted quantities to emphasize that these are our estimates).

The treatment of initial conditions is somewhat tricky and will be elaborated, as it is key to the overall FR design. At first sight it seems that this algorithm must be strictly initialized with the proper initial condition $$\hat{\underaccent{\tilde}{\rho}}_0 = \hat{\rho}_0 e^{j \angle \hat{\rho}_0} = \underaccent{\tilde}{\rho}_0$$

(note: undertilde indicates a complex-valued quantity—removing the undertilde indicates the magnitude or modulus of the undertilded quantity). For now, let's assume we have both the magnitude and phase correct for the initial condition at k=0, i.e. we may precisely set $$\hat{\underaccent{\tilde}{\rho}}_0 = \underaccent{\tilde}{\rho}_0$$

(i.e. the initial condition $\underaccent{\tilde}{\rho}_{k\,0}$ is known to us by some magic means). Once properly initialized, it would be straightforward to see that the recursion (0.6) indeed reconstructs the field. The FR algorithm recursive steps are:

$$\hat{\underaccent{\tilde}{\rho}}_1 = \frac{q_1}{\hat{\underaccent{\tilde}{\rho}}_0^*}; \hat{\underaccent{\tilde}{\rho}}_2 = \frac{q_2}{\hat{\underaccent{\tilde}{\rho}}_1^*};$$

$$\hat{\underaccent{\tilde}{\rho}}_3 = \frac{q_3}{\hat{\underaccent{\tilde}{\rho}}_2^*} \dots \hat{\underaccent{\tilde}{\rho}}_k$$

$$= \frac{q_k}{\hat{\underaccent{\tilde}{\rho}}_{k-1}^*} \dots$$

Step-by-step starting with $$\hat{\underaccent{\tilde}{\rho}}_0 = \underaccent{\tilde}{\rho}_0$$

we have $$\hat{\underaccent{\tilde}{\rho}}_1 = \frac{q_1}{\hat{\underaccent{\tilde}{\rho}}_0^*}$$

$$= \frac{\underaccent{\tilde}{\rho}_1 \underaccent{\tilde}{\rho}_0^*}{\underaccent{\tilde}{\rho}_0^*}$$

$$= \underaccent{\tilde}{\rho}_1.$$

Next, $$\hat{\underaccent{\tilde}{\rho}}_2 = \frac{q_2}{\hat{\underaccent{\tilde}{\rho}}_1^*}$$

$$= \frac{\underaccent{\tilde}{\rho}_2 \underaccent{\tilde}{\rho}_1^*}{\underaccent{\tilde}{\rho}_1^*}$$

$$= \underaccent{\tilde}{\rho}_2, \dots$$

etc. So this algorithm works (assuming a genie magically provided the proper initial condition, $$\hat{\underaccent{\tilde}{\rho}}_0 = \underaccent{\tilde}{\rho}_0).$$

However, in practice there is no way to precisely know what the initial field sample $\underaccent{\tilde}{\rho}_{k\,0}$ should be, neither in magnitude nor in phase. Nevertheless, we show that even with arbitrary initialization, $$\hat{\underaccent{\tilde}{\rho}}_0 \neq \underaccent{\tilde}{\rho}_0,$$

we can nevertheless obtain a well-functioning end-to-end system.

We represent the initialization mismatch, i.e. the discrepancy between the initial condition arbitrarily assumed, and the actual initial condition, by the ratio $$g_0 \equiv \hat{\underaccent{\tilde}{\rho}}_0 / \underaccent{\tilde}{\rho}_0 \neq 1.$$

To assess the effect of a wrong initial condition, $$\hat{\underaccent{\tilde}{\rho}}_0 = g_0 \underaccent{\tilde}{\rho}_0,$$

which differs from the actual $\underaccent{\tilde}{\rho}_{k\,0}$ by the complex gain factor $g_0 \neq 1$, we use $q_k \equiv \underaccent{\tilde}{\rho}_k \underaccent{\tilde}{\rho}_{k-1}^*$, yielding step-by-step, for k=1, 2, 3, 4, . . . :

$$k = 1:$$

$$\hat{\underaccent{\tilde}{\rho}}_1 = \frac{q_1}{\hat{\underaccent{\tilde}{\rho}}_0^*}$$

$$= \frac{\underaccent{\tilde}{\rho}_1 \underaccent{\tilde}{\rho}_0^*}{g_0^* \underaccent{\tilde}{\rho}_0^*}$$

$$= \underaccent{\tilde}{\rho}_1 / g_0^*$$

i.e. we reconstructed the field at k=1 up to a complex factor $1/g_0^*$. Next, $k = 2$:

$$\hat{\rho}_2 = \frac{q_2}{\hat{\rho}_1^*}$$
$$= \frac{\rho_2 \rho_1^*}{(\rho_1/g_0)^*}$$
$$= \frac{\rho_2 \rho_1^*}{\rho_1^*/g_0}$$
$$= \rho_2/g_0$$

i.e. we now reconstructed the field at k=2 up to a different (inverse conjugate) complex factor $g_0$. Next, $k = 3$:

$$\hat{\rho}_3 = \frac{q_3}{\hat{\rho}_2^*}$$
$$= \frac{\rho_3 \rho_2^*}{(\rho_2 g_0)^*}$$
$$= \frac{\rho_3 \rho_2^*}{\rho_2^*/g_0^*}$$
$$= \rho_3/g_0^*$$

i.e. for k=3 we are back to reconstruction up to the $1/g_0^*$ as for k=1. Advancing one more step, $k = 4$: (0.7)

$$\hat{\rho}_3 = \frac{q_3}{\hat{\rho}_2^*}$$
$$= \frac{\rho_3 \rho_2^*}{(\rho_2 g_0)^*}$$
$$= \frac{\rho_3 \rho_2^*}{\rho_2^*/g_0^*}$$
$$= \rho_3/g_0^*$$

$$\hat{\rho}_4 = \frac{q_4}{\hat{\rho}_3^*}$$
$$= \frac{\rho_4 \rho_3^*}{(\rho_3/g_0^*)^*}$$
$$= \frac{\rho_4 \rho_3^*}{\rho_3^*/g_0}$$
$$= \rho_4 g_0$$

i.e. for k=4 we are back to reconstruction up to the $g_0$ factor as for k=2. The pattern is clear: odd samples are reconstructed up to $1/g_0^*$ whereas even samples are reconstructed up to $g_0$ (this claim may be readily formally proven by induction, for general k). Evidently, if we had $g_0=1$, i.e. we started with the correct initial condition, then we would have perfect reconstruction. However, when starting with an arbitrary initial condition, $g_0 \neq 1$, the even and odd polyphase subsequences are then seen to experience two distinct complex gains:

$$\{\hat{\rho}_0, \hat{\rho}_2, \hat{\rho}_4, \cdots, \hat{\rho}_{2k'}, \cdots\} = g_0\{\rho_0, \rho_2, \rho_4, \cdots, \rho_{2k'}, \cdots\}$$
$$\{\hat{\rho}_1, \hat{\rho}_3, \hat{\rho}_5, \cdots, \hat{\rho}_{2k'+1}, \cdots\} = g_1\{\hat{\rho}_1, \hat{\rho}_3, \hat{\rho}_5, \cdots, \hat{\rho}_{2k'+1}, \cdots\}$$

where $g_1 \equiv 1/g_0^*$

Interestingly, $$\angle g_1 = \angle\{1/g_0^*\} = \angle g_0 \equiv \gamma_0,$$

i.e. the reconstructed samples in both polyphases are identically phase-shifted with respect to the true phases, by the constant phase-bias $$\gamma_0 \equiv \angle g_0 : \angle \hat{\rho}_k = \angle \rho_k + \gamma_0, \quad k = 0, 1, 2, 3, 4, \ldots .$$

Thus, our FR recursion reconstructs the field samples up to a fixed phase-tilt $\gamma_0$, but the amplitudes alternate:

complex:

$$\{\hat{\rho}_0, \hat{\rho}_1, \hat{\rho}_2, \hat{\rho}_3, \cdots, \hat{\rho}_{2k'}, \hat{\rho}_{2k'+1} \cdots\} =$$
$$\{\rho_0 g_0, \rho_1/g_0^*, \rho_2 g_0, \rho_3/g_0^*, \cdots, \rho_{2k'} g_0, \rho_{2k'+1}/g_0^*, \cdots\}$$

magnitutudes:

$$\{\hat{\rho}_0, \hat{\rho}_1, \hat{\rho}_2, \hat{\rho}_3, \cdots, \hat{\rho}_{2k'}, \hat{\rho}_{2k'+1} \cdots\} =$$
$$\{\rho_0 g_0, \rho_1/g_0, \rho_2 g_0, \rho_3/g_0, \cdots, \rho_{2k'} g_0, \rho_{2k'+1}/g_0, \cdots\}$$

phases:

$$\{\angle\hat{\rho}_0, \angle\hat{\rho}_1, \angle\hat{\rho}_2, \angle\hat{\rho}_3, \cdots, \hat{\rho}_{2k'}, \hat{\rho}_{2k'+1} \cdots\} =$$
$$\left\{ \begin{array}{l} \angle\rho_0 + \gamma_0, \angle\rho_1 + \gamma_0, \\ \angle\rho_2 + \gamma_0, \angle\rho_3 + \gamma_0, \cdots, \rho_{2k'} + \gamma_0, \rho_{2k'+1} + \gamma_0, \cdots \end{array} \right\}$$

As our self-coherent system is based on differential precoding in the Tx and a generalized MSDD form of differential decoding in the Rx, the unknown but fixed phase-shift $\angle g_0 = \gamma_0$ added up to all reconstructed samples (stemming from phase error $\gamma_0$ of the initial condition, $$\hat{\rho}_0 = \rho_0 g_0 e^{j(\angle\rho_0 + \gamma_0)})$$

will be inconsequential. Indeed, our self-coherent system is based on differential encoding, and the phase-tilt $\gamma_0$ added up to all reconstructed samples, will cancel out, get de-rotated away, in our subsequent multi-symbol differential detection (MSDD) carrier recovery (CR) system. This is one instance of our claim that the FR functions not but itself but in conjunction with auxiliary systems such as the CR.

However, notice that successive samples magnitude and power wobbles relative to the true values of these samples, with all odd samples changing by $-20 \log_{10} g_o$ [dB] and all even samples changing by $+20 \log_{10} g_o$ [dB] in power. This oscillation of the reconstructed magnitudes (which is traced to discrepancy between the magnitude of the initial set condition in the FR algorithm and the true magnitude) is henceforth referred to as alternation effect. Hence, the optical field will then be reconstructed by the self-coherent front-end up to an arbitrary additive phase, however the reconstructed amplitudes will be alternating in magnitude relative to their true values. This alternation corresponds to having the even and odd polyphase subsequences of the reconstructed field samples $\rho_k^{FR}$ experience different gain factors. However, upon partitioning the field samples sequence into even and odd sub-sequences, it is seen that each of these two subsequences experiences scaling by a constant-over-time gain factor (though these two fixed gain factors are different between the even and odd subsequences). To mitigate the alternation effect, there are several alternatives to augment or enhance our FR system embodiment I:

An additional means to accurately initialize the recursion.

A means of recalibrating the resulting field-reconstructed sequence, as described below, where we explain how two gain factors, affecting the even and odd sub-sequences may be recalibrated.

Preferred: overall system architecture of the Tx and Rx not attempting to recalibrate the alternating even/odd gain factors in the FR, but correcting the two different gains in final CR stage, which is partition to separately process, in parallel the even and odd polyphase, and each polyphase CR sub-module is equipped with automatic gain control (ADC) capability, properly resealing the constellation prior to slicing (and CR polyphase is insensitive to fixed phase tilts). Indeed, the CR system disclosed in chapter [0048] has these capabilities, hence our FR as disclosed in this chapter works in conjunction with the FR disclosed in chapter [00182].

One issue with FR embodiment is that it requires immediate feedback. The output of the division operation depends on the value of the output one discrete-sample back. The current ASIC technology cannot run processing at clock rates exceeding 2 or 3 GHz, hence for high-speed optical transmission systems with sampling rates exceeding the ASIC clock-rates, it is impossible to provide the fast feedback, one sample back, as required in embodiment I. However, for slower systems, e.g. coherent PON systems, with baudrate of the order of 1 Gsym/sec, fast feedback is feasible. The following embodiments introduced in the next section progress towards lifting the immediate feedback limitation, enabling parallelization of the FR processing in order to enable its implementation on existing hardware.

We now introduce a family of alternative FR structures, which are based on the principle of generating field sample ratios (as presently defined) by feedforward processing of the DI outputs, $q_k$, followed by recursive multiplicative accumulation in order to reconstruct the field samples $\rho_{k\,k}$.

Let us first define field sample ratios (FSR):

$$\rho_{k\,k}^{\div(n)} = \rho_{k\,k} / \rho_{k\,k-n}^{*}$$

Having generated $\rho_{k\,k}^{\div(P)}$, there a way to recursively extract $\rho_{k\,k}$ out of it.

The generation of $\rho_{k\,k}$ from $\rho_{k\,k}^{\div(P)}$ is naturally amenable to partitioning into polyphase processing of order P. Indeed, the recursion $\rho_{k\,rP+p} = \rho_{k\,rP+p}^{\div(2)} \rho_{k\,(r-1)P+p}$ just involves samples of the n-th polyphase of the signals $\rho_{k\,k}$, $\rho_{k\,k}^{\div(2)}$.

There is one remaining problem to be addressed: the initial conditions $\{\rho_{k\,k}\}_{k=0}^{P-1}$ are generally not known precisely. Let us examine the impact of attempting the FR procedure above with imperfect, in fact arbitrary initial conditions.

It is apparent that the field samples belonging to the p-th polyphase (p=0, 1, 2, ..., P-1) subsequence are all identically scaled by a complex gain factor which is common to the whole polyphase. All elements of the p-th polyphase subsequence are scaled by a common factor equal to the complex scaling deviation $g_p$ associated with the p-th initial condition.

Our preferred alternative is to use a more integrated architecture, processing each of the polyphases of the FR output separately, yet in parallel, in the DSP chain following the FR, parallelizing the succession of Rx functions, namely CD equalization, PMD equalization+polarization demultiplexing, carrier recovery, interleaving the processing modules for each of these functions, acting in parallel on each the signal polyphases. It is known that CD and PMD equalization are readily amenable to polyphase decomposition. There was shown that our novel carrier recovery (CR) module is also parallelizable on a polyphase basis. Moreover, our adaptive carrier recovery also has a built-in AGC, properly resealing an arbitrarily scaled constellation (and automatically compensating for the constellation tilt and even spinning), e.g. as necessary for properly detecting a QAM constellation. As our parallelized CR separately acts on each of the polyphases, then the common complex gain $g_p$ of the p-th polyphase, is inconsequential, as it is calibrated away in the p-th polyphase sub-module of the CR.

To summarize, despite having each of the polyphases in the FR output affected by a generally different complex gains, we need to do nothing about it—there is no need to attempt to level out the various complex gains of each of the polyphases, as the subsequent processing all the way to and including our final CR stage, may be organized on a polyphase basis anyway. The various un-leveled gains of each polyphase of the reconstructed field sequence will linearly propagate through the subsequent linear processing all the way to the CR. Each polyphase in the CR will see a different complex gain, which will be compensated for by the phase derotation and AGC capability of the CR. This strategy for addressing the generally different gains experienced by each polyphase, is another key enabler in our overall system as proposed in this patent application.

Figure 29:
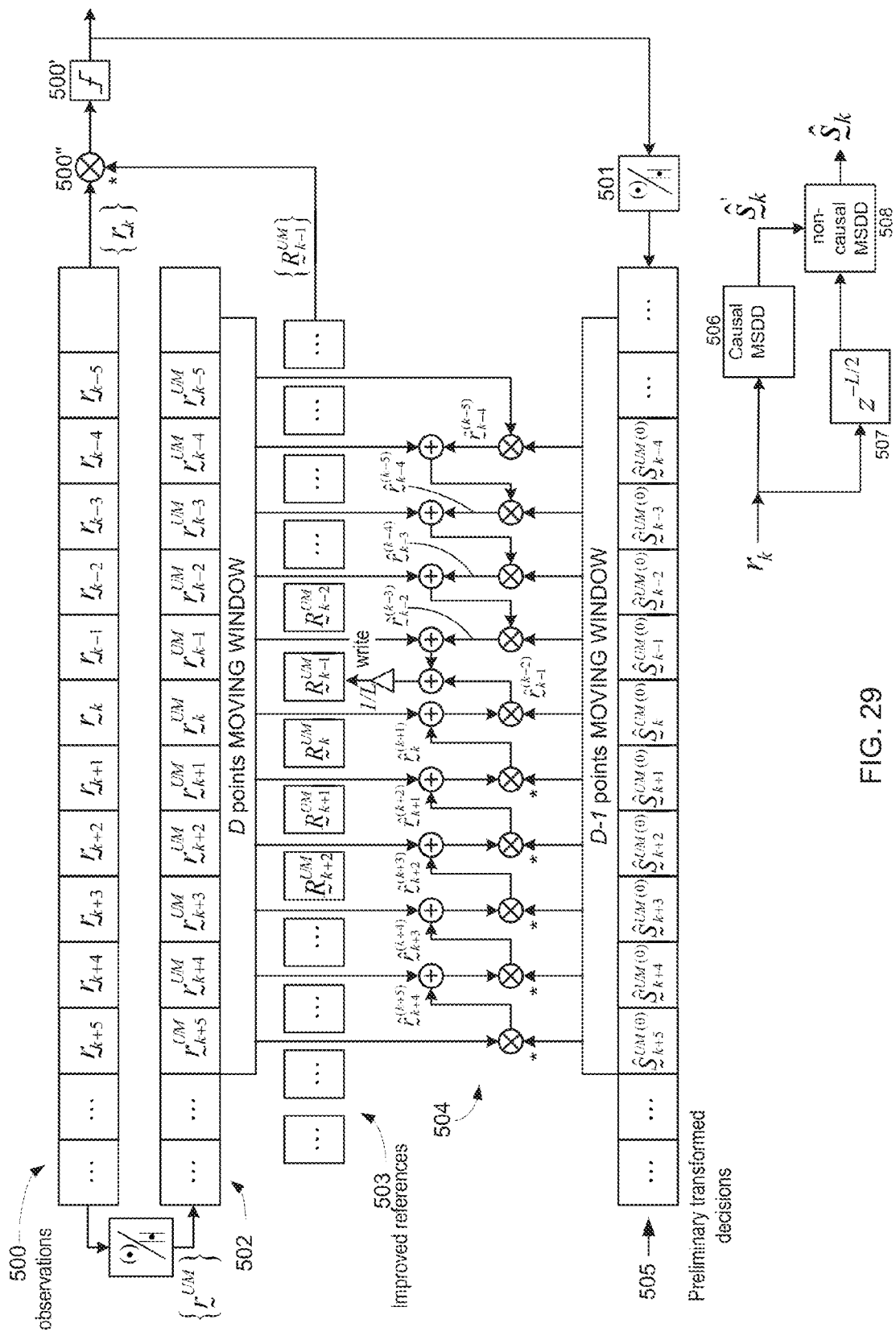
Figure 30:
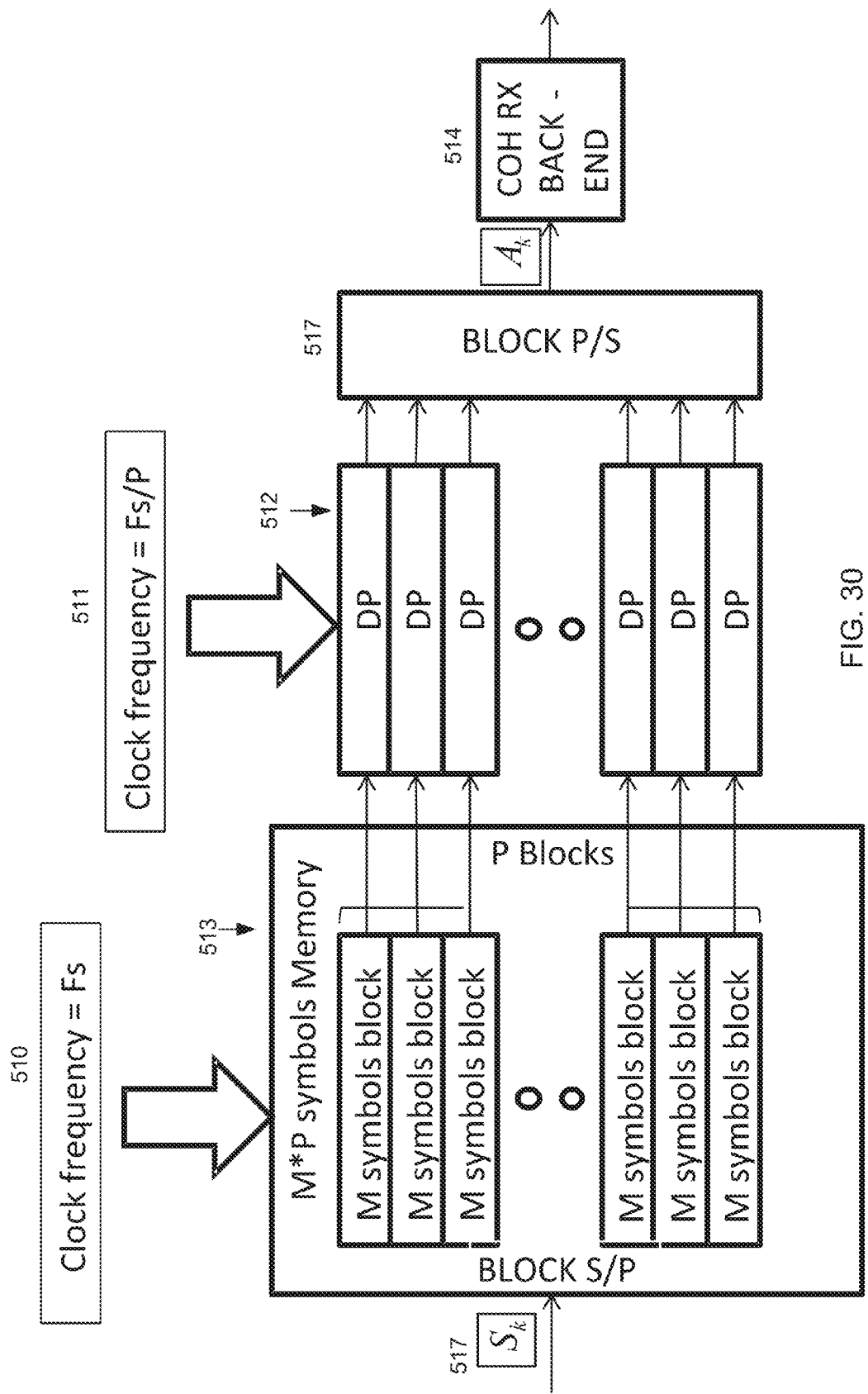
Figure 31:
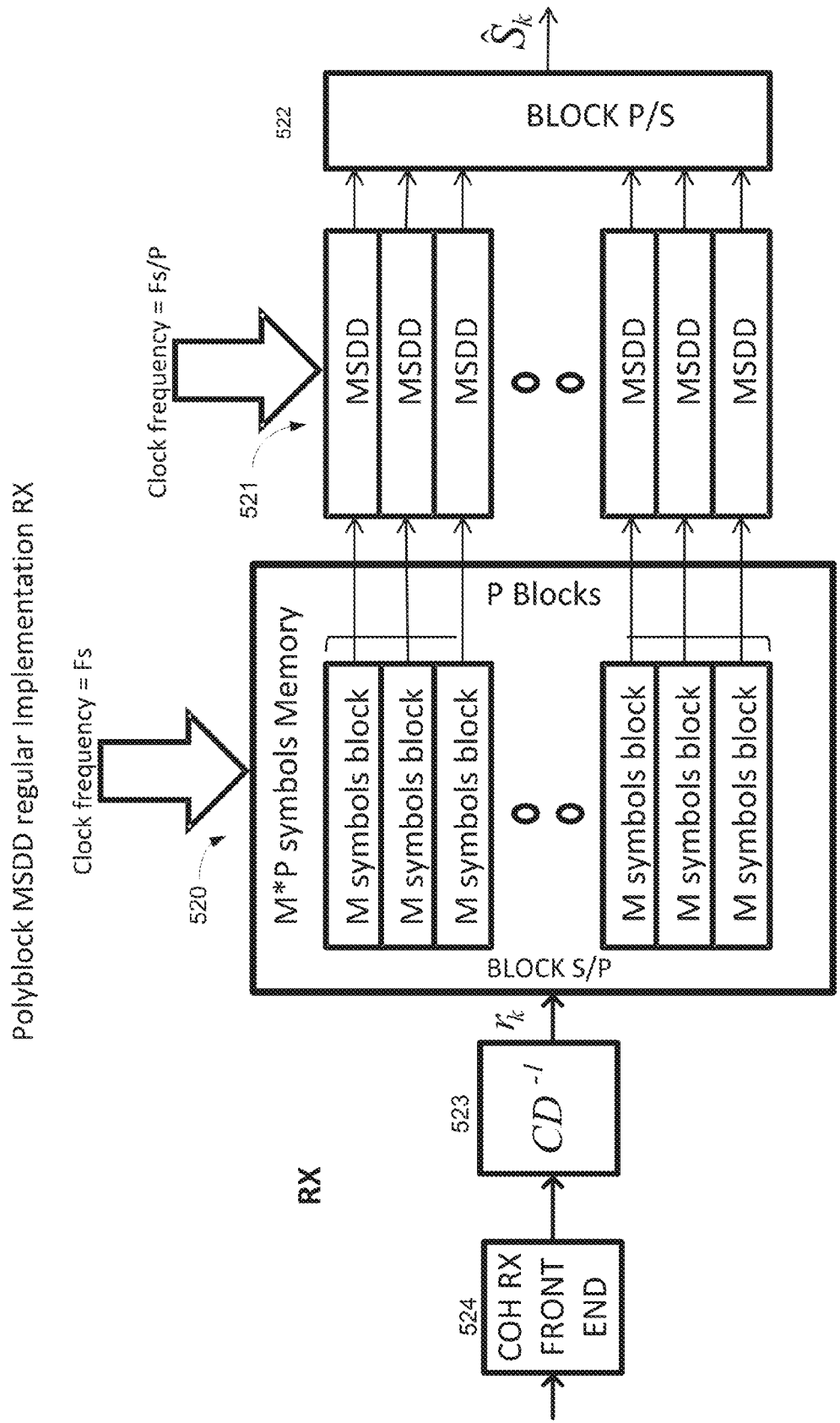

We next present several block diagrams implementing the mathematical relations just developed, resulting in the FR embodiments II-IV, as presented in FIGS. 29-31.

FR Embodiment II

Figure 24:
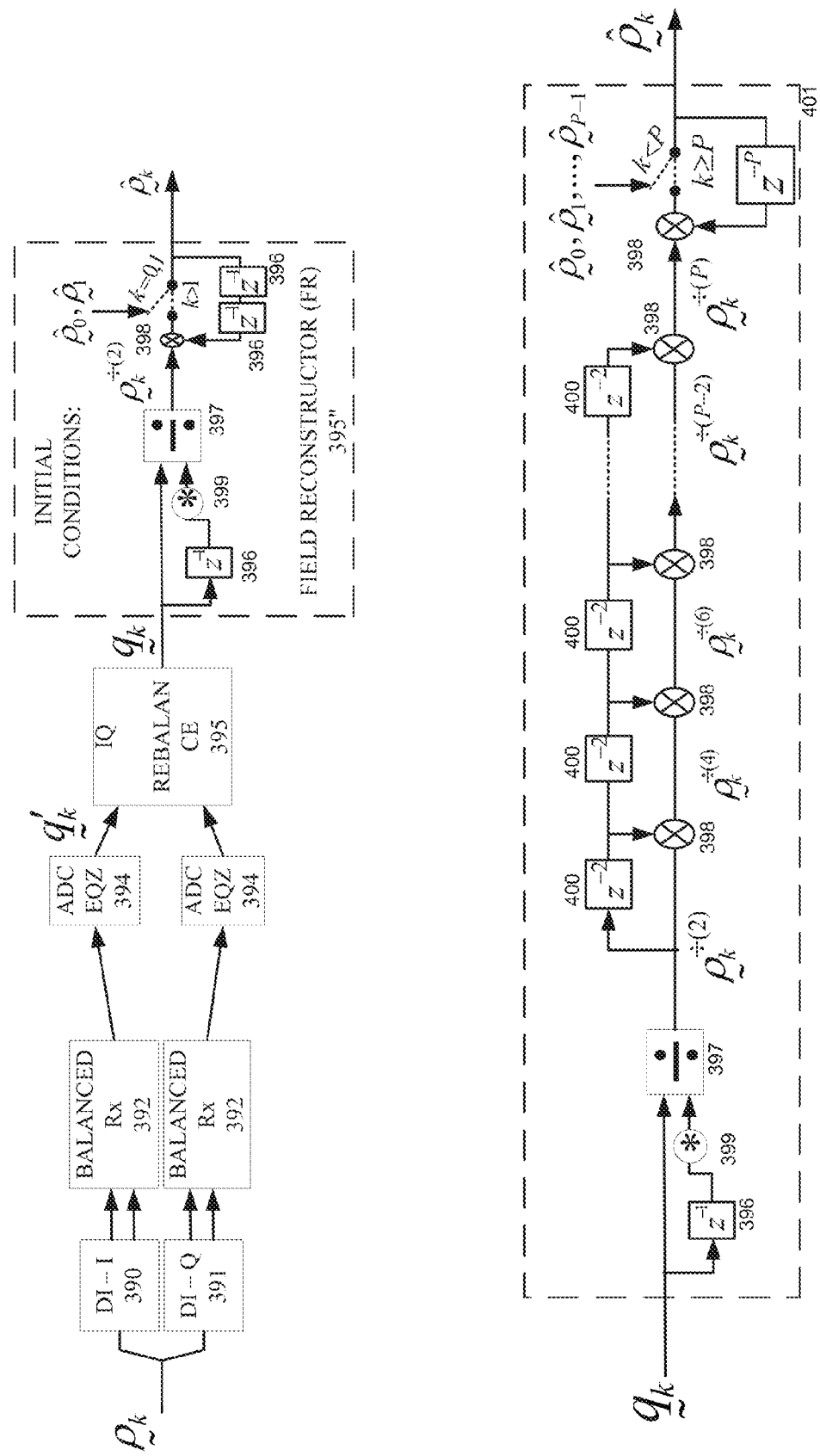

The simplest version is based on the second-order FSR (P=2): the resulting FR block diagram shown in FIG. 24, generates $$\rho_k^{\div(2)} = q_k / q_{k-1}^{*}$$

followed by $$\hat{\rho}_k = \rho_k^{\div(2)} \hat{\rho}_{k-2},$$

i.e. the overall algorithm is compactly expressed as follows:
FR embodiment II:

$$\hat{\rho}_k = \underbrace{(q_k/q_{k-1}^*)}_{\rho_k^{+(2)}} \hat{\rho}_{k-2}^*$$

with initial conditions, $$\hat{\rho}_0, \hat{\rho}_1.$$

As stated above, in order to level out the two different complex we can engage in per-polyphase parallelized processing in the processing modules following the FR, and activate a per-polyphase AGC algorithm, e.g. as built-in into our CR to perform each of the respective gains recalibration.

Rapid feedback limitation and its mitigation: A key disadvantage of FR embodiments I, II is that they requires "immediate feedback"—the multiplicative accumulator at discrete-time k takes as input a past value of its output, one or two time units back (discrete-time k−1 for embodiment I $$\hat{\rho}_k = q_k/\hat{\rho}_{k-1}^*$$

(FIG. 23) and discrete-time k−2 for embodiment II, $$\hat{\rho}_k^{FR} = \rho_k^{\div(2)} \hat{\rho}_{k-2}^{FR}$$

(FIG. 24)). Due to clock-speed limitations in DSP ASIC implementations, such rapid feedback may not be possible—the processing must then be partitioned into multiple (P) parallel modules, each P times slower, each of which essentially operates on one polyphase of the signal at a rate 1/P slower (with possible cross-links between the modules). The value of P must be chosen sufficiently large, such that the full sampling rate of the system, divided by P does not exceed the available DSP clock speed. With current ASIC technology at clock-speeds of the order of 3 GHz, this precludes embodiments I, II from being used for high-speed 100 Gb/s or faster applications, which require baud-rates and sampling rates of tens of Gsamp/sec. E.g. for a sampling rate of 30 GHz, P≥10 must be used, in particular, a value of P=16 may suffice and may be convenient.

FR embodiments III and IV eliminating "immediate feedback"

Embodiments III and IV as described in this sub-section, progress towards eliminating the "immediate feedback" limitation, allowing the system to operate with "distant feedback", providing feedback recursions wherein $$\hat{\rho}_k$$

is a function of $$\hat{\rho}_{k-P},$$

for as large a P as desired, at the expense of processing power (requiring more multipliers in the FR module).

FR embodiment III: The block diagram of FR embodiment III, is shown in Fig.

FR embodiment III:

$$q_k/q_{k-1}^* = \rho_k^{\div(2)}$$

$$\underbrace{\rho_k^{\div(2)} \rho_{k-2}^{\div(2)} \rho_{k-4}^{\div(2)} \cdots \rho_{k-2}^{\div(2)}}_{P/2} = \rho_k^{\div(P)}$$

24, $$\hat{\rho}_k = \rho_k^{\div(P)} \cdot \hat{\rho}_{k-P}$$

with initial conditions $$\{\hat{\rho}_{-p}\}_{p=0}^{P-1}$$

This embodiment is seen to be based on the "arithmetic" progression $\rho_k^{+(2)} \to \rho_k^{+(4)} \to \rho_k^{+(6)} \to \rho_k^{+(8)} \to \ldots$.

FR embodiment IV is our final one, based on generating $\rho_k^{+(P)}$ by means of FR embodiment IV:

$$q_k/q_{k-1}^* = \rho_k^{\div(2)}$$

$$\rho_k^{\div(2)} \rho_{k-2}^{\div(2)} = \rho_k^{\div(4)}; \rho_k^{\div(4)} \rho_{k-4}^{\div(4)} = \rho_k^{\div(8)}; \rho_k^{\div(8)} \rho_{k-8}^{\div(8)} = \rho_k^{\div(16)};$$

$$\rho_k^{\div(2^b)} \rho_{k-2^b}^{\div(2^b)} = \rho_k^{\div(2^{b+1})}$$

with initial conditions $$\{\hat{\rho}_{-p}\}_{p=0}^{P-1}$$

Figure 25:
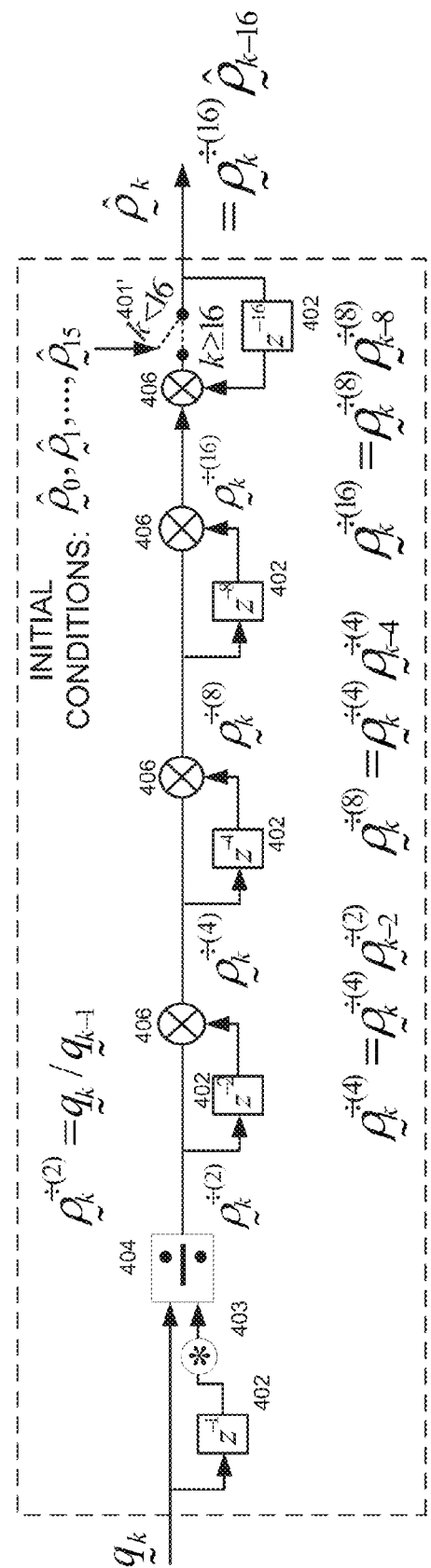

FR embodiment IV is implemented in the block diagram of FIG. 25, a more efficient one than FIG. 24.

Indeed, the "geometric" progression $\rho_k^{+(2)} \to \rho_k^{+(4)} \to \rho_k^{+(8)} \to \rho_k^{+(16)} \to \ldots$ saves multipliers, reaching the target $\rho_k^{+(P)}$ in fewer steps relative to using the "arithmetic" progression $\rho_k^{+(2)} \to \rho_k^{+(4)} \to \rho_k^{+(6)} \to \rho_k^{+(8)} \to \ldots$ in FR embodiment III.

Figure 26:
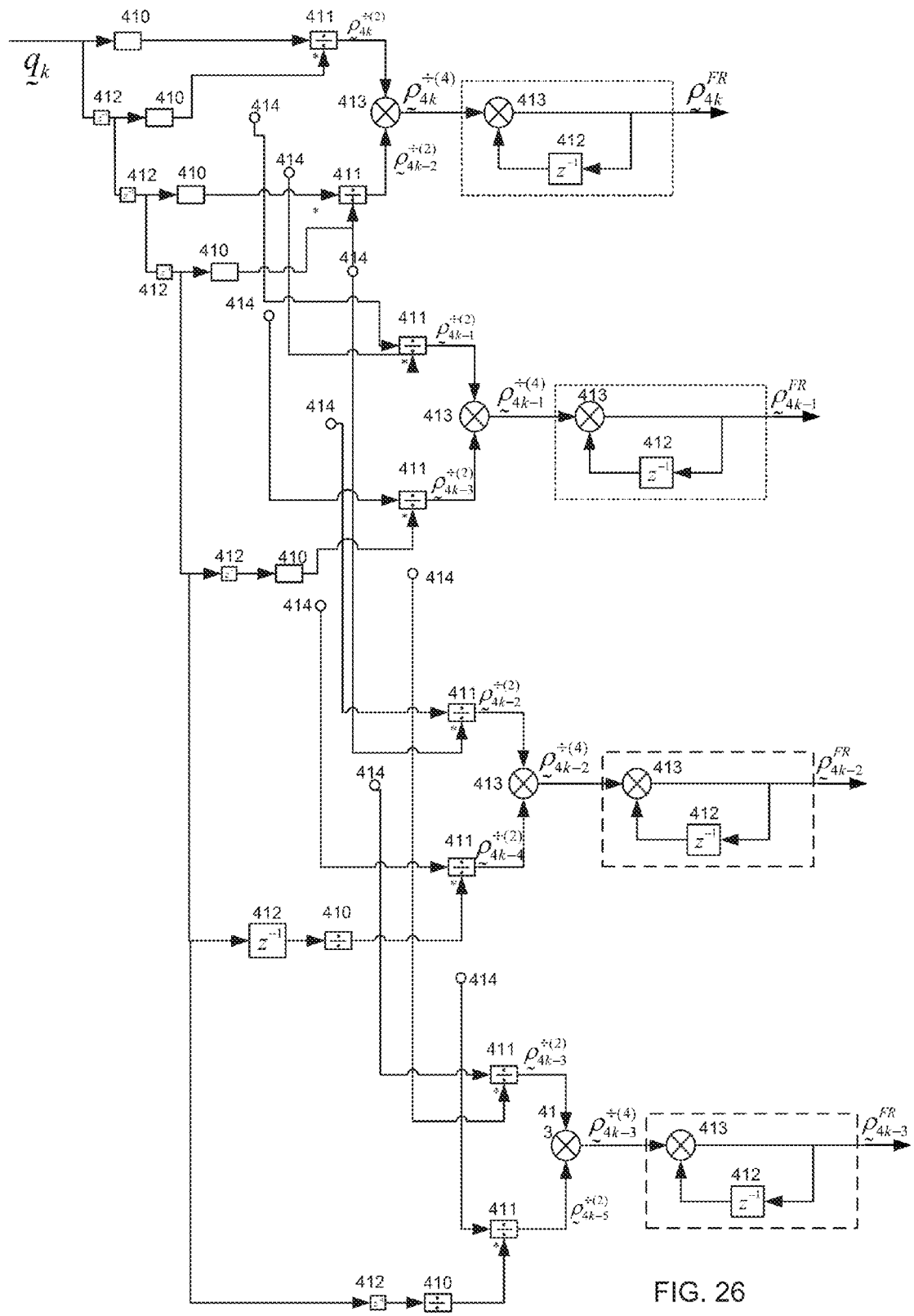

Polyphase parallelization: Both embodiments III and IV use a recursive multiplier with delay P, thus the recursive part may be readily partitioned into P slower parallel systems each operating with clock rate 1/P relative to the original system. In fact the polyphase partitioning may be extended to the full embodiment, not just the recursive divider, but also to the preceding feedforward parts. FIG. 26 describes a fully parallelized variant of FR embodiment IV, essentially having all its multipliers, dividers at clock-speed 1/P. The figure exemplifies the case P=4 (so as to keep the figure reasonably sized), but it can readily be generalized for any P. Notice that although the parallelized version in FIG. 26 contains many more elements than the full-speed version 31, but all the components in the parallelized version run P times slower, so the complexity (e.g. multiplications and divisions per unit time) is essentially the same.

Initialization: Notice that in all our FR embodiments the initial conditions may be taken arbitrary, e,g. for simplicity all initial conditions should be set to unity. It may be convenient to prepare the initial conditions such that the polyphases are not too different in their respective scaling factors. To this end it is preferred to initialize the FR at the tail of the single-tone training sequence, which ensures that the received field has nearly constant (unknown) amplitude. Initializing all initial conditions to unity, $$\hat{\rho}_{\sim p} = 1, \quad p = 0, 1, \ldots, P-1$$

ensures that the individual polyphase gains, $g_p$, become very nearly equal. The final per-polyphase AGC capability in the CR ensures that the gains are strictly made equal just prior to slicing, making slight adjustments to the CR adaptive coefficients, to this end.

Relative Complexity of FR embodiments III and IV: Counting complex multipliers (CM), for a polyphase order P=$2^b$ we require $\log_2 P - 1 = b - 1 = \log_2 (P/2)$ multipliers in the "geometric" version, vs. P/2 in the "arithmetic" version, i.e. the reduction in CM counts is by a factor $(P/2)/(\log_2(P/2))$, e.g. for P=16, we get a 2.66-fold reduction in the CMs. Besides reducing ASIC area and power, the reduction in the number of multiplier stages also moderates the buildup of numerical noise and the distortions associated with finite number representations, which are the only sources of imperfection in these proposed FR structures.

Preferred embodiment revisited: The last treated FR embodiment IV is our preferred one for high-speed systems, as it is both hardware efficient as well as amenable to parallelization, i.e. tolerant of distant feedback. FIG. 26 disclosed how the FR embodiment IV may be parallelized into processing of P polyphases in parallel. For lower-speed systems such as coherent PON, wherein distant feedback does not pose a limitation, we may prefer the lower complexity embodiment I, which is realized with just a single complex divider.

Note: The fact that the complex divider is recursive in embodiment I, while it is non-recursive in embodiment IV, might tilt the preference back to embodiment IV, as higher precision might be required of a recursive complex divider than of a recursive complex multiplier Numerical Accuracy Analysis of the FR Embodiments In order to keep numerical errors in check, it is necessary to use a sufficient number of bits in the computing elements, especially the divider in FR embodiment I and the last multiplier in the FR embodiments II-IV (these are the elements which participate in recursive feedback). We do not present a detailed evaluation of numerical accuracies, but such a calculation may be run as per conventional techniques of DSP analysis—here we just discuss the salient features, pointing out to why the overall scheme is feasible from the viewpoint of numerical accuracy.

What makes the problem easier is that we are not required to reconstruct the field over an ever increasing running record, but we are just required to retain field reconstruction accuracy over a moving window of duration of the order of the channel memory (e.g. several hundred symbols for a high-speed long-haul link), just sufficient to allow the subsequent CD equalization to run its course. Thus, the buildup of digital quantization noise due to the recursive circulation in the divider in FR embodiment I, or in the last multiplier in FR embodiments II-IV is limited to the processing window duration. The buildup of quantization noise at the recursive element (divider or multiplier) output is essentially linear in the number of number of recirculations through the recursive element, as each recirculation adds its quantization noise of the fed-back delayed output, to that of the fresh input into the recursive element, i.e. the quantization noise powers are additively accumulated. E.g. if we are required to retain accuracy over a window of 256 samples, then that would correspond to 8 bits to be provisioned extra to the initial accuracy required of the input (e.g. if the initial accuracy is 10 bits, then 18 bits accuracy may be required). We conclude that the most critical element is the recursive one, either the divider in embodiment I or the last multiplier in embodiments II-IV, for which some excess bits must be provided to counteract the quantization noise accumulation in the recursive re-circulations. However, the argument above did not account for the fact that the system is parallelized. When the processing (or at least the last recursive element) is partitioned into P polyphases, the extra number of bits required to the recirculation is reduced by $\log_2 P$ (e.g. 4 bits less for P=16), the reason being that for a window of W symbols (say W=256), and when operating with P polyphases (say P=16), there are just W/P points in each polyphase, i.e. the number of recirculations is reduced by a factor of P. E.g., if the initial accuracy is 10 bits, then 14 bits of accuracy may be required for the single recursive element. This provides yet another reason why partition the processing into polyphases.

Finally, we note that in either of the FR embodiments (each of which contains one complex divider), the divider accuracy is degraded whenever the input values get to be too low To prevent division overflow (or exception when dividing by zero), very low or null input values will have to be limited and replaced by a threshold value. In the rare event when this overflow/exception occurs, e.g. near a null for the optical field, the FR procedure may need to be reinitialized, and special care must be taken to fill up the interrupted record, e.g. interpolate the field, while excluding null or under-the-threshold values.

All the mentioned above FR embodiments are extremely robust to gain errors and they all respond to fixed phase errors in the DI output by generating a fixed frequency offset at the FR output (analogous to having the Tx and LO lasers offset in frequency, in the coherent case), Fortunately, a fixed or slowly varying FO is readily taken out by our MSDD CR. Thus, the combination of FR and MSDD CR is robust to both gain and phase errors.

Optional Polyphase Gains Recalibration in the Recursive FR Module

Notice that for QAM detection, an unknown gain, multiplying all reconstructed field samples, $$\hat{\rho}_k,$$

would matter, therefore some "Automatic Gain Control" (ACG) means must be provided even if the amplitudes do not oscillate. We have seen that such AGC capability is available within the final carrier-recovery (CR) stage, by virtue of its adaptive algorithm which tends to converge to minimum mean square error between estimated samples and the transmitted ones. Hence it suffices that the reconstructed field sequence $\hat{\rho}_k^{FR}$ (FR module output) enter the CR with a constant (even if unknown) gain, relative to the actual field, as this unknown gain constant will be calibrated out by the ACG capability of the final CR stage.

In more detail, we have shown in the last two sections that in our proposed FR embodiments the various polyphase components of the reconstructed field $\hat{\rho}_k^{FR}$ are each affected by generally different and unknown complex-gain factors, each such scaling factor or gain factor common to all terms of a particular polyphase sub-sequence. Let $\{\hat{\rho}_{rP+p}^{FR}\}$ be the p-th polyphase sub-sequence of $\hat{\rho}_k^{FR}$, where p=1, 2, ..., P (i.e. assuming a decomposition into P polyphases). Then, $\{\hat{\rho}_{rP+p}^{FR}\}=g_p\{\rho_{rP+p}^{FR}\}$, p=0, 1, ..., P−1.

That the complex gains $g_1, g_2, \ldots, g_p$ for each of the polyphases of the reconstructed field are generally different and unknown. To address the recalibration of these generally different complex gain factors, affecting the various polyphases, we may resort to two alternative strategies:

Gain Recalibration Strategy I: We recalibrate all the gain factors to a common gain factor $g_c$ (in effect re-scaling the p-th polyphase by a factor $g_c/g_p$, such that $g_p \cdot g_c/g_p = g_c$). If the gain factors $g_p$ all had a common phase, i.e. $\angle g_p = \gamma_c$, p=0, 1, ..., P−1 then this gain recalibration would be relatively easy to achieve by means of a CMA-like AGC circuit, as exemplified below. In particular, this is the case for FR embodiment I (namely all polyphases experience a common phase-shift $\gamma_c$), as for this embodiment P=2, i.e. there are just two polyphases, the p=0 even and the p=1 odd one, and we have $\angle g_0 = \angle g_1 = \gamma_c$ since $g_1 = 1/g_0^*$ (but generally the even and odd polyphases have different magnitude gains, $g_0 \neq g_1$). Hence, for FR embodiment I, we disclose below, an optional even/odd recalibration system. Thus, in this case, we just need to recalibrate the magnitude gains, as there is a common phase anyway. Gain magnitudes recalibration is accomplished by a CMA-like AGC LMS algorithm, as described further below. This strategy may be useful for a generic system wherein the FR module is required to produce a precise reconstructed sequence (up to a common constant gain factor affecting all its samples, in case the system is not endowed with gain fecal strategy II capabilities, as discussed further below). However, if the FR module is not required to be generic, the re-calibration functionality may be removed from the FR and ported to subsequent sequences, which is our approach as described under the next strategy.

Gain Recalibration Strategy II: We adopt an overall system design of the Tx and Rx, wherein the processing is parallelized, concurrently performed for each of the P polyphases of the transmission and reception signal, for a suitable P value. Such an approach is helpful from an implementation point of view, given the speed limitations of ASIC DSP processing. It turns out that our MSDD based CR system is amenable to such polyphase parallelization or polyphase interleaved processing. We also mentioned that our CR system has built-in AGC capabilities, i.e. it can receive its input signal scaled by an arbitrary unknown complex gain (i.e. scaled in magnitude and rotated in phase), and readily de-rotate the phase tilt, and AGC-recalibrate the magnitude, such as the QAM slicer receives a properly re-scaled constellation. Given that our FR imparts unleveled gains to the various polyphase, and since our CR structure is amenable to polyphase-parallelization, and since each polyphase has its own AGC capability, then it follows that each FR polyphase gain may be separately and independently corrected in gain by the built-in AGC capability of the CR, hence the issue of having generally different complex gains for the various polyphases is actually automatically resolved upon adopting a polyphase parallelized design for the whole system, including our CR embodiments.

Returning to strategy I above, if we are given a particular polyphase sub-sequence of the reconstructed field sequence, $\hat{\rho}_k^{FR}$ (more specifically either the even or odd polyphases of FR embodiment I) it is our task to remove the magnitudes alternation effect, i.e. recalibrate the magnitude scalings to a fixed value. One approach towards achieving the gain recalibration strategy I is to use a Constant Modulus Algorithm (CMA) AGC module right after the FR, resealing the even and odd subsequences to a fixed scale factor, as described next:

CMA AGC for Resealing an Arbitrarily Scaled Sequence

Assume the single-tone training sequence is used, such that the DI output sequence $q_k$, as reconstructed at the IQR stage output would be constant in the absence of noise. Now, the p-th field-reconstructed polyphase sequence with either of our embodiments, may be generally written as $$\hat{\rho}_k^{FR(p)} = g_p \rho_k^{(p)}, \quad p = 0, 1, \ldots, p-1,$$

(with the number of polyphases P, and the scaling gains $g_p$ possibly varying from one FR embodiment to the next). Here the polyphase subsequence $\rho_k^{(p)}$ is formally obtained by delaying and sub-sampling the full sequence of field samples:

$$\rho_k^{(p)} = \downarrow M\{\rho_{k-p}\} \cong \downarrow M\{\underline{H}_c \underline{A}_{k-p}^{cal}\} = \downarrow M\{\underline{H}_c e^{j\theta_c(k-p)}\} = \underline{H}_c e^{-j\theta_c p} \downarrow M\{e^{j\theta_c k}\} = \underline{H}_c e^{-j\theta_c p} e^{j\theta_c Mk}$$

i.e. the p-th polyphase of the received field is also a single-tone signal with a certain magnitude and phase scaling. It follows that so is p-th reconstructed polyphase sequence (it is also a single-tone signal):

$$\hat{\rho}_k^{(p)} = g_p \rho_k^{(p)} = g_p \underline{H}_c e^{-j\theta_c p} e^{j\theta_c Mk}.$$

Ideally, i.e. ignoring the noise, the magnitude of $$\hat{\rho}_k^{FR(p)}$$

is constant, $$|\hat{\rho}_k^{FR(p)}| = |g_p \underline{H}_c|.$$

In practice, upon sending the single tone training sequence, the magnitude $$|\hat{\rho}_k^{(p)}|$$

of the p-th polyphase $$\hat{\rho}_k^{(p)}$$

of the reconstructed field is almost constant, just perturbed by noise, however its magnitude scaling $|g_p \underline{H}_c|$ is unknown (depending on both the unknown optical channel and the ratio of the arbitrarily selected p-th initial condition and true p-th initial condition). We intend to recalibrate this unknown magnitude to a fixed constant (but unknown) value, that is nevertheless the same constant over all polyphases.

Even/Odd Gain Recalibration Embodiment: To accomplish gains recal, we introduce a polyphase AGC module, to be cascaded at the output of the FR algorithm. So, the idea is that once the two arbitrary initial conditions are set in the recursion of FR embodiment I, two generally different gains are induced onto the even and odd polyphases. After initialization of the FR algorithm, we first transmit the single-tone training sequence, then we switch to an information sequence. As a fixed gain factor affects each polyphase, we reset the two polyphase gains to new values which will offset the original different gains of the two polyphases. If we transmit a constant field signal at the Rx input, then after the gains recalibration, a constant field reconstructed sequence will be obtained. While the two gains recalibration of the two polyphases, is accomplished during the training sequence, the two obtained gain corrections are retained when the training sequence ceases and the information sequence arrives. This then solves the uneven gains problem. The polyphases-AGC module may be based on a recursive algorithm (with two possible embodiments described below) to be separately applied to each of the (two) polyphases, operating on the $$\hat{\rho}_k^{(p)}, \quad p = 0, 1$$

with a single time-varying real-valued tap, bringing the modulus to unity over the duration of the single-tone training sequence (details of AGC implementation further below).

The Tx launches its single-tone training sequence and the Rx sets arbitrary initial conditions for the FR recursion and commences its field reconstruction over the duration of the training sequence. The FR output (for each even/odd polyphase separately) is fed into a separate AGC stage, acting on each polyphase, normalizing each of the polyphases to unity end-to-end gain, over the duration of the training sequence. The two converged AGC gains are then retained for each of the two polyphases, the two respective coefficients are frozen and are henceforth applied over the next period of time, during which the training sequence is followed by an information sequence at the Tx. When the next training sequence arrives, the process is repeated.

Denoting the output of the gain-recalibration module by $$\hat{\rho}_k^{(p)AGC}, \quad p = 0, 1,$$

the proposed CMA algorithm is as follows: Ideally, if the channel were memoryless and of unity gain, once we launched the single-tone training sequence $e^{j\theta_c k}$, we would receive the same at the FR output, i.e. the modulus of $$\hat{\rho}_k$$

and of each of the polyphases $$\hat{\rho}_k^{(p)}$$

would be unity. In CMA we are aiming for achieving a specified modulus at the algorithm output, $$\hat{\rho}_k^{(p)AGC}$$

here, so let's aim for unity modulus (or modulus squared), and define the error as the deviation between the target squared modulus and the actual squared modulus.

The proposed CMA-AGC algorithm is summarized as follows:

$$\hat{\rho}_k^{(p)AGC} \equiv \sqrt{C[k]}\, \hat{\rho}_k^{(p)};$$

$$C[k] = C[k-1] + \mu \underbrace{[1 - C[k-1]|\hat{\rho}_{k-1}^{(p)AGC}|^2]|\hat{\rho}_{k-1}^{(p)AGC}|^2}_{\varepsilon[k-1]}$$

Figure 33:
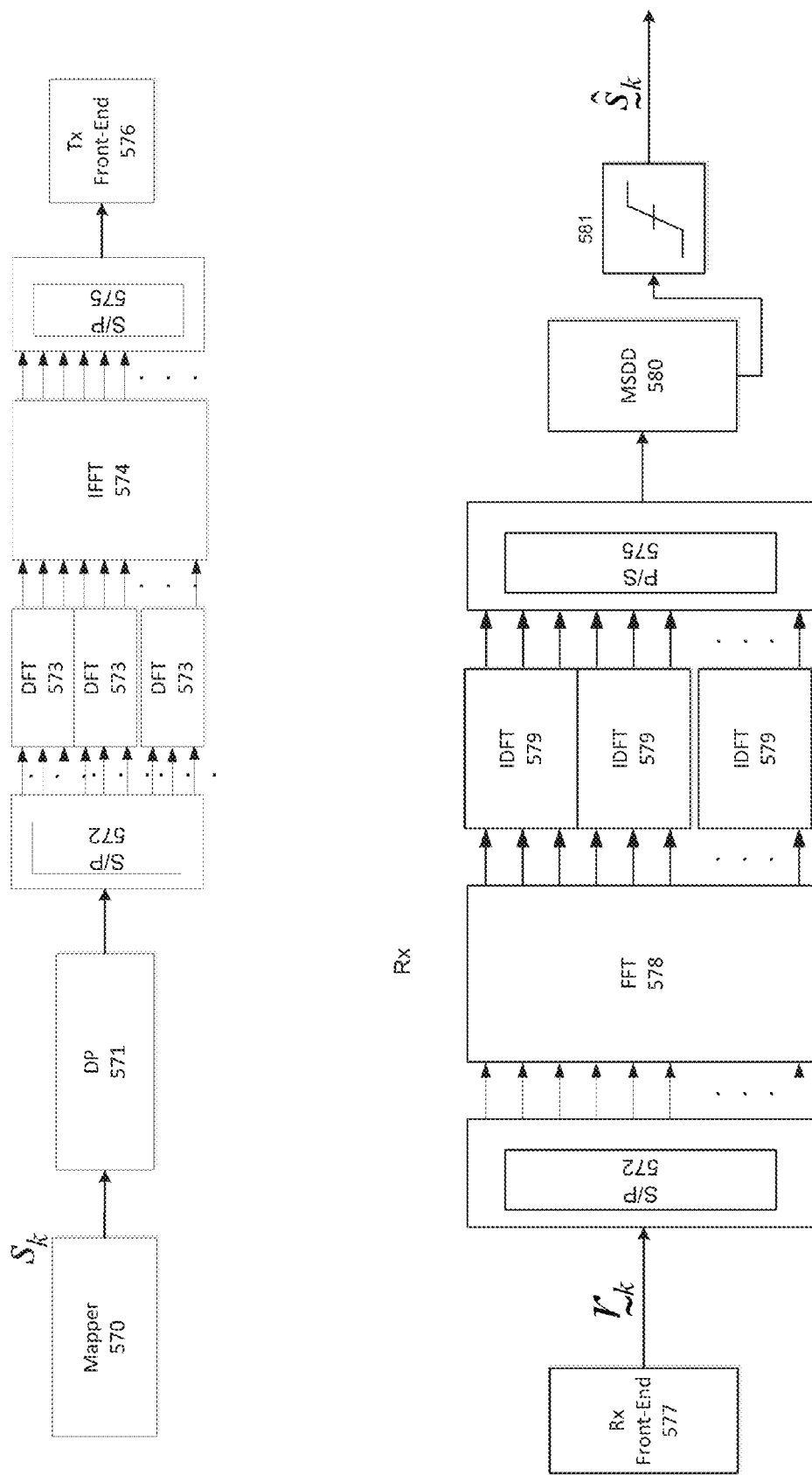

This CMA algorithm is shown in block diagram in FIG. 33. A slightly different variant is obtained by using magnitude gain $c[k] \equiv \sqrt{C[k]}$ rather than the power gain, yielding the following CMA-AGC variant:

$$\hat{\rho}_k^{(p)AGC} \equiv c[k]\hat{\rho}_k^{(p)};$$

$$c[k] = c[k-1] + \mu \underbrace{[1 - (c[k-1])^2|\hat{\rho}_{k-1}^{(p)AGC}|^2]|\hat{\rho}_{k-1}^{(p)AGC}|^2}_{\varepsilon[k-1]} c[k-1]$$

This algorithm, avoids the square root but has two extra multipliers by $c[k]$.

We reiterate that the CMA-AGC recalibration is solely applicable to the FR embodiment I and is optional for it, as we may elect to operate instead with gain-recal strategy II, as outlined above, delegating the gains recal task to the AGC capability of each of the CR polyphases). If we use gain recalibration strategy II above, the even-odd gain recal sub-module may be dropped when using the FR embodiment I. Again, this embodiment may then either use an even-odd gain recal sub-module or not use it at all, depending on the overall design of the rest of the Rx (and the Tx).

For FR embodiment I the even and odd polyphase have a common phase angle, but it remains to recalibrate the magnitude gain factors for the two even and odd subsequences. The CMA-AGC operates just during the training interval, during which the single-tone training sequence is transmitted, but then its converged gain is retained for information sequence processing. At one point (discrete-time $k_{conv}$) at the end of the training interval, the CMA-AGC algorithm will have converged. At this point the gain coefficient $c[k_{conv}]$ or $C[k_{conv}]$ is frozen and the Tx reverts to transmitting information rather than training symbols, but now, using the converged gain coefficient, the even and odd subsequences are affected by identical gains (although the common scaling value is not known).

However, we remark that it is not feasible at all to use the "even-odd gain recal" algorithm for FR Embodiments II, III or IV, as there is not a single common phase to all the polyphase gain factors, i.e. $\angle g_p$ do not generally coincide for the various $p=0, 1, 2, \ldots, P-1$. Therefore, while it is possible to apply "polyphase gain recal" based an the CMA-AGC, only the magnitudes $g_p$ of the complex gains $\underline{g}_p$ are leveled out by this algorithm, but the phases end up generally different (the polyphase phases are determined by the relation between the initial conditions adopted, e.g. all initial conditions unity, and the actual field samples at $k=0$, thus the polyphase phases are unknown). This indicates that upon using FR embodiments II, III, IV we are precluded from using gain recalibration strategy I, rather our only option is to resort to gain recalibration strategy II in this case, taking care of each distinct polyphase common gain and each distinct common phase in the CR module, which ought to be parallelized in this case, i.e. be made to operate on the distinct polyphases in parallel, with the common gain and common phase of each polyphase being recalibrated separate in each of the polyphase modules of the CR. We conclude that for Embodiments II, III, IV recalibration strategy II is the only option, while for Embodiment I we have the choice of using either strategy I or II.

Alternative heuristic gain recal methods may be envisioned for gain recalibration (further to our CMA AGC embodiments). E.g., while sending a constant magnitude (say unity magnitude) training-sequence, we may take the average of the reconstructed rho-s magnitudes of the even/odd polyphases over a portion of the training sequence, and use the inverse of the mean magnitude as a normalizing factor (bringing the magnitude to unity over the rest of the training sequence), but then freeze that multiplicative normalizing factor for each polyphase and continue to use it with information symbols as well.

SC detection: OE tuning of the IQ DIs, driven by the IQR+MSDD CR

In this section we present an opto-electronic control system tuning the parameters (phase bias and gain) of each of the two I and Q DIs used in the self-coherent front-end in order to minimize IQ imbalance. Such DI tuning (DIT) system should operate in conjunction with our disclosed IQR and MSDD CR, in effect alleviating the amount of imbalance correction to be applied by the IQR, and reducing in advance the FO seen by the MSDD CR. The DI tuning system disclosed here is also useful at acquisition time, when the IQ interferometers must be tuned to a reasonable initial state, such that the IQR may commence functioning within a reasonable range of parameters. The rough concept is to estimate the DI imbalance parameters from either the IQR or from a related identification system (as described below, working in conjunction with the IQR), then based on these estimates of the IQ imbalance, to provide negative feedback to the two DIs (i.e. feed bias values tending to reduce the imbalances). The process may either be iterated, or the system may start from the DI the parameters acquired by the DIT, and the IQR can track it further. If large deviations develop again, the IQR may sense it and re-activate the DIT re-tuning. The MSDD CR also participates by feeding an estimate of the frequency offset, in addition to or in lieu of the IQR.

Notice that the tuning procedure for the DIs in the self-coherent front-end, as presented below, is the counter-part of the LO laser tuning procedure by the O-E PLL, as described in section [00122]. in the sense that a digital system is used in both cases, to correct for imperfections in the analog opto-electronic front-end. The DI tuning procedures might be especially useful in situations in which the IQ imbalance gets excessive, which may exact an SNR penalty in the IQ-rebalance process.

We present three related approaches for extracting the DI parameters in order to tune the DIs:

Parallel approach: Adaptive system identification of the IQ-imbalance.

Series approach: System ID from the IQR compensator.

Opto-electronic LMS approach.

Both DIT approaches sense the state of the DIs during training sequence periods and use this state information to provide negative feedback to the DIs. Prior to discussing these two embodiments, let us describe a unit which they both share which we call the DI feedback actuator.

DI feedback actuator (DI-FA)

This is a unit which takes the estimates $$\hat{\underline{g}}_{avg}, \hat{\underline{g}}_\Delta$$

of IQ-imbalance coefficients, which are obtained from the adaptive system identification (SYS-ID) embodiments (i), (ii), (iii) to be further described below, and based on the complex parameters $$\left|\hat{\underline{g}}_{avg}\right|, \hat{\underline{g}}_\Delta,$$

it generates the physical parameters required to actually tuned the IQ DIs. Actually, the angle $$\gamma_{avg} = \angle \hat{\underline{g}}_{avg}$$

is obtained not from the adaptive control system but rather from the MSDD CR, as explained next. Following that, we further explain how $$\left|\hat{\underline{g}}_{avg}\right|, \hat{\underline{g}}_\Delta$$

and $\gamma_{avg}$ are mapped into three physical parameters, a gain imbalance and the two bias phases of the two DIs, which are physically actuated onto the opto-electronic hardware.

$$\underline{g}_{avg} = \frac{1}{2}e^{j\gamma_{avg}}(g_I e^{j\gamma_\Delta} + g_Q e^{-j\gamma_\Delta})$$
$$= \frac{1}{2}e^{j\gamma_{avg}} g_I(e^{j\gamma_\Delta} + g_\div e^{-j\gamma_\Delta})$$
$$\underline{g}_\Delta = \frac{1}{2}e^{j\gamma_{avg}}(g_I e^{j\gamma_\Delta} - g_Q e^{-j\gamma_\Delta})$$
$$= \frac{1}{2}e^{j\gamma_{avg}} g_I(g_I e^{j\gamma_\Delta} - g_\div e^{-j\gamma_\Delta})$$

where in the last expression the IQ imbalance parameters were expressed in terms of the following real-valued gain ratio:

$$g_+ \equiv \frac{g_Q}{g_I}$$

We wish to generate the physical parameters $g_+$, $\gamma_\Delta$, $\gamma_{avg}$ and from them also generate $\gamma_I = \gamma_{avg} + \Delta_\Delta$; $\gamma_Q = \gamma_{avg} - \gamma_\Delta$.

Let us start with the common phase term $\gamma_{avg}$. This term will not be estimated from the actual DI outputs but from the MSDD CR as explained next:

Estimation of the Common Phase Term $\gamma_{Avg}$ Using the MSDD CR

We now show how to extract, from the MSDD CR, the $e^{j\gamma_{avg}}$ term appearing in $\underline{g}_{avg}$. Indeed, when the IQR system is converged, we have, to a good approximation, $q_k = q_k e^{j\gamma_{avg}}$.

Under all FR embodiments I-IV, a frequency-offset is generated in each of the polyphases of the reconstructed field $$\hat{\underline{\rho}}_k = \underline{\rho}_k e^{jP\gamma_{avg}k},$$

as shown there. Significantly, this frequency offset in self-coherent detection is the direct manifestation of the common phase error of the two I and Q DIs, akin to the FO generated when the LO drifts in frequency relative to the Tx laser in coherent detection. While our MSDD is capable of compensate this FO, the alternative is to estimate the FO and feed it back to the DIs. A frequency offset estimator (FOE) subsystem which detects the frequency offset, implemented by either of the PD or FD embodiments described in section [00122], can then provide an estimate of $P\gamma_{avg}$, using either of several alternative embodiments based on auxiliary outputs provided by the MSDD CR, either the signals $$\overline{s}_{k-1}, \overline{\underline{s}}_{k-1} (\text{or } \overline{\underline{s}}_{k-1})$$

or the converged coefficients $c_i[k_{conv}]$ during training periods.

It follows that the DIT system estimates or has access to the three salient physical parameters describing the DIs IQ imbalance, namely $g_+$, $\gamma$, $\gamma_{avg}$. Feedback corrections may now be applied as follows:

The feedback compensation for $g_+ \neq 1$ is best applied as a gain in the digital domain (unless it is excessive and it is then worth applying it in the analog domain, by an analog electronic variable gain or attenuation). In the digital domain the correction is simply achieved by scaling $Q_k'$ at the output of the ADC connected to the Q-DI, by the factor $g_+^{-1}$ (i.e. divide by $g_+$). Alternatively, and more conveniently, we may instead scale $I_k'$ at the output of the ADC connected to the I-DI, by the multiplicative factor $g_+$ (as multiplication is less complex than division).

As for the angular biases corrections to the DIs, as we estimated both $\gamma_{avg}$ and $\gamma_\Delta$, we can readily reconstruct $\gamma_I$, $\gamma_Q$ by: $\gamma_I = \gamma_{avg} + \gamma_\Delta$; $\gamma_Q = \gamma_{avg} - \gamma_\Delta$.

Having obtained our estimates the IQ imbalance parameters, $\gamma_I$, $\gamma_Q$ we apply the opposite biases $-\gamma_I$, $-\gamma_Q$ to the two physical bias phase control ports of the I and Q DIs. This completes the opto-electronic tuning procedure for the DIs.

Extract physical parameters $g_+$, $\gamma_\Delta$, $\gamma_{avg}$ from complex parameters $$\hat{\underline{g}}_{avg}, \hat{\underline{g}}_\Delta$$

(which are in turn estimated by the adaptive control system):

Actually, any complex common gain is inconsequential, which suggests $$\underline{g}_{\Delta/avg} \equiv \frac{\underline{g}_\Delta}{\underline{g}_{avg}} = \frac{e^{j\gamma_\Delta} - g_\div e^{-j\gamma_\Delta}}{e^{j\gamma_\Delta} + g_\div e^{-j\gamma_\Delta}} = \frac{1 - g_\div e^{-j2\gamma_\Delta}}{1 + g_\div e^{-j2\gamma_\Delta}} = \left.\frac{1-z}{1+z}\right|_{z=g_\div e^{-j2\gamma_\Delta}}$$

We see that the phase term $e^{j\gamma_{avg}}$ got cancelled out upon taking the ratio, however we may extract this phase term from the MSDD CR as explained above. On the other hand, the complex ratio $$\hat{\underline{g}}_{\Delta/avg} \equiv \hat{\underline{g}}_\Delta / \hat{\underline{g}}_{avg}$$

may be evaluated from the converged LMS, assuming that we obtained $$\hat{\underline{g}}_\Delta, \hat{\underline{g}}_{avg}$$

the adaptive SYS-ID (and also recall that it suffices to estimate $$\hat{\underline{g}}_{avg}$$

without common phase factor term $e^{j\gamma_{avg}}$). It is apparent that it is possible to solve the last equation for $g_+$ and $\gamma_\Delta$ in terms of the complex ratio $\underline{g}_{\Delta/avg}$, as the complex-valued equation above amounts to two real-valued equations in terms of its real and imaginary parts. A more elegant approach can include calculating $$g_{\div} e^{-j2\gamma_\Delta} \equiv z = \frac{1 - g_{\Delta/avg}}{1 + g_{\Delta/avg}},$$

and then expresses the complex-valued RHS expression in polar form, to extract:

$$g_{\div} \equiv \left| \frac{1 - g_{\Delta/avg}}{1 + g_{\Delta/avg}} \right|;$$

$$\gamma_\Delta = -\frac{1}{2} \angle \left\{ \frac{1 - g_{\Delta/avg}}{1 + g_{\Delta/avg}} \right\};$$

$$g_{\Delta/avg} \equiv g_\Delta / g_{avg}$$

While these operations involving complex division, absolute value and angle (argument) extraction, are seemingly complex, please recall that the time scale over which they need to be evaluated is very slow, of the order of 10 msec (the shorter of the times over which the Tx laser may drift and so would the difference mode imbalances on the two DIs) hence the processing, estimating the imbalance parameters, contributes negligible complexity.

DI Tuning Embodiment I—Parallel Approach—LMS SYS-ID

During training with single-tone, we actually know, up to a constant, the $$\left[ q_k^{cal}, \overline{q}_k^{cal} \right]^T$$

vector, where it was seen that with the single tone excitation as training sequence, we know that the ideal virtual DI output is $$\underline{q}_k^{cal} \propto e^{j\theta_c}$$

or precisely $$\underline{q}_k^{cal} = |H_c|^2 e^{j\theta_c}$$

So, let's ignore the gain factor uncertainty, and emulate the virtual DI output with a scale factor set to unity (with the hat denoting that this is an emulation):

$$\hat{\underline{q}}_k^{cal} = e^{j\theta_c},$$

then input this into a system digitally emulating our imbalanced IQ DIs (with coefficients to be iteratively determined). The emulation system (with quantities denoted by hats) generates the following WL combination: emulation IQ—imbalance model:

$$\hat{q}_k^{\prime cal} = \hat{g}_{avg}[k] \underline{q}_k^{cal} + \hat{\overline{g}}_\Delta[k] \overline{\underline{q}}_k^{cal} = \left[ \hat{g}_{avg}[k] \; \hat{\overline{g}}_\Delta[k] \right] \begin{pmatrix} e^{j\theta_c} \\ e^{-j\theta_c} \end{pmatrix}$$

This model essentially emulates the actual DIs IQ-imbalance physical model actual IQ—imbalance model:

$$q_k^{\prime cal} = g_{avg} q_k^{cal} + \overline{g}_\Delta \overline{q}_k^{cal} = \left[ g_{avg}[k] \; \overline{g}_\Delta \right] \begin{pmatrix} q_k^{cal} \\ \overline{q}_k^{cal} \end{pmatrix} = \left[ g_{avg}[k] \; \overline{g}_\Delta \right] \begin{pmatrix} |H_c|^2 e^{j\theta_c} \\ |H_c|^2 e^{-j\theta_c} \end{pmatrix}$$

The emulation system output $$\hat{q}_k^{\prime cal}$$

is then compared with the actual received $$\hat{q}_k^{\prime cal}$$

at the output of the physical IQ DIs, and an error signal $$\varepsilon[k] = q_k^{\prime cal} - \hat{q}_k^{\prime cal}$$

is generated. The emulation system coefficients $$\hat{g}_{avg}[k],$$

$$\hat{g}_\Delta[k]$$

are adjusted by a WL LMS algorithm driven by the error, such as to minimize the SE corresponding to the deviation between the actual and simulated IQ-imbalance system outputs (i.e. to make the emulation faithful). This WL LMS algorithm discussed above, however, the main difference is that, in a conceptual block diagram, this algorithm operates in parallel to the actual IQ imbalance system, rather than in series to it, corresponding to parallel system identification (somewhat similar to adaptive echo cancellation), rather than series equalization. The objective of the LMS SYS-ID algorithm is to steer the coefficients such as to minimize the squared error between the actual measured output $$q_k^{\prime cal}$$

of the IQ-imbalance system to be estimated (associated with the physical DIs) vs. the emulated output $$\hat{q}_k^{\prime cal}$$

of the simulation system:

$$|\varepsilon[k]|^2 = |q_k'^{cal} - \tilde{q}_k'^{cal}|^2 = \left|q_k'^{cal} - \left(\hat{g}_{avg}[k]\hat{q}_k^{cal} + \hat{\bar{g}}_\Delta[k]\bar{\hat{q}}_k^{cal}\right)\right|^2$$

or $$|\varepsilon[k]|^2 = |q_k'^{cal} - e^{j\theta_c}|^2 = \left|q_k'^{cal} - \left(\hat{g}_{avg}[k]e^{j\theta_c} + \hat{\bar{g}}_\Delta[k]e^{-j\theta_c}\right)\right|^2$$

Here, in this system identification context, it is a bit subtle, but $q_k'^{cal}$, the actual measured output of the IQ-imbalance system to be system-identified, that plays the role of "desired" signal (estimation target—as we want to identify it, make the emulation system generate an output approaching the desired $q_k'^{cal}$ (physical DIs output) as then the internal parameters of the emulation system will be like those of the actual system. Moreover, here $$\hat{q}_k^{cal}, \bar{\hat{q}}_k^{cal}$$

play the role of "observations" (quantities entering the linear estimate formation), but since we do not have direct access to them (we do not know their scale factor), we use instead scaled versions of the actual observations:

$$\left[\hat{q}_k^{cal}, \bar{\hat{q}}_k^{cal}\right] = [e^{j\theta_c}, e^{-j\theta_c}]$$

Note: It is a also bit subtle that $$\hat{q}_k^{cal} = e^{j\theta_c}$$

plays the role of one of the "observations" (though it has a gain error with respect to the true observation) but also the role of desired signal in the LMS IQR. The other "observation" is the conjugate of $$\hat{q}_k^{cal} = e^{j\theta_c}.$$

The coefficients update equation is then obtained from an evaluation of the SE gradient:

$$\left[\hat{g}_{avg}[k+1] \; \hat{g}_\Delta[k+1]\right] = \left[\hat{g}_{avg}[k] \; \hat{\bar{g}}[k]\right] + \mu\varepsilon[k][\bar{q}^{cal}, q_k^{cal}]$$

After operating over the duration of the training sequence, this WL LMS algorithm finally converges its coefficients $$\left[\hat{g}_{avg}[k_{conv}] \; \hat{\bar{g}}[k_{conv}]\right]$$

to closely mimic the actual IQ imbalance channel coefficients $$\left[g_{avg}[k_{conv}] \; \bar{g}[k_{conv}]\right],$$

we ought to have, to a very good approximation:

$$\left[\hat{g}_{avg}[k_{conv}] \; \hat{\bar{g}}[k_{conv}]\right] \cong \left[g_{avg}[k_{conv}] \; \bar{g}[k_{conv}]\right]$$

Thus the SYS-ID runs the LMS algorithm, determines its converged coefficients $$\left[\hat{g}_{avg} \; \hat{\bar{g}}\right] \equiv \left[\hat{g}_{avg}[k_{conv}] \; \hat{\bar{g}}[k_{conv}]\right]$$

obtaining estimates of the IQ-imbalance parameters of the physical DIs (with these estimated parameters denoted by hats, as opposed to the actual ones).

From here we may generate physical parameters and tune the DI system as explained above. As the estimated parameters are very close to the actual parameters Various estimates can be provided and be injected with opposite sign, i.e. apply $-\hat{\gamma}_I, -\hat{\gamma}_Q$ in the phase bias phase control ports of the I and Q DIs, respectively. The output of the DIs is still acted upon by the IQR, but the work of the IQR is relieved by having this preliminary correction at the physical level.

a. DI Tuning Embodiment II—Series Approach—Inverting the IQR Matrix

The argument here is approximate, but it gets precise in asymptotically high SNR. The idea is to attempt to identify the IQ-imbalance channel not directly but based on the converged IQR transfer matrix which operates on the IQ-imbalance "channel" matrix in cascade to compensate for it. In the noiseless case, the LMS procedure outlined for the IQR would precisely converge to the inverse of the IQ imbalance matrix, hence if we converge the IQR transfer matrix and then invert it, we obtain an estimate of the IQ imbalance matrix, from which may extract the physical parameters as above.

We have seen that the LMS IQR implementation was simplified by using a MISO formulation rather than the MIMO formulation, since the MISO row of two coefficients is just the top row of the 2×2 MIMO matrix, whereas the bottom row of the MIMO matrix is just the conjugate permuted of the top row. However, the conceptual analysis is made easier here if the full 2×2 MIMO matrix formulation is used. The equivalence of the MIMO and MISO approaches may readily be established by writing the full WL MIMO matrix relations and taking the upper rows or elements in each matrix or vector.

In high SNR, the 2×2 coefficients matrix tends to the inverse of the IQ-imbalance matrix. In the converged steady-state $$\begin{pmatrix}\hat{q}_k \\ \bar{\hat{q}}_k\end{pmatrix} = \begin{pmatrix}C_{11}[k_{conv}] & C_{12}[k_{conv}] \\ C_{21}[k_{conv}] & C_{22}[k_{conv}]\end{pmatrix}\begin{pmatrix}q_k' \\ \bar{q}_k'\end{pmatrix};$$

$$\begin{pmatrix}q_k' \\ \bar{q}_k'\end{pmatrix} = \begin{pmatrix}g_{avg} & g_\Delta^* \\ g_\Delta & g_{avg}^*\end{pmatrix}\begin{pmatrix}q_k \\ \bar{q}_k\end{pmatrix}$$

-continued $$\begin{pmatrix} \hat{q}_k \\ \hat{\bar{q}}_k \end{pmatrix} = \underbrace{\begin{pmatrix} C_{11}[k_{conv}] & C_{12}[k_{conv}] \\ C_{21}[k_{conv}] & C_{22}[k_{conv}] \end{pmatrix}}_{C[k_{conv}]} \underbrace{\begin{pmatrix} g_{avg} & g_\Delta^* \\ g_\Delta & g_{avg}^* \end{pmatrix}}_{g} \begin{pmatrix} q_k \\ \bar{q}_k \end{pmatrix}$$

The optimal solution in high-SNR makes the estimate vector coincide with the input vector (zero error) yielding $$C^{MISO}[k] = [C_{11}[k_{conv}] \quad C_{12}[k_{conv}]] = \begin{bmatrix} g_{avg}^* & -g_\Delta^* \end{bmatrix}$$

Thus, we run our WL MISO IQR algorithm as usual, obtain the converged coefficients $C_1[k_{conv}], C_2[k_{conv}]$ and from them we generate our estimates of the complex DI parameters, as follows:

$$\hat{g}_{avg} = C_1^*[k_{conv}]; \hat{g}_\Delta = -C_2^*[k_{conv}]$$

From here we proceed by generating the complex ratio $$\hat{g}_{\Delta/avg} \equiv \hat{g}_\Delta / \hat{g}_{avg},$$

$$g_{\Delta/avg} = -\left(\frac{C_2[k_{conv}]}{C_1[k_{conv}]}\right)^* = \frac{1 - g_\pm e^{-j2\gamma_\Delta}}{1 + g_\pm e^{-j2\gamma_\Delta}}$$

From which we extract the physical parameters $\hat{g}_+$ and $\hat{\gamma}_\Delta$, using the DI feedback actuator. The physical parameters $\hat{g}_+$ and $\hat{\gamma}_\Delta$, are then fed back with negative signs, as in DIT embodiment I.

DI Tuning Embodiment III—Opto-Electronic Adaptive LMS

Another approach is to make the physical system part of the adaptive LMS control system and tune the physical parameters by the LMS algorithm (going through DACs to map from digital to analog), in which case we do not feed opposite phases but just feed $\gamma_I[k], \gamma_Q[k]$ which keep converging over k to the correct values (which minimize the error between the actual DI output and our commanded/desired output).

IQ Hybrid Front-End Tuning for Coherent Systems

Analogously to the principles and formulas used here for a self-coherent system, that the model for IQ-imbalance and the IQ-rebalance procedure for coherent detection is similar to that for self-coherent detection, then it is possible to design a system, fed by the IQR stage, to feed back to the hybrid front-end of the coherent system, in particularly tuning the relative phase with which the two I and Q LOs are mixed with the incoming signal.

Reduced Complexity MSDD with Constant Coefficients

We have seen that our proposed MSDD structure with L variable coefficients (taps) which are adjusted by an adaptive mechanism, is capable of reducing both phase fluctuations and carrier frequency offset (CFO) in the received signal. However, having L complex multipliers at the line-rate is still heavy in terms of complexity. In this sub-section we consider reduced complexity MSDD embodiments in which all L taps are set to the same value (say 1/L). As all taps are equal, it suffices to apply trivial unity taps, i.e. simply sum up the rotated symbols, then apply the common tap value in a single real-valued multiplier (say 1/L). This "uniform taps" structure, replacing the L complex taps by a single multiplier, is evidently very efficient in terms of hardware complexity, but it experiences some performance degradation relative to the full adaptive version with L complex multipliers. For relatively narrow linewidth lasers (100 KHz) and 16-QAM transmission, the performance degradation is very small, yet the savings in complexity is substantial.

Now, there may be multiple embodiments of "uniform taps" MSDD as shown in FIGS. 1-5 that represent variant 0, variant 1, variant 2, variant 3, and variant 4.

In FIG. 1 we disclose a uniform taps MSDD for QPSK. Here the only non-trivial multiplier is the demodulator (DE-MOD). The multipliers by the QPSK symbols (+/−1 and +/−j) are trivial, and the multiplier by 1/L is also trivial or may be completely eliminated, as a linear scaling of the overall constellation does not affect QPSK detection. Thus, this QPSK MSDD version may be described as multiplier-free (not counting the multiplier used for demodulation, which is not considered part of the MSDD CPE).

Figure 2:
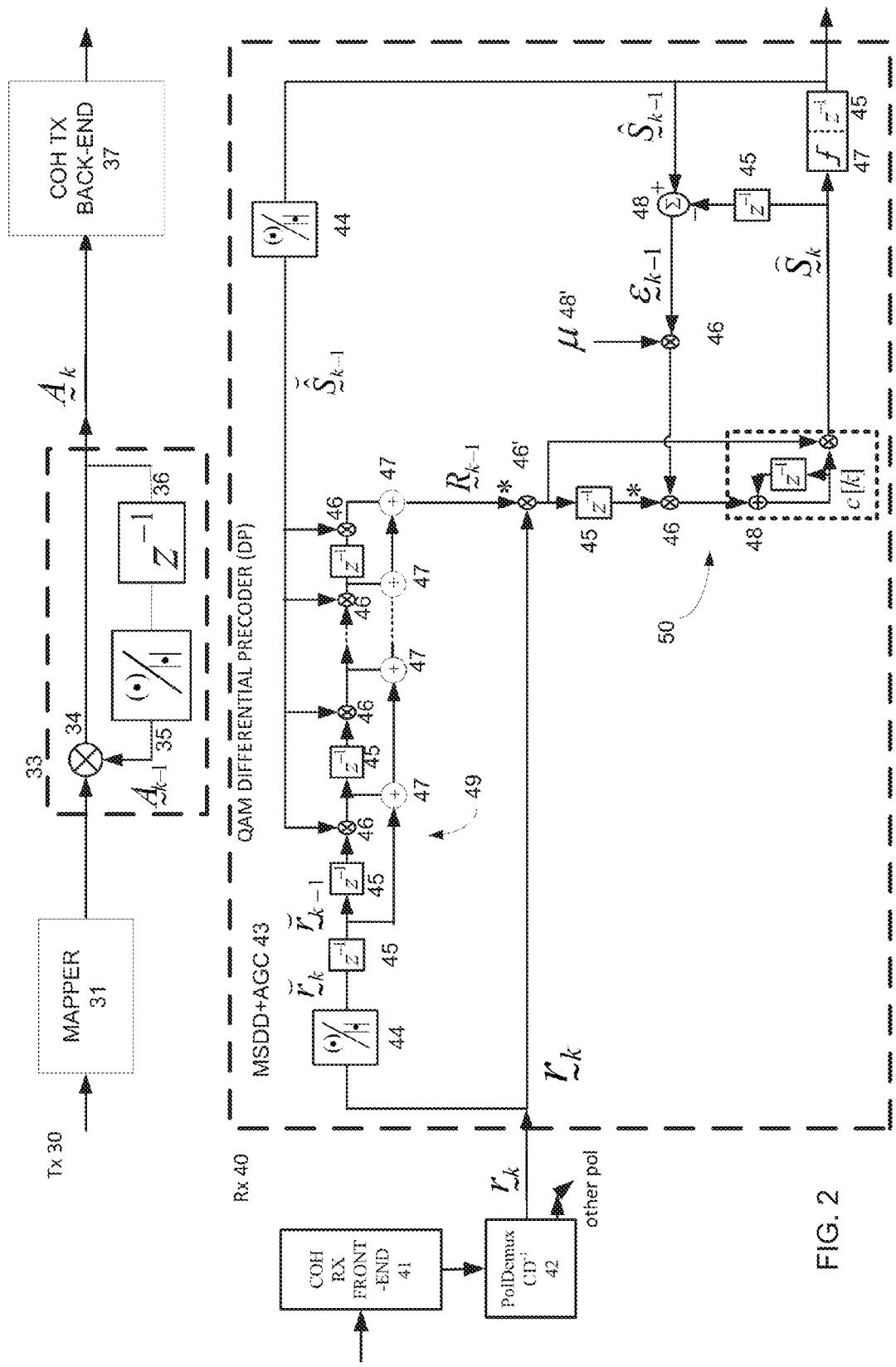

In FIG. 2 we disclose an adaptive uniform taps "U-notU" MSDD for QAM. Here the Uop normalization is applied as shown, onto the received signal, but there is no additional normalization ("notU") on the improved reference. Here, a single tap replaces the L taps of the previous MSDD version, but we make this tap adaptive, adjusting its value by an LMS adaptive algorithm as described in the figure, acting on the estimation error, which is shown to be evaluated based on the decisions (a version based on training sequence or on a combination of training sequence and decisions, is also possible). The objective of the adaptive tap adjustment is essentially provision of Automatic Gain Control capability, properly scaling the constellation size to match the fixed decision boundaries of the slicer.

Figure 3:
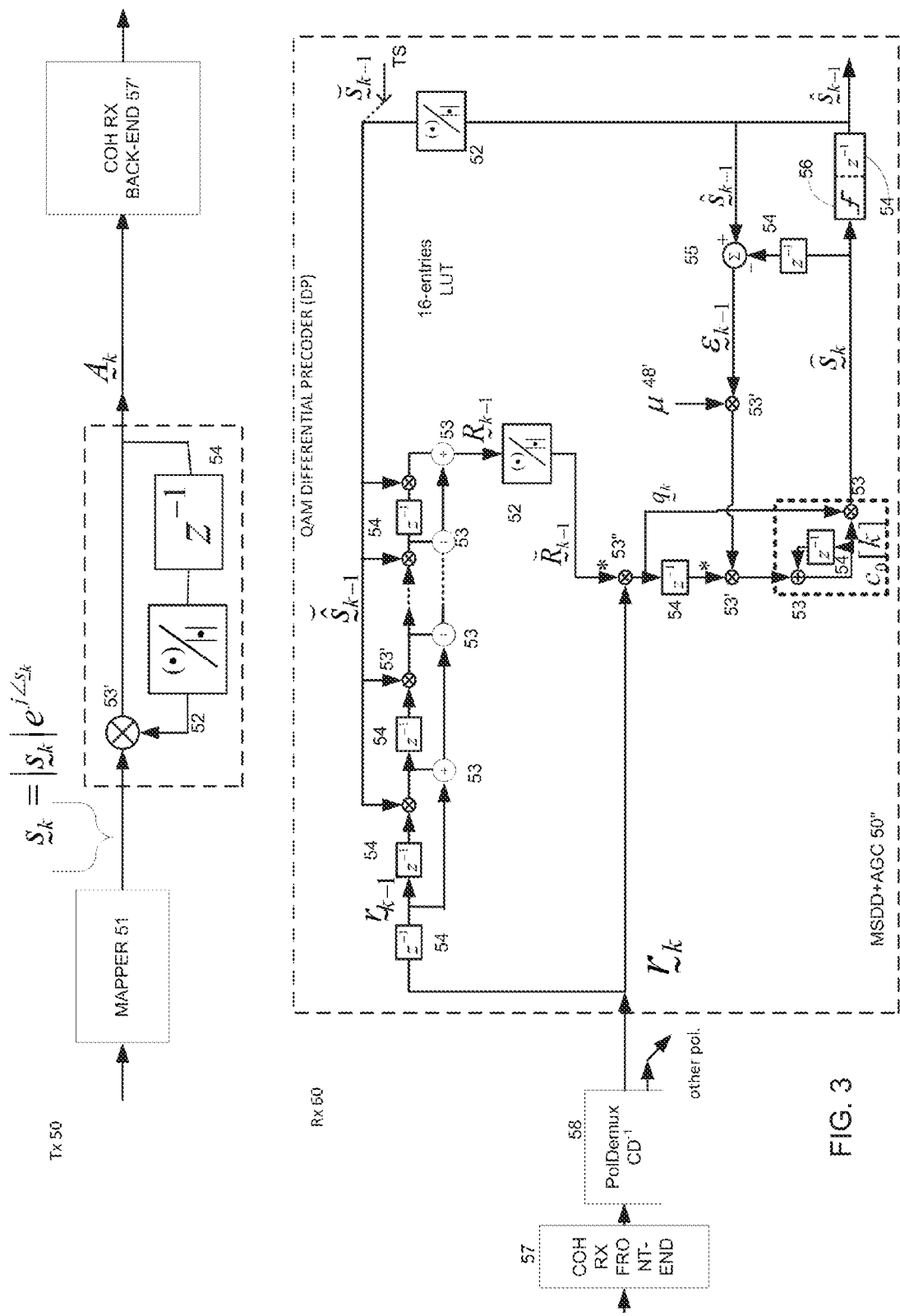

In FIG. 3 we disclose an adaptive uniform taps "notU-U" MSDD for QAM, similar to the one shown in FIG. 2 except that the Uop normalization is applied to the improved reference rather than the received signal. It turns out that the LMS adaptive mechanism for the common tap is identical here, despite the change in the position of the Uop.

Figure 4:
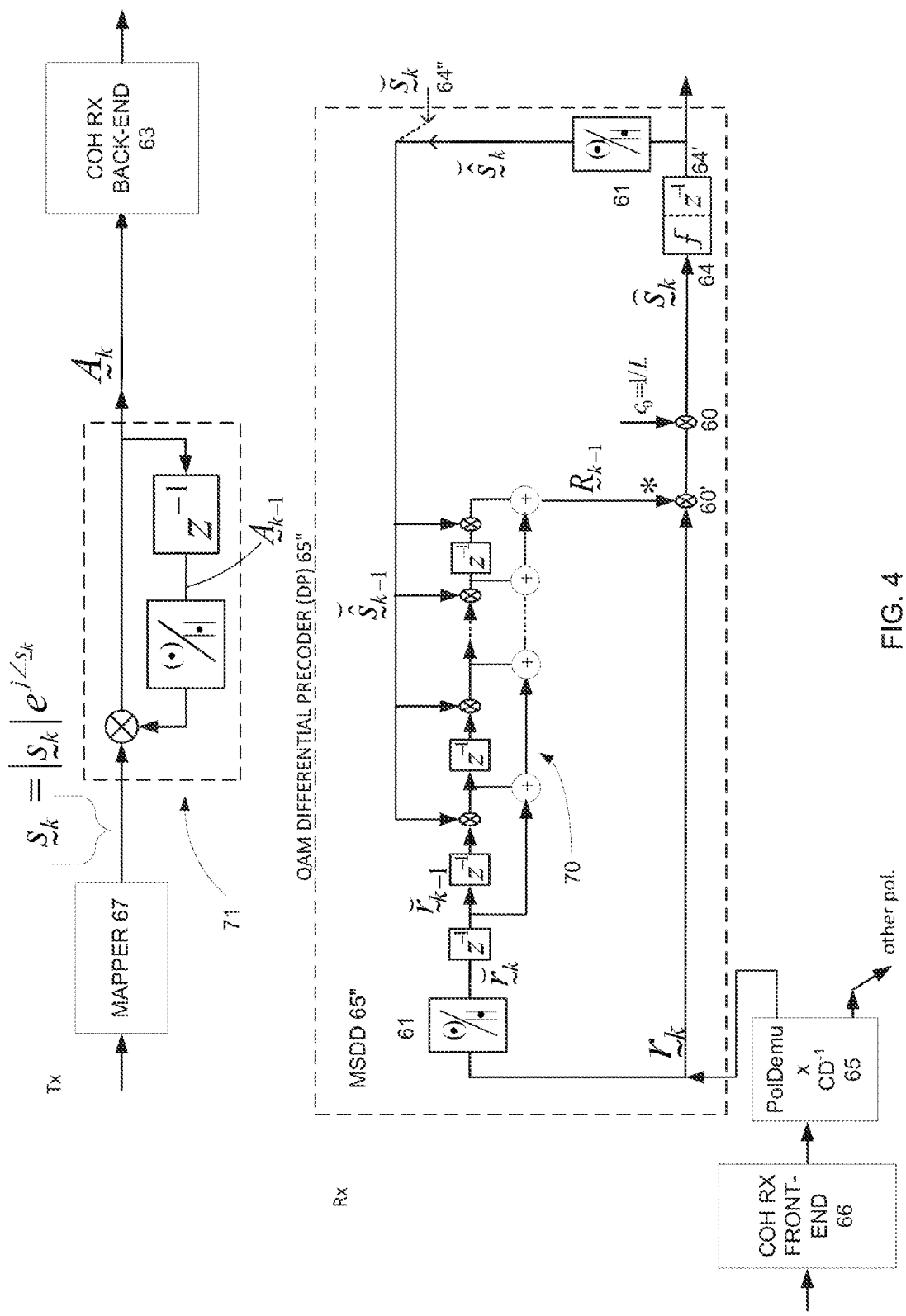

In FIG. 4 we disclose a non-adaptive uniform taps "U-notU" MSDD for QAM. No adaptation is used for the common tap, which may even be eliminated, absorbed in the multipliers used to rotate the prior received symbols. For 16-QAM these multipliers may be relatively simply be realized by lookup tables, thus this version exhibits low complexity.

Figure 5:
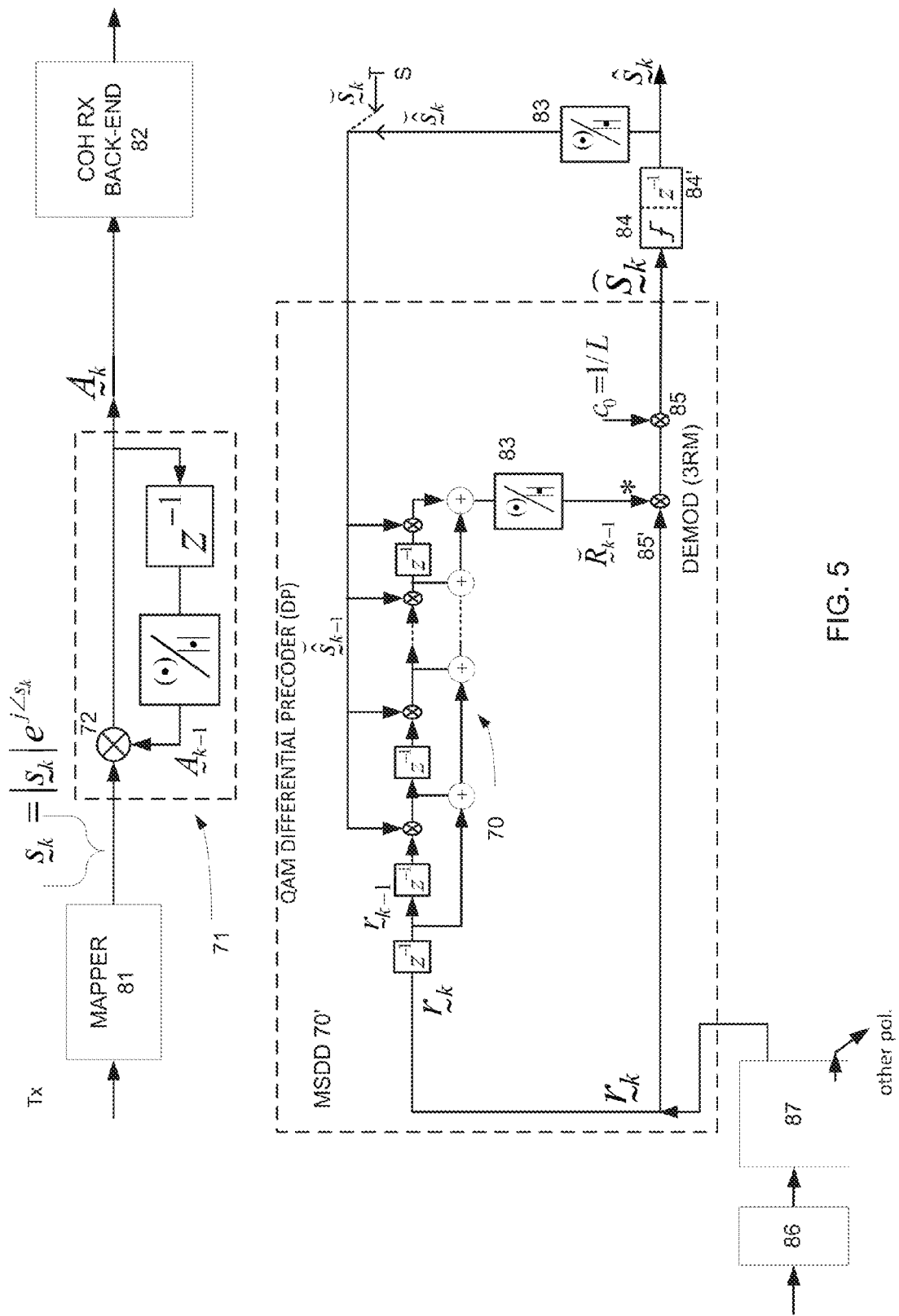

In FIG. 5 we disclose a non-adaptive uniform taps "notU-U" MSDD for QAM, which is our preferred version. An itemization of the complexity of realization of this scheme reveals 7 real-multipliers and 5 simple lookup-table multipliers.

Notice that if another system equipped with AGC capability precedes the MSDD, such as an adaptive LMS polarization demur (MIMO 2×2) algorithm, then the AGC capability is not required, and the non-adaptive schemes of FIGS. 4,5 may just be adequate.

An alternative to the uniform taps MSDD is to replace the uniform taps by simple taps which are fixed, thus easy to implement, but are not all equal, but are selected from a small set of values which are easy to implement, such as $$\left\{\frac{1}{8}, \frac{2}{8}, \frac{3}{8}, \ldots, \frac{7}{8}, 1\right\}.$$

If the laser phase noise and ASE white noise levels in the system are known, the taps may be selected out of the set above in order to provide a better approximation of the optical Wiener coefficients for the statistics of phase noise in the channel. One may also consider a tuning procedure whereby various combinations of coefficients are tried out in a setup phase to provide the best set of taps.

Figure 6:
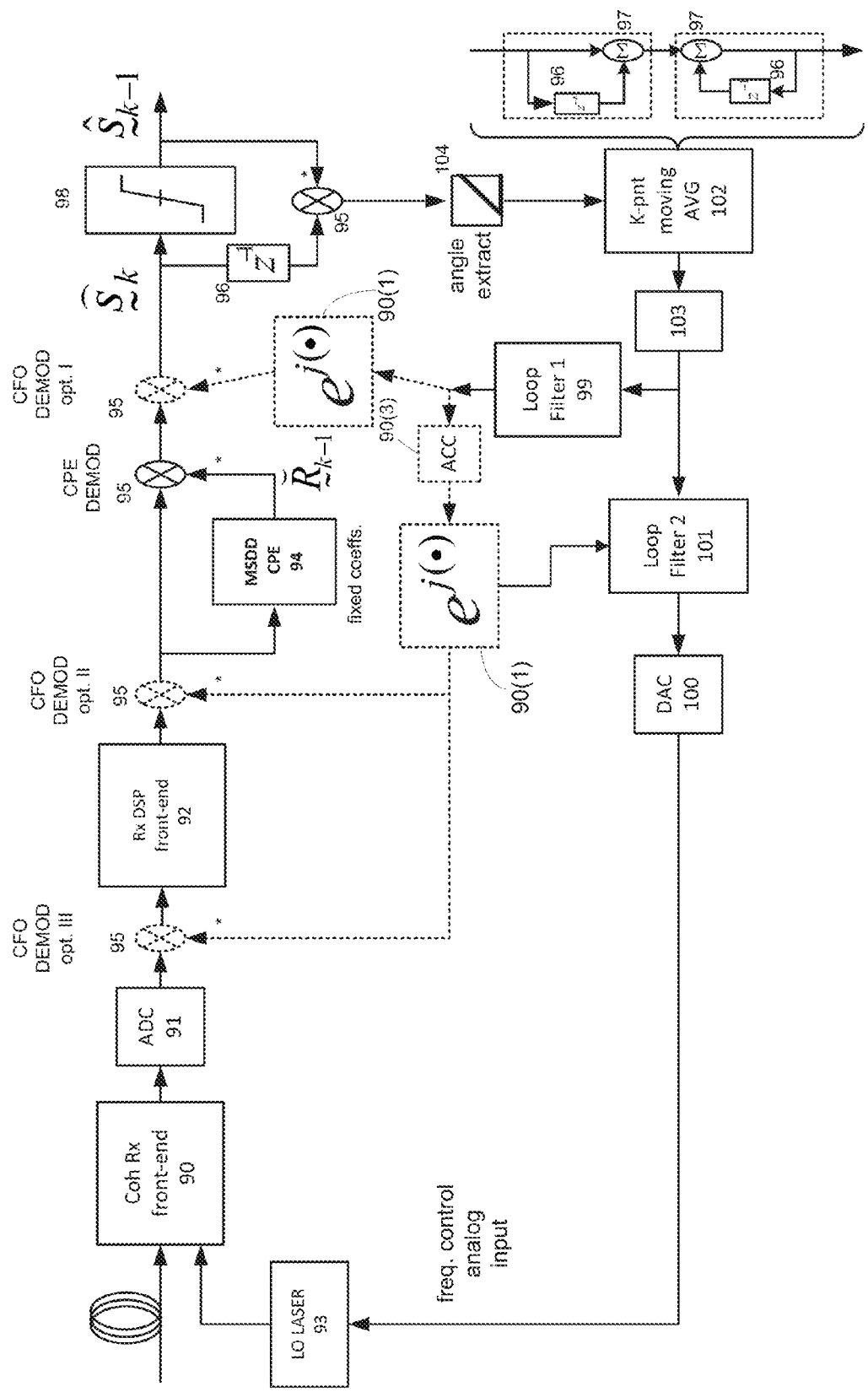

Carrier Frequency Offset Estimation & Recovery with the simplified "Uniform Taps MSDD In addition to the noise enhancement due to the roll-off of the dine function, the other major effect is the phase-shift due to the $e^{-j(L+1)\theta/2}$ factor, which causes a deterministic rotation of the $$\hat{\hat{s}}_k^{CPO}$$

estimate relative to the actual transmitted symbol. Thus frequency offset is converted by the MSDD system into an angular tilt $(L+1)\theta/2$. This suggests that the uniform taps MSDD may be used as a carrier frequency offset detector (as $\theta$ is proportional to $\Delta v$), thus may be used in a decision-directed PLL structure, as shown in FIG. 6, in order to mitigate the CFO.

The CFO demodulation may be applied either in the digital domain (digitally demodulating with an estimate of $e^{j\hat{\theta}k}$) or in the analog-optical domain (shifting the Local Oscillator (LO) laser frequency). In the last mentioned case the feedback is applied to the frequency control analog input of the laser.

For CFO digital demodulation we have three alternatives for positioning the digital demodulator, as shown in the figure, either right after the MSDD Carrier Recovery (option I), or before the MSDD Carrier Recovery (option II) or right after the ADC, ahead of the Rx DSP front-end.

One challenge in the realization of the decision directed PLL (DD-PLL) is the mismatch between the high rate of the symbol decisions, and the much lower rate required of CFO correction updates. The disclosed DD-PLL structure uses low-complexity decimation (a K-point moving average with K a large integer) in order to drop down the sampling rate, prior to feeding the loop filter.

Revisiting the three options mentioned above for digital demodulation of the CFO, in option I we simply counteract the angular tilt $(L+1)\theta/2$ appearing in $$\hat{\tilde{s}}_k$$

in the presence of CFO, by conjugate multiplication with an estimate $e^{j(L+1)\hat{\theta}/2}$, as generated at the output of the loop filter followed by the memoryless mapping $e^{j(\cdot)}$. The low-bandwidth of the loop makes sure that the system does not attempt to track the rapidly fluctuating phase noise, but essentially tracks just the very slowly varying CFO induced phase $\theta$ which may be assumed to be constant over a duration equal to the inverse of the PLL loop bandwidth.

The estimate of $\theta$ is extracted by the decision-directed phase detector implementing the angle-extracting (arg) operation $$\angle\{\hat{\tilde{s}}_k^{CPO} \tilde{s}_k^*\}:$$

The rapidly fluctuating $\angle p_k$ will be smoothed out, suppressed, by the K-point moving average and the loop filters, which will essentially generate a slowly tracking estimate for $(L+1)\theta/2$.

In options II and III for CFO demodulation, as shown in FIG. 6, we should first insert a digital accumulator (ACC) prior to applying the loop filter 1 output to the $e^{j(\cdot)}$. The ACC input output mapping $x_k \to y_k$ is described by $y_k = x_k + y_{k-1}$, and results into converting a fixed input $\hat{\theta}$ into a discrete-time ramp $\hat{\theta}k$, such that after the mapping $e^{j(\cdot)}$ we get $e^{j\hat{\theta}k}$, which is used to demodulate the CFO induced phase factor $e^{j\theta k}$, and to the extent that $\hat{\theta} \cong \theta$ to a good approximation, the demodulation cancels out the CFO. Notice that options II and III differ by whether the demodulation with $e^{j\hat{\theta}k}$ is applied to either the input or the output of the Rx DSP front-end. For linear processing in the Rx DSP front-end both signals contain the $e^{j\theta k}$ factor, but it might be advantageous to cancel out the CFO at the outset, prior to starting the linear signal processing, i.e. option III might be preferred.

As for the analog-opto-electronic control to the laser, the PLL loop is closed as shown via an additional loop filter 2, driving a Digital to Analog Converter (DAC) at a relatively slow rate. In turn the DAC feeds the LO laser frequency control analog input. Notice that this mixed-domain (analog-digital) PLL may operate in parallel with the digital PLL (one of the options I, I, III as described above). The mixed-domain PLL has a narrower bandwidth, just tracking slow temperature induced changes in the LO laser frequency while the digital PLL has a wider bandwidth, being also able to track higher frequency acoustic and mechanical disturbances (in the MHz range).

As the loop filters operate at a down-sampled rate by a factor of K, where K is large, the complexity of realization of this MSDD based CFO mitigation scheme is very low.

The combination of the uniform taps MSDD of FIG. 5 and the CFO mitigation scheme of FIG. 6 provides a preferred carrier recovery system.

Recursive Wiener-Optimal and Adaptive MSDD

We now disclose a variant of MSDD (FIG. 7) which is recursive, requiring a single coefficient rather than multiple ones.

Notice that this system is equivalent to an MSDD with coefficients 1, c, $c^2$, $c^3$, . . . . In the presence of laser phase noise, the optimal Wiener solution has decaying coefficients, thus the exponentially tapered system with coefficients optimized for a decay rate best matching the optimal Wiener coefficients may have better performance than a system with L fixed coefficients.

A similar development for the nctU-U recursive MSDD version shown in FIG. 9, is as follows:

$$R_{k-1} = r_{k-1} + c\tilde{\hat{s}}_{k-1} r_{k-2} + c^2 \tilde{\hat{s}}_{k-1}\tilde{\hat{s}}_{k-2} r_{k-3} + c^3 \tilde{\hat{s}}_{k-1}\tilde{\hat{s}}_{k-2}\tilde{\hat{s}}_{k-3} r_{k-4} + \cdots$$

$$c\tilde{\hat{s}}_{k-1}\underbrace{\left[r_{k-2} + c\tilde{\hat{s}}_{k-2} r_{k-3} + c^2 \tilde{\hat{s}}_{k-2}\tilde{\hat{s}}_{k-3} r_{k-4} + \cdots\right]}_{R_{k-2}}$$

$$R_{k-1} = r_{k-1} + c\tilde{\hat{s}}_{k-1} R_{k-2};$$

$$\hat{s}_k = r_k \bar{R}_{k-1}^*$$

Non-Causal MSDD

FIG. 29 describes how a non-causal MSDD might be implemented as a two-pass system where the first pass is a causal MSDD (or possibly a causal DR-MSDD) and the second pass is the non-causal MSDD. The delay of L/2 time units applied to the received ensures that relative to it, the earlier half of the decisions are "future" and the later half of the decisions are "past".

8.7 Polyblock Parallelization of MSDD Carrier Recovery

Here we introduce a novel parallelized hardware realization of the MSDD DSP algorithm, as described in FIG. 30 for the Tx and in FIG. 42 for the receiver. The term "polyblock" describes the essence of the concept: The sequential data stream is divided into multiple blocks, P of them, each of size M samples. Each of these blocks is processed in parallel by MSDD processors operating at a rate P times slower than the sample rate of the original data stream. Actually this form of parallelization is well known to hardware designers and is widespread for generic processing functions in ASICs or FPGAs used for DSP. Nevertheless, prior works in carrier recovery have not resorted to this form of parallelization but have always disclosed usage of polyphase parallelization, which was shown in the previous section to incur a parallelization penalty in the presence of laser phase noise. Here we establish that polyblock rather than polyphase parallelization is the preferred method for hardware parallelizing the DSP processing, indicating the specific details and issues of the algorithm, This algorithm is able to provide improved laser linewidth tolerance by eliminating the parallelization penalty.

Key elements in the HW architecture are the Block Serial to Parallel (B_S/P) and Block Parallel to Serial (B_P/S) converters (FIG. 30, 31), which are essentially buffer arrays to write a serial data stream into and read from in the manner shown in the figure. The B_S/P is a Single Input Multiple Output memory system, writing sequential blocks of the incoming serial stream into memory buffers arrayed vertically on top of each other as shown. The top buffer is filled up by the incoming samples, then the buffer underneath it is filled up, and so forth. Once the bottom buffer is filled up, the writing proceeds to the top buffer which is overwritten, much like a cathode ray beam scanning horizontally line by line, then flying back up. Now, let's imagine that the B_S/P incorporates a dual memory array (not shown), where the data written into the write-in array gets copied into a read-out identical buffers array. There are P parallel outputs of this array, each of which reads out the contents of each buffer but at a fraction 1/P of the input sampling rate, $f_s$. Now, assume that P is sufficiently large such that the MSDD may be implemented in the ASIC or FPGA at a sampling rate $f_s/P$ not exceeding the speed limitation of the hardware platform. Each block of samples streaming out of a particular output port of the B_S/P then represents a set of B contiguous samples of the original data stream, and can therefore be processed exactly as specified by the DP algorithm at the Tx (FIG. 41) and by the MSDD algorithm at the Rx (FIG. 31). Within each of these parallel modules (DP and MSDD), the processing proceeds in slowed-down discrete-time exactly as specified by the original algorithms. The only issue is the handling of the initial end-points of each block, as both the DP and MSDD algorithms are causal recursive ones, requiring initialization. The following provides a brief explanation of addressing the initialization or 'block stitching' in the MSDD carrier recovery parallelization, as will be detailed further below.

Returning to complete the description, in the Tx each of the block differential precoder (B_DP) modules, fed by one of the outputs of the B_S/P module, implements the recursion, $$A_k = \tilde{s}_k \tilde{A}_{k-1},$$
$$k = 0, 1, 2, \ldots, B-1,$$
$$\tilde{A}_{-1} = 1$$

Here k is the discrete-time index of the incoming stream of information samples $\{\tilde{s}_k\}$. The physical time associated with the discrete-time is slowed down by a factor of P, relative to an hypothetical full-speed direct implementation which is not attainable with current ASIC technology. The initialization $$\tilde{A}_{-1} = 1$$

implies that $A_0 \tilde{s}_0$, then $$A_1 = \tilde{s}_1 \tilde{A}_0 = \tilde{s}_1 \tilde{s}_0,$$

$$A_2 = \tilde{s}_2 \tilde{A}_1 = \tilde{s}_2 \tilde{s}_1 \tilde{s}_0,$$

i.e. we have a complex-valued multiplicative accumulator generating the line symbols out of the information symbols, which implies an additive accumulator for the phases:

$$A_k = \tilde{s}_k \prod_{m=0}^{k-1} \tilde{s}_m \Rightarrow \angle A_k = \sum_{m=0}^{k} \angle \tilde{s}_m, k = 0, 1, 2, \ldots, B-1$$

In the Rx, the Block MSDD (B_MSDD) implements our previously introduced MSDD algorithm, albeit on one block of length M at a time, with special attention to the block initialization:

$$\hat{s}_k = r_k \left[ \frac{1}{L} \sum_{i=1}^{L} \mathcal{R}_{k-1}^{(i)} \right]^*;$$

$$\mathcal{R}_{k-1}^{(i)} \equiv r_{k-i} \prod_{m=1}^{i-1} \tilde{s}_{k-m},$$

$$i = 1, 2, \ldots, L;$$

$$k = 0, 1, 2, \ldots, B-1$$

$$\mathcal{R}_{-1}^{(i)} = 1,$$

$$i = 1, 2, \ldots, L$$

This implies some degradation in the quality of the first L estimated symbols (to be input into the slicer), less than the full L prior samples are available in the moving window, for these symbols. In particular, the first symbol of the block does not have proper reference as ahead of it we have the last symbols of the previous block. Therefore this symbol is going to be received completely erroneous, and should be discarded. The second symbol of the block should only be demodulated based on an L=1 shortened window, including the last symbol (differential detection). The third symbol of the block should be demodulated based on an L=2 shortened window, including the last two symbols, etc. Only the symbol in position L+1 in the block has at its disposal a full window of L past samples, belonging to the current block. Symbols in position 2, 3, ..., L have 1, 2, ..., L−1 symbols preceding them in the current block, thus with this window size we get reduced performance (the later symbols in this range attain better performance than the ones preceding them).

Now, it is possible to include these symbols, understanding that they may contribute somewhat more to the symbol error rate of the system, or discard them altogether and commence processing from symbol L+1 in the block, at the expense of a reduction in spectral efficiency (thus there is a tradeoff between symbol error rate and spectral efficiency re the selection of which symbol is the first selected to be detected out of the first L+1 symbols.

Explicitly expressing the generation of improved MSDD estimates for the first L symbols which are irregular, indexed 0 to L−(labeling the block symbols starting at k=0) 1 we have for notU-U MSDD:

$$\hat{s}_0 = \text{undefined}$$
$$\hat{s}_1 = r_1 U(r_0)^*$$
$$\hat{s}_2 = r_2 U(r_1 + \tilde{\hat{s}}_1 r_0)^*$$
$$\hat{s}_3 = r_3 U(r_2 + \tilde{\hat{s}}_2 r_1 + \tilde{\hat{s}}_2 \tilde{\hat{s}}_1 r_0)^*$$
$$\hat{s}_4 = r_4 U(r_3 + \tilde{\hat{s}}_3 r_2 + \tilde{\hat{s}}_3 \tilde{\hat{s}}_2 r_1 + \tilde{\hat{s}}_3 \tilde{\hat{s}}_2 \tilde{\hat{s}}_1 r_0)^*$$
$$\hat{s}_{L-1} = r_L U(r_{L-2} + \tilde{\hat{s}}_{L-2} r_{L-3} + \tilde{\hat{s}}_{L-2} \tilde{\hat{s}}_{L-3} r_{L-4} + \tilde{\hat{s}}_{L-2} \tilde{\hat{s}}_{L-1} \cdots \tilde{\hat{s}}_3 \tilde{\hat{s}}_2 \tilde{\hat{s}}_1 r_0)^*$$

From symbol L (the L+1-st from the beginning) and on, we have a full window (L past samples) regular MSDD, $$\hat{s}_k = r_k U(r_{k-1} + \tilde{\hat{s}}_{k-2} r_{k-2} + \tilde{\hat{s}}_{k-1} \tilde{\hat{s}}_{k-2} r_{k-3} + \tilde{\hat{s}}_{k-1} \tilde{\hat{s}}_{k-2} \cdots \tilde{\hat{s}}_3 \tilde{\hat{s}}_2 \tilde{\hat{s}}_1 r_{k-L})^*$$

It may be possible to run the first L samples in a unified way with the rest of the samples, by prepending a prefix of L null samples, ahead of the M samples in each block.

MSDD for OFDM

Figure 34:
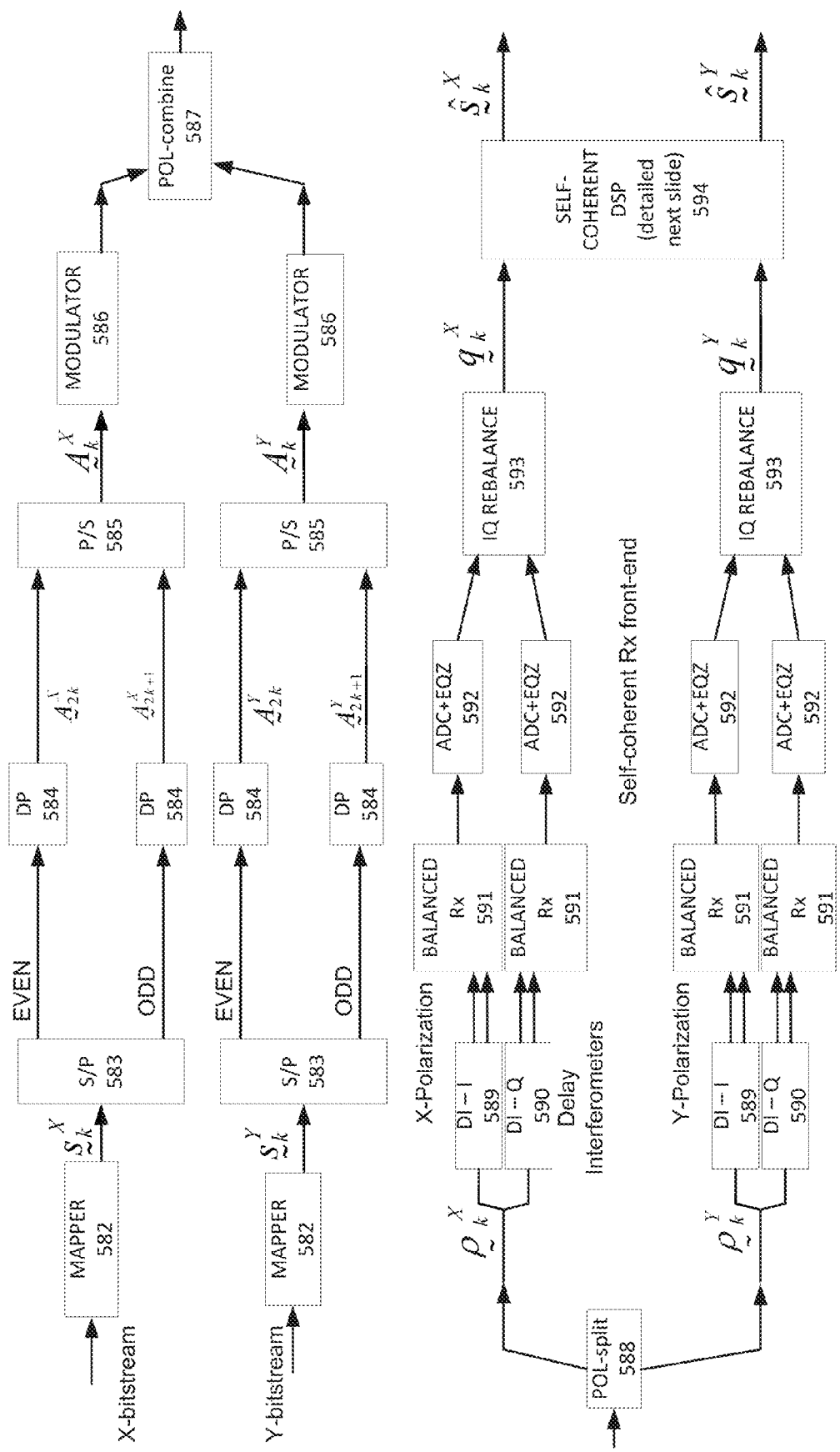

In this sub-section we disclose a preferred embodiment of the MSDD for OFDM. As shown in FIG. 34, our proposed adaptation of the MSDD system to OFDM applies, in the Tx, the Differential Precoder (DP) ahead of the Serial to Parallel (S|P) module which precedes the Tx IFFT. This has the effect of applying differential precoding between successive OFDM sub-carriers. Let the (I)FFT size be M, then the symbol stream from the mapper is partitioned into blocks of length M, each of which is parallelized to be applied to the IFFT. The first element of each block is actually differentially encoded relative to the last element of the previous block, meaning that the first (lowest frequency) sub-carrier is differentially precoded relative to a phase reference corresponding to the last (highest frequency) sub-carrier of the previous block.

In the Rx, after the FFT and the one-tap equalization, the M sub-carriers are input into the Parallel to Serial (P/S) module, and are serialized such that the lowest frequency sub-carrier becomes the earliest sample in a block of M samples. The serialized stream is applied to the MSDD, as if the reception were that of single-carrier transmission.

Assuming no Cyclic Prefix (CP) is used there is then no end-effect issue. E.g., the first sample of each serialized block of M samples takes its reference from L previous samples of the last block, which correspond to the L highest sub-carriers of the last block.

If there were no Laser Phase Noise (LPN), then the usage of cyclic prefix would not pose a problem, however when the CP is used then there is a noise enhancement mechanism referred to here as "CP-enhanced phase noise", as follows: At the Tx an IFFT block is prepared, its tail is prepended ahead of it and transmitted, then another block is prepared. Consider the last sample of the current block and the first sample of the next block, which is differentially encoded relative to the last sample of the current block. Although we insert the CP, the CP is peeled off at the transmitter, thus the MSDD processing the first sample of the next block relative to a window of L prior samples in the current block. However, as the CP samples got in between, in terms of the phase noise picked up by these samples, the intervening time of the CP duration caused decorrelation of the laser phase noise between the first sample of the next block and the last sample of the current block. The same applies in fact to the first L samples of each block, which are excessively phased noise (the later samples among the L samples are less noisy, though).

We conclude that the first L samples of each block are noisier than the rest of the samples. Thus, one policy is to discard some or all of these samples (if we retain any samples we should retain the later ones among the L samples), reducing the spectral efficiency by a factor of 1−L/M. In fact, the first L samples corresponding to the first L tones may be assigned fixed values and declared as pilot tones known to the receivers, and be used for some other purpose, though it is to be borne in mind that these pilots are noisier than usual.

The MSDD structure disclosed here for OFDM may be combined with the poly-block parallelized implementation of the MSDD described above. If we make sure that the size of the blocks in the poly-block scheme is an integer multiple of the FFT size in the OFDM scheme, then the L samples discarded in each poly-block coincide with the L samples discarded in some of the FFT blocks.

Figure 35:
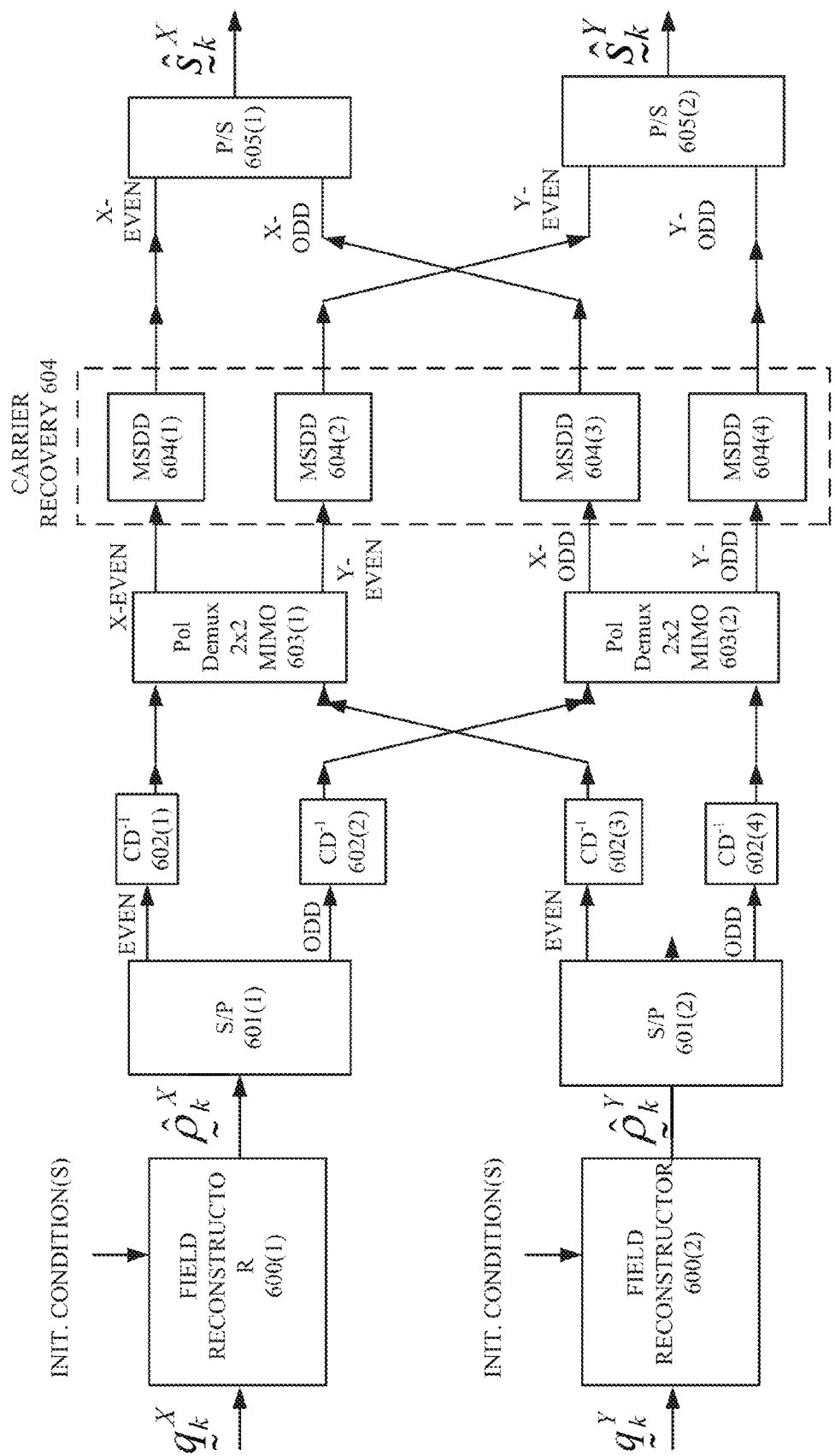

The scheme described here is also applicable to a variant of OFDM called SC-FDM (also referred to as DFT-spread OFDM) as described in FIG. 35. Ahead of the IFFT in the Tx we have multiple DFTs of smaller size, covering all the sub-carriers contiguously, fed by a S/P, whereas at the Rx following the FFT we have an array of IDFTs followed by a P/S.

To adapt the MSDD to this scheme, similarly to our OFDM solution, the DP in the Tx is placed ahead of the S/P which precedes the array of "spreading"-DFTs, whereas in the Rx the MSDD is placed on the output of the S|P module which follows the array of IDFTs.

Field Reconstruction—Preferred Embodiments

Figure 37:
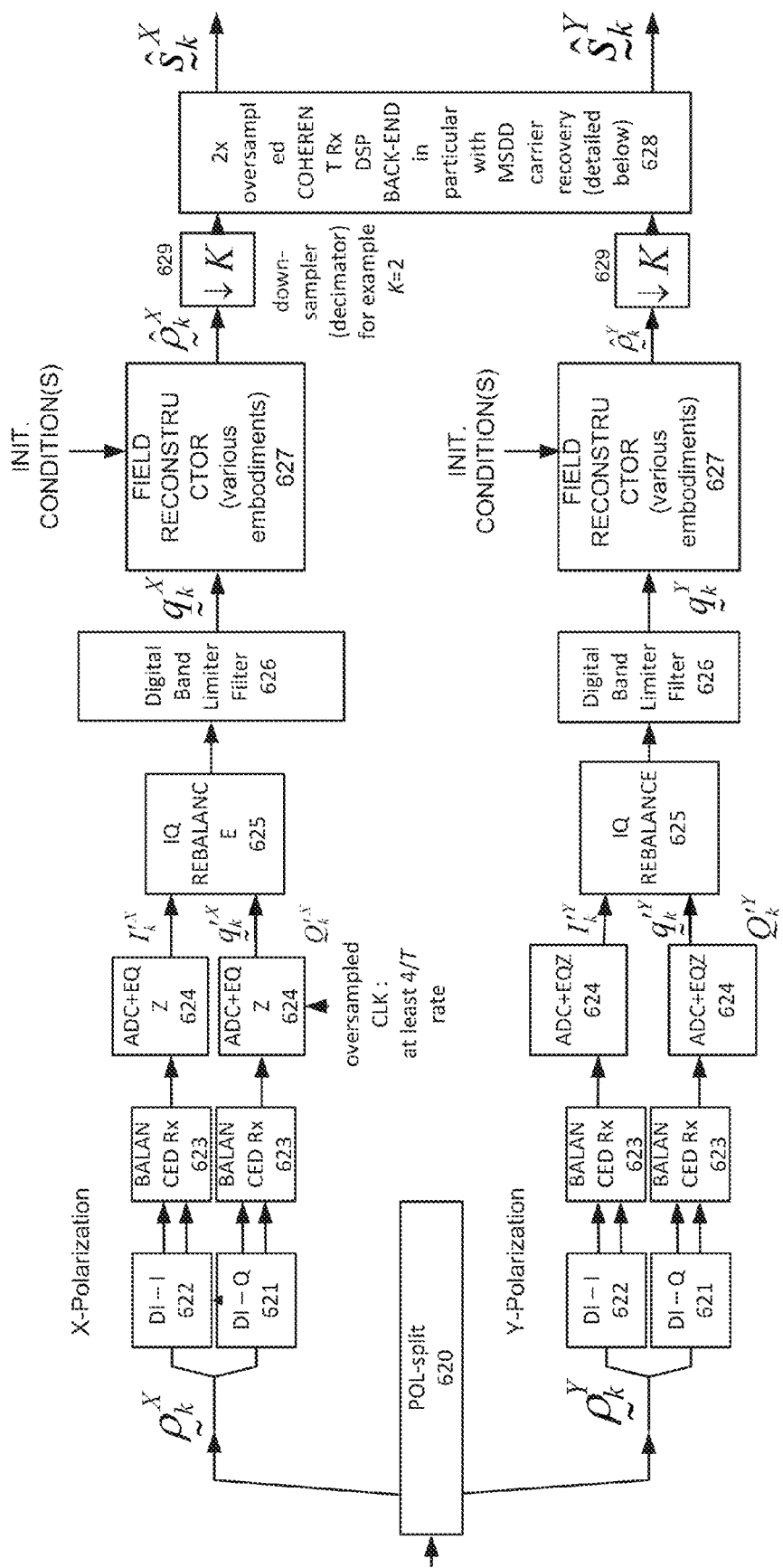

FIG. 37 shows the QAM transmitter and the corresponding self-coherent receiver front-end. The self-coherent DSP is detailed in FIG. 38, where in turn, at the bottom, we show two embodiments I and II of the field reconstructor (FR).

Embodiment I is based on a conjugate divisive accumulator $$\hat{\rho}_k \equiv q_k / \hat{\rho}_{k-1}^*,$$

while embodiment II is based on generating the ratio $$\varrho_k^{+(2)} \equiv q_k / q_{k-1}^*$$

followed by a multiplicative accumulator (those embodiments were already detailed in the first round).

These two figures embed the field reconstructors into full systems for dual polarization coherent detection, including Chromatic Dispersion (CD) equalization (labeled $CD^{-1}$) and Pol Demux (2×2 MIMO) equalization. The S/P and P/S modules are used to separate and combine the even and odd polyphases and process them separately.

Here there is an FR for each of the X and Y polarization paths, followed by the S/P single-input dual-output module which separates the FR output into even and odd polyphases.

Notice that the $CD^{-1}$ and Pol Demux operations are also conducted on a polyphase basis, separately for the even and odd polyphases (thus the even polyphases of both polarizations are processed in a 2×2 MIMO block, and likewise for the odd polyphases).

The carrier recovery is applied by means of MSDD modules for each of the even/odd polyphases of each of the X and Y polarizations. Finally, the even and odd components of each polarization are collected and serialized into a full-rate stream for each polarization (this step is optional, conceptual as it may be convenient to present the outputs in parallelized form).

Figure 38:
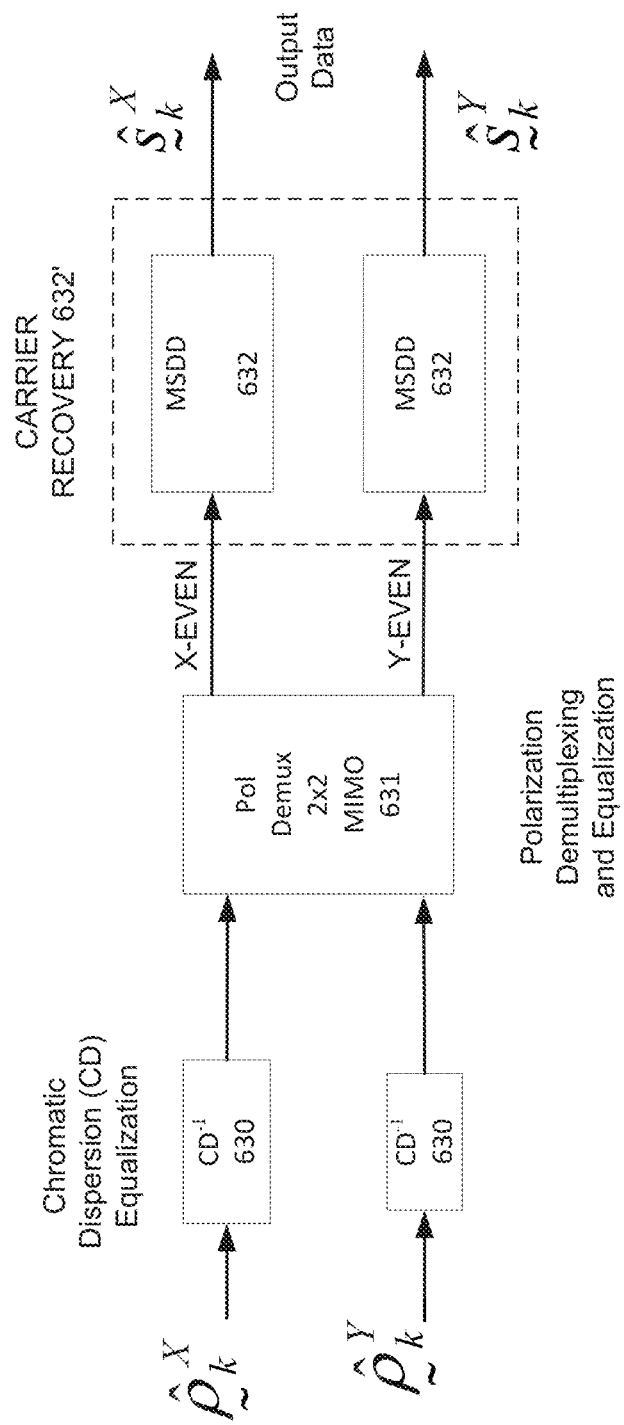
Figure 39:
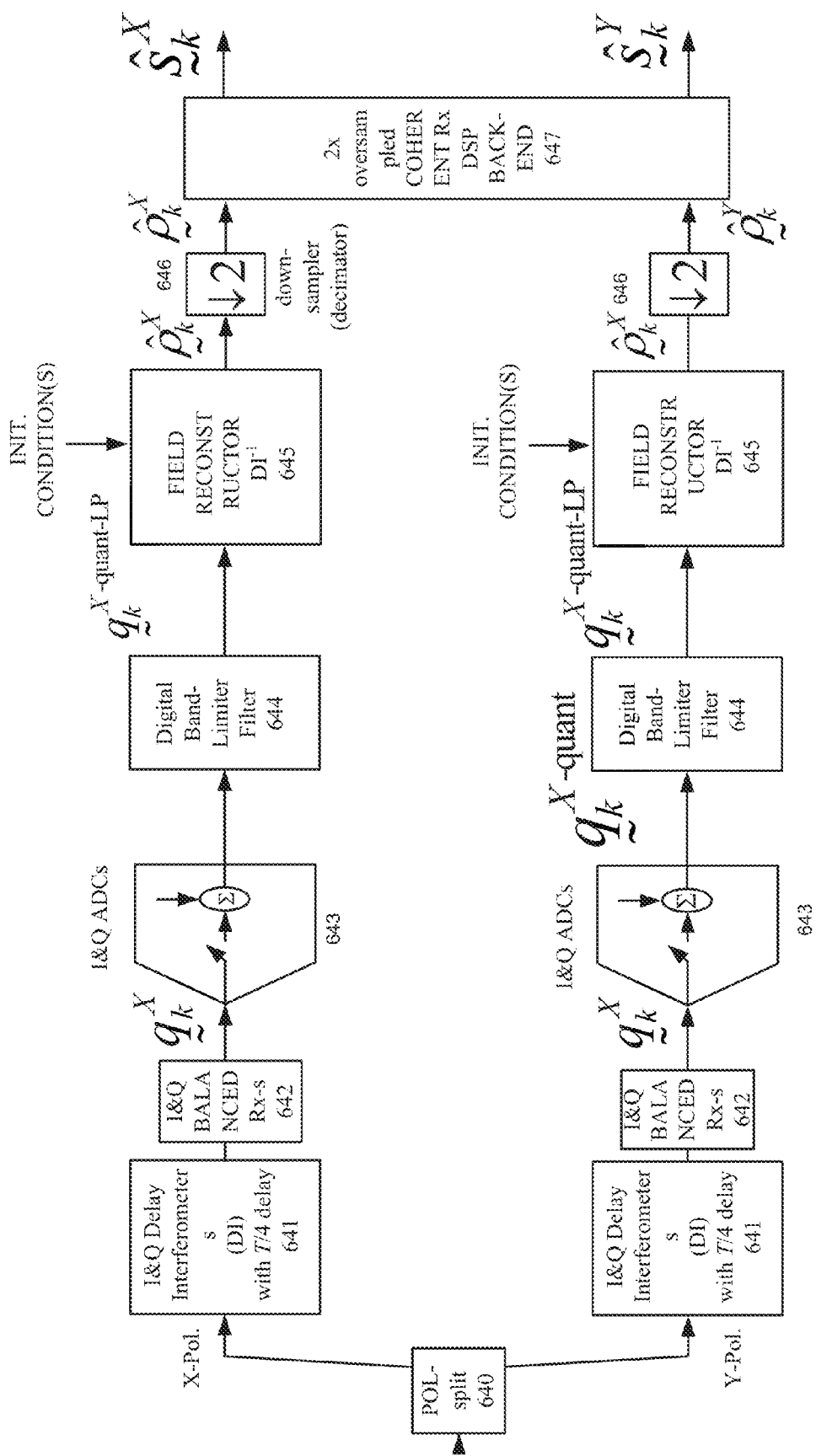

FIGS. 38 and 39 show the concept of improving the self-coherent Rx performance by oversampling.

Specifically, relative to the earlier discussed FR systems, here we: Use delay interferometers (DI) with delays which are an integer fraction of the symbol time interval, denoted here by T. An ancillary benefit is that these DIs are then easier to implement and are more robust as the optical path delays are shorter. In the exemplary preferred system, we take the DI delays as T/4. Use ADCs which are oversampled at an integer multiple of more than twice the symbol rate (also called baudrate), $T^{-1}$. E.g., in the exemplary system shown, we take the sampling rate as, $4T^{-1}$, i.e. quadruple the baudrate. Apply digital band-limiting filters ahead of the inputs of the field reconstructor modules, such that the signal components of the information signals $q_k^{X,Y}$ are passed through, but the high frequency noise components contributed by the Rx thermal noise and especially the ADC quantization noise (in fact all the noise added after the DI outputs), collectively called 'post-detection noise', should be suppressed as much as possible. In particular, the directive is to suppress the noise components in the vicinity of half the sampling frequency. Given that we use oversampling (see point 2), there is then spectral room to cut down the high frequency components of quantization noise while passing the signal through. The rationale of the whole embodiment is that the high frequency components of quantization noise contribute to amplitude noise runoff (a random walk) at the output of the field reconstructor, as may be shown by detailed mathematical analysis of noise propagation through the recursion embodied by the field reconstructor module. In fact the field reconstructor module picks up and enhances the input noise frequency components which are close to half the sampling rate at which the field reconstructor operates. Thus, by sufficient oversampling, we make sure that we can suppress these noise components at half the sampling rate while passing the signal through, and the noise accumulation (amplitude noise random walk runoff) is reduced at the field reconstructor output.

Now, at the field reconstructor output we have reconstructed samples of the field incident at the DI inputs. The reconstructed field samples are taken at the oversampled clock rate of $4T^{-1}$, thus may be downsampled by a factor of K=2 to return to the baudrate, or preferably downsampled by a factor of K=4 to reduce the rate to $2T^{-1}$, as suitable for processing in a twice-oversampled receiver, as shown.

As there is also enhanced phase noise random walk runoff due to the post-detection noise at the input of the field reconstructor module, then it is desirable to use the MSDD carrier recovery as disclosed in this patent app.

Figure 32:
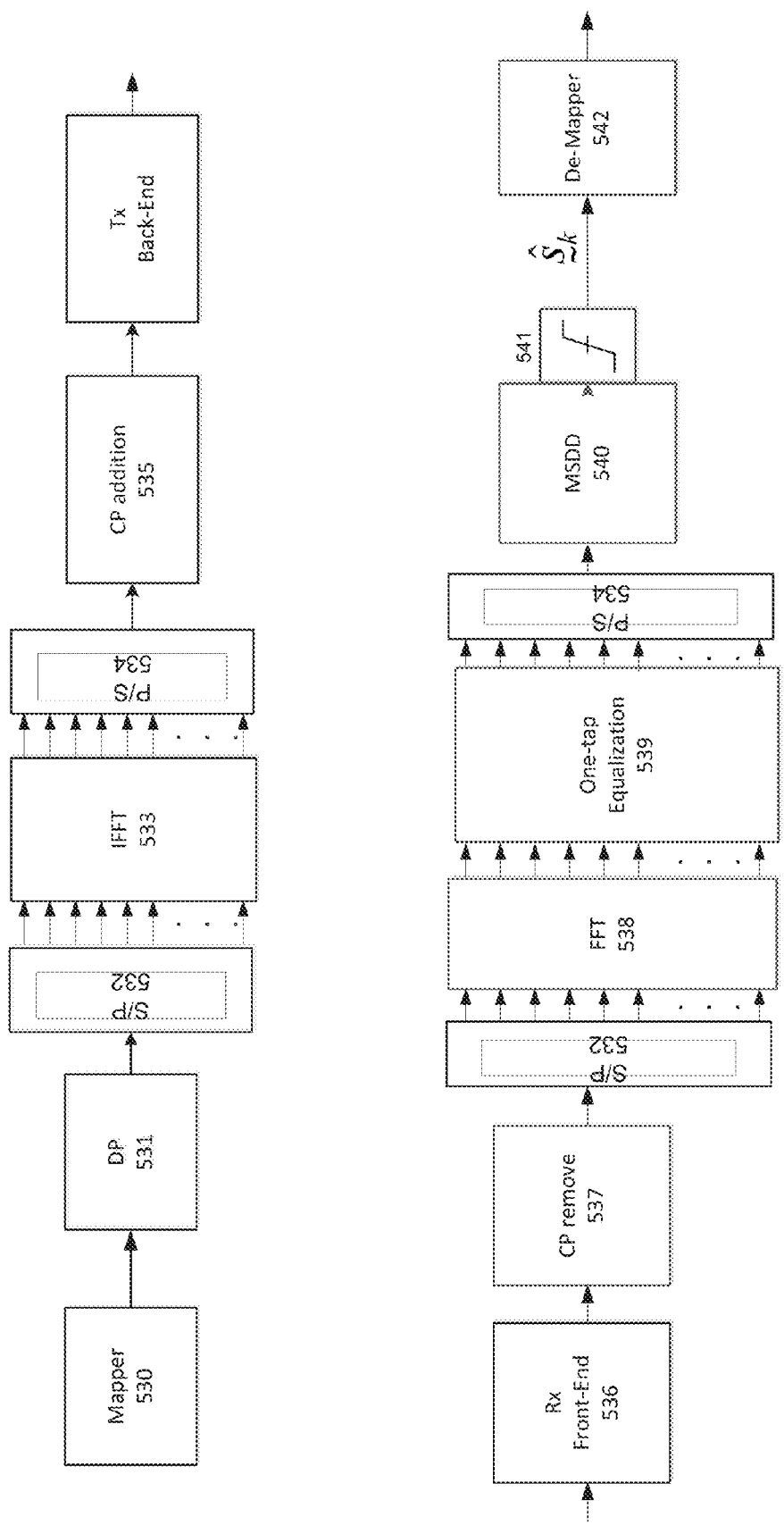

In this sub-section we disclose a preferred embodiment of the MSDD for OFDM. As shown in FIG. 32, our proposed adaptation of the MSDD system to OFDM applies, in the Tx, the Differential Precoder (DP) ahead of the Serial to Parallel (SIP) module which precedes the Tx IFFT. This has the effect of applying differential precoding between successive OFDM sub-carriers. Let the (I)FFT size be M, then the symbol stream from the mapper is partitioned into blocks of length M, each of which is parallelized to be applied to the IFFT. The first element of each block is actually differentially encoded relative to the last element of the previous block, meaning that the first (lowest frequency) sub-carrier is differentially precoded relative to a phase reference corresponding to the last (highest frequency) sub-carrier of the previous block.

In the Rx, after the FFT and the one-tap equalization, the M sub-carriers are input into the Parallel to Serial (P/S) module, and are serialized such that the lowest frequency sub-carrier becomes the earliest sample in a block of M samples. The serialized stream is applied to the MSDD, as if the reception were that of single-carrier transmission.

Assuming no Cyclic Prefix (CP) is used there is then no end-effect issue. E.g., the first sample of each serialized block of M samples takes its reference from L previous samples of the last block, which correspond to the L highest sub-carriers of the last block.

If there were no Laser Phase Noise (LPN), then the usage of cyclic prefix would not pose a problem, however when the CP is used then there is a noise enhancement mechanism referred to here as "CP-enhanced phase noise", as follows: At the Tx an IFFT block is prepared, its tail is prepended ahead of it and transmitted, then another block is prepared. Consider the last sample of the current block and the first sample of the next block, which is differentially encoded relative to the last sample of the current block. Although we insert the CP, the CP is peeled off at the transmitter, thus the MSDD processing the first sample of the next block relative to a window of L prior samples in the current block. However, as the CP samples got in between, in terms of the phase noise picked up by these samples, the intervening time of the CP duration caused decorrelation of the laser phase noise between the first sample of the next block and the last sample of the current block. The same applies in fact to the first L samples of each block, which are excessively phased noise (the later samples among the L samples are less noisy, though).

We conclude that the first L samples of each block are noisier than the rest of the samples. Thus, one policy is to discard some or all of these samples (ie we retain any samples we should retain the later ones among the L samples), reducing the spectral efficiency by a factor of 1−L/M. In fact, the first L samples corresponding to the first L tones may be assigned fixed values and declared as pilot tones known to the receivers, and be used for some other purpose, though it is to be borne in mind that these pilots are noisier than usual.

The MSDD structure disclosed here for OFDM may be combined with the poly-block parallelized implementation of the MSDD described above. If we make sure that the size of the blocks in the poly-block scheme is an integer multiple of the FFT size in the OFDM scheme, then the L samples discarded in each poly-block coincide with the L samples discarded in some of the FFT blocks.

The scheme described here is also applicable to a variant of OFDM called SC-FDM (also referred to as DFT-spread OFDM) as described in FIG. 33. Ahead of the IFFT in the Tx we have multiple DFTs of smaller size, covering all the subcarriers contiguously, fed by a S/P, whereas at the Rx following the FFT we have an array of IDFTs followed by a P/S.

To adapt the MSDD to this scheme, similarly to our OFDM solution, the DP in the Tx is placed ahead of the S/P which precedes the array of "spreading"-DFTs, whereas in the Rx the MSDD is placed on the output of the S/P module which follows the array of IDFTs.

Field Reconstruction—Embodiments

FIGS. 33 and 34 show two embodiments based on the respective embodiments I and II.

In FIG. 33 a field reconstructor (FR) based on a conjugate divisive accumulator $$\hat{\varrho}_k \equiv q_k / \hat{\varrho}_{k-1}^*$$

is shown.

In FIG. 34 an FR based on generating the ratio $$\varrho_k^{+(2)} \equiv q_k / q_{k-1}^*$$

followed by a multiplicative accumulator is shown.

These two figures embed the field reconstructors into full systems for dual polarization coherent detection, including Chromatic Dispersion (CD) equalization (labeled $CD^{-1}$) and Pol Demux (2×2 MIMO) equalization. The S/P and P/S modules are used to separate and combine the even and odd polyphases and process them separately.

Here there is an FR for each of the X and Y polarization paths, followed by the S/P single-input dual-output module which separates the FR output into even and odd polyphases.

Optionally, to improve tolerance to receiver and quantization noise we disclose a scheme based on inserting a differentiator and an accumulator as shown, before and after the $CD^{-1}$ and Pol Demux (2×2 MIMO) linear equalization modules. As for a stationary noise and distortion signals are concerned the differentiation and accumulation operations have no effect as the order of linear time-invariant modules may be commuted and the accumulation cancels the differentiation.

However, the differentiation has the effect of whitening the cumulative noise generated in the field reconstructor, thus this type of noise, once whitened does not detrimentally propagate through the linear equalization modules. Again, we remark that the insertion of the differentiator and accumulator is optional—it might improve performance in certain cases.

Notice that the $CD^{-1}$ and Pol Demux operations are also conducted on a polyphase basis, separately for the even and odd polyphases (thus the even polyphases of both polarizations are processed in a 2×2 MIMO block, and likewise for the odd polyphases).

The carrier recovery is applied by means of MSDD modules for each of the even/odd polyphases of each of the X and Y polarizations. Finally, the even and odd components of each polarization are collected and serialized into a full-rate stream for each polarization (this step is optional, conceptual as it may be convenient to present the outputs in parallelized farm).

Various figures illustrates an multi-symbol-differential-detection module (MSDD). FIGS. 12-15, 17, 18, 20 and 21 illustrate adaptive MSDDs while FIGS. 1-5,7 illustrate equally tap MSDDs.

Referring for example to FIG. 1, the MSDD 12 may include an input node (connected to the output of the polyhpahse demultiplexor 11) for receiving an input signal having a noisy phase; a summation and rotation unit 15 and an output unit 20.

The output unit 20 is arranged to output an output signal and a normalized output signal. The output signal represents the input signal but has a reconstructed phase. The summation and rotation unit 9 (includes circuit 15 and 16) is arranged to receive the input signal and the output signal and to provide a reference signal that reflects a weighted sum of phase rotated and delayed previously received input signals. The output unit 20 includes a phase difference calculator 19, a slicer 21, a delay unit 22 and a normalizer such as unimodular normalizer 23. Unimodular normalizer divides a complex value by the absolute value of the complex value.

The phase difference calculator 19 is arranged to generate a difference signal indicative of a phase difference between the reference signal and the input signal.

The slicer 21 and the delay unit 22 are arranged to generate the output signal by slicing the difference signal to provide a sliced signal and by delaying the sliced signal; and wherein the normalizer 23 is arranged to normalize the output signal to provide the normalized output signal.

The summation and rotation unit 9 is arranged to phase rotate each delayed previously received input signal by a multiplication with a corresponding delayed normalized output signal. The rotation is achieved by multiplications (multipliers 14) and the delayed version of any of the signals are provided by delay units 13 of circuit 15.

Referring to FIG. 12, the summation and rotation unit is arranged to multiply each phase rotated and delayed previously received input signal by a coefficient out of multiple coefficients C,[k]-CL[k] to provide multiple intermediate signals and to sum the multiple intermediate signals to provide the reference signal.

The multi-symbol-differential-detection module may include a coefficients calculator 155(1) (surrounded by a dashed arrow in FIG. 12) arranged to calculate the multiple coefficients in an adaptive manner. The coefficient calculator includes a delay and multiply circuit 155(2) for each coefficient, the output of which is multiplied by a complex multiplier 155(3) with a signal from the summation and rotation unit.

It is noted that even when all the coefficients are the same—the value of the coefficient can be calculated in an adaptive manner—as illustrated by the coefficient calculator 50 of FIG. 2.

Any coefficient calculator may be arranged to calculate the multiple coefficients such as to optimize a phase estimation point of work of the multi-symbol-differential-detection module.

Any coefficients calculator may be arranged to calculate the multiple coefficients according to a least mean square error algorithm that is responsive to the difference signal.

Any coefficients calculator may be arranged to calculate the multiple coefficients during a training period during which a training sequence is injected to either one of the coefficient calculator or to the input node. This is illustrated, for example, in FIG. 12 by training sequence that is provided via switch SW2 (bottom right side of FIG. 12).

Any coefficient calculator may be arranged to calculate each one of the coefficients.

An adaptive coefficient calculator may be arranged to calculate coefficients so that during at least one point in time one coefficient differs from another coefficient.

The summation and rotation unit may include a normalizer that is arranged to normalize the input signal before providing the input signal to a sequence of delay units of the summation and rotation unit. See for example, normalizer 44 of FIG. 2, normalizer 61 of FIG. 4, normalizer 155(9) of FIG. 12. These configurations may be referred to as U configurations. Other configurations (non-U) can have a summation and rotation unit that does not have a normalizer (see, for example, FIGS. 1 and 3-5).

One or more summation and rotation unit may be arranged to normalize the multiple intermediate signals to provide the reference signal (see, for example, normalizer 155 of FIG. 12).

The summation and rotation unit may be arranged to multiply each phase rotated and delayed previously received input signal by a (same) coefficient to provide multiple intermediate signals, wherein all phase rotated and delayed previously received input signals are multiplied by the coefficient. This is illustrated, for example, in FIGS. 1-5 and 7.

The coefficient can be fixed (non-adaptive).

In some embodiments of the MSDD (FIGS. 1-5 and 7) All multipliers of the summation and rotation unit can be less complex then a complex multiplier of the phase difference calculator (denoted 19 in FIG. 1).

The summation and rotation units can be free of normalizers—as illustrated in FIGS. 1 and 3-5.

Referring to FIG. 31, a receiver may be provided and may include a receiver front end (524), a polyphase de-multiplexor (block S/P 524) having multiple outputs; a polyphase multiplexor (block P/S 522) having multiple inputs; and a plurality of multi-symbol-differential-detection modules (521) coupled between the multiple outputs of the polyphase de-multiplexor and the multiple inputs of the polyphase multiplexor. It is noted that most MSDD figures illustrate at least the polyphase de-multiplexor (denoted 11, 42, 58, 65, 87 and the like)

Each multi-symbol-differential-detection module may have any form illustrated in FIGS. 1-5, 7, 12-15, 17-18, 20-21) and may, for example include an input node for receiving an input signal having a noisy phase; a summation and rotation unit; and an output unit; wherein the output unit is arranged to output an output signal and a normalized output signal; wherein the output signal represents the input signal but has a reconstructed phase; wherein the summation and rotation unit is arranged to receive the input signal and the output signal and to provide a reference signal that reflects a weighted sum of phase rotated and delayed previously received input signals; wherein the output unit comprises a phase difference calculator, a slicer, a delay unit and a normalizer; wherein the phase difference calculator is arranged to generate a difference signal indicative of a phase difference between the reference signal and the input signal; wherein the slicer and the delay unit are arranged to generate the output signal by slicing the difference signal to provide a sliced signal and by delaying the sliced signal; and wherein the normalizer is arranged to normalize the output signal to provide the normalized output signal.

According to an embodiment of the invention a receiver may be provided. Referring to FIG. 6 the receiver may include a receiver front end (90) arranged to receive (a) a received signal, (b) a reference signal generated by a local oscillator laser, and to output a first intermediate signal; a carrier phase estimator (includes MSDD 94 and CPE demodulator 95) that is arranged to receive the first intermediate signal and to generate a phase estimation signal that represents a phase difference between the received signal and the reference signal; wherein the carrier phase estimator comprises a multi-symbol-differential-detection module (94) and a carrier phase demodulator (95); and an output circuit (includes slicer 98) that is arranged to receive the phase estimation signal and to apply a slicing operation to provide an output signal of the carrier phase estimator.

The receiver may include a feedback circuit (includes components 90(1), 90(2) 95, 96, 99, 100 101, 102, 103 and 104), arranged to receive a feedback input signal that is representative of (a) a delayed version of the phase estimation signal and of (b) a complex conjugate of the output signal; and to generate a local oscillator control signal that is provided to the local oscillator laser such as to affect a frequency of the local oscillator laser.

The feedback circuit may include a digital to analog converter 100, a first loop filter 99 and a second loop filter 101, wherein the digital to analog converter and the second loop filter are arranged to convert a second intermediate signal to the local oscillator local oscillator control signal.

The receiver front end may include a coherent receiver front end 90, an analog to digital converter 91 and a digital signal processor front end 92.

The receiver may include a currier frequency offset demodulator (located in one of the located denoted as CFO DEMOD opt. I, CFO DEMOD opt. II, and CFO DEMOD opt. III) and an angular tilt circuit (90(1)). The first loop filter 99 is arranged to receive the second intermediate signal and to provide a third intermediate signal. The angular tilt circuit 90(1) is arranged to apply an angular tilt function to provide a fourth intermediate signal.

According to option I (CFO DEMOD opt I.) the currier frequency offset demodulator may be arranged to receive (a) a complex conjugate of the fourth intermediate signal and (b) a signal that is outputted by the analog to digital converter, and is arranged to output a currier frequency offset compensated signal to the digital signal processor front end.

According to option II (CFO DEMOD opt II.) the currier frequency offset demodulator is arranged to receive (a) a complex conjugate of the fourth intermediate signal and (b) a signal that is outputted by the digital signal processor front end, and is arranged to output the first intermediate signal.

Referring to FIG. 8, according to an embodiment of the invention a receiver, may be provided and may include:
  a. A front end (120(1) or 120(2)) arranged to receive a sequence of input signals and to output (a) odd polyphase in phase signals, (b) odd polyphase quadrature signals, (c) even polyphase in phase signals, and (d) even polyphase quadrature signals.
  b. A first in phase quadrature reconstructor 125(1) arranged to reduce in phase quadrature imbalances between the odd polyphase in phase signals and the odd polyphase quadrature signals.
  c. A second in phase quadrature reconstructor 125(2) arranged to reduce in phase quadrature imbalances between the even polyphase in phase signals and the even polyphase quadrature signals.
  d. A first field reconstructor 126(1) arranged to reconstruct a carrier of the input signals from output signals of the first in phase quadrature reconstructor.

e. A second field reconstructor arranged 126(2) to reconstruct a carrier of the input signals from output signals of the second in phase quadrature reconstructor.

f. An equalizer 127 arranged to apply an equalization operation on output signals of the first and second field reconstructors.

g. First and second carrier recovery circuits 128(1), 128(2) arranged to apply carrier recovery operations on the output signals of the equalizer.

h. A demapper 129 arranged to map symbols from the first and second carrier recovery circuits into output bits of the receiver.

It is noted that the circuitry is duplicated for the y-polyphase signals.

The first in phase quadrature reconstructor 125(1) may be arranged to reduce in phase quadrature imbalances between the odd polyphase in phase signals and the odd polyphase quadrature signals 125(2) is arranged to perform a calibration operation as a result of a reception of a training sequence that substantially equals an eigen sequence of an optical channel through which the input signals propagated.

The first field reconstructor 126(1) may include a divider, a switch and a delay unit (Referring to FIG. 23 the divider is denoted 386, the switch 386' and the delay unit 387); wherein the divider has a first input, a second input and an output, wherein the first input of the divider is arranged to receive an output signal from the first in phase quadrature reconstructor, the second input is arranged to receive a complex conjugate of an output signal of the delay unit; wherein the delay unit has an input that is coupled to an output node of the first field reconstructor; wherein the switch is arranged to be opened during an initialization sequence and is arranged to be closed after the initialization sequence ends.

The first field reconstructor 126(1) may include a divider, a switch, a multiplier and delay units (such as delay units 396 or 400 of FIG. 25, or delay units 402 of FIG. 26); wherein the divider has a first input, a second input and an output; wherein the first input of the divider is arranged to receive an output signal from the first in phase quadrature reconstructor, the second input is arranged to receive a complex conjugate of a delayed output signal from the first in phase quadrature reconstructor; wherein the multiplier is arranged to multiply output signals from the divider by doubled delayed output signals of the multiplier to provide an output signal of the first field reconstructor.

The first field reconstructor (of FIG. 25) of the receiver (of FIG. 25 or 8) may include a divider 397, a switch 401', a sequence of multipliers 398, a first sequence of delay units 400, an output delay unit 402 and an output multiplier (the rightmost multiplier 398); wherein the divider has a first input, a second input and an output; wherein the first input of the divider is arranged to receive an output signal from the first in phase quadrature reconstructor, the second input is arranged to receive a complex conjugate of a delayed output signal from the first in phase quadrature reconstructor; wherein the sequence of multipliers are coupled between the divider and the output multiplier; wherein the sequence of delay units are coupled between the divider and a last multiplier of the sequence of multipliers; wherein each multiplier of the sequence of multipliers has an input for receiving an output of a corresponding delay unit of the sequence of delay units; wherein the output multiplier is arranged to multiply an output signal from the last multiplier of the sequence of multipliers by a delayed output signal of the multiplier to provide an output signal of the first field reconstructor.

The first carrier recovery circuit 126(1) may include an multi-symbol-differential-detection module that may include a Wiener combiner and a coefficient calculator arranged to adapt the taps of the Weiner combiner. FIG. 12 illustrates a summation and roitation circuit that can apply a Wiener combiner and the coefficient calculator that can calculate coefficients that will fir the Weiner combiner.

The receiver (such as those illustrated in FIGS. 12-15, 20-21) may include a coefficient calculator that may act as a coefficient calculator that may be arranged to adapt the taps of the Weiner combiner such as to optimize a phase estimation point of work of the Weiner combiner.

The coefficient calculator can be to adapt the taps of the Weiner combiner according to a least mean square error algorithm.

Any of the mentioned above MSDD circuits can be arranged to perform both magnitude and phase reconstruction.

Referring to FIG. 33 a receiver may be provided and may include a receiver front end 577, a serial to parallel converter 572, at least one time to frequency conversion unit (FFT 578), at least one frequency to time conversion unit (IDFT 579), a parallel to serial converter (575), a multi-symbol-differential-detection module 580 and a slicer 581. Wherein the receiver front end is followed by the serial to parallel converter; wherein the serial to parallel converter is followed by the at least one time to frequency conversion unit, wherein the at least one time to frequency conversion unit is followed by the at least one frequency to time conversion unit, wherein the at least one frequency to time conversion unit is followed by the parallel to serial converter, wherein the parallel to serial converter is followed by the multi-symbol-differential-detection module and wherein the multi-symbol-differential-detection module is followed by the slicer.

Referring to FIG. 35 a receiver may be provided and may include a first field reconstructor 600(1) arranged to receive first input signals having dominant first polarity components and second polarity components; a first splitter 601(1) arranged to split the first input signals to first even signals and first odd signals; a first chromatic dispersion equalizer 602(1) arranged to apply a chromatic dispersion equalizing operation on the first even input signals to provide first equalized signals; a second chromatic dispersion equalizer 602(2) arranged to apply a chromatic dispersion equalizing operation on the first odd input signals to provide second equalized signals; a second field reconstructor 600(2) arranged to receive second input signals having dominant second polarity components and first polarity components; a second splitter 601(2) arranged to split the second input signals to provide second even signals and second odd signals; a third chromatic dispersion equalizer 602(3) arranged to apply a chromatic dispersion equalizing operation on the second even input signals to provide third equalized signals; a fourth chromatic dispersion equalizer 603(4) arranged to apply a chromatic dispersion equalizing operation on the second odd input signals to provide fourth equalized signals; a first polyphase demultiplexor 603(1) arranged to receive the first and third equalized signals and to output first polarity even signals and second polarity even signals; a second polyphase demultiplexor 603(2) arranged to receive the second and fourth equalized signals and to output first polarity odd signals and second polarity odd signals; a first multi-symbol-differential-detection module 604(1) arranged to receive the first polarity even signals and to output first carrier recovered signals; a second multi-symbol-differential-detection module 604(2) arranged to receive the second polarity even signals and to output second carrier recovered signals; a third multi-symbol-differential-detection module 604(3) arranged to receive the first polarity odd signals and to output third carrier recovered signals; a fourth multi-symbol-differential-detection module 604(4) arranged to receive the second polarity odd signals and to output fourth carrier recovered signals; a first parallel to serial unit 605(1) arranged co convert the first and third carrier recovered signals to a first sequence of output signals; and a second parallel to serial unit 605(2) arranged co convert the second and fourth carrier recovered signals to a first sequence of output signals.

Referring to FIG. 31 a receiver is provided and may include a receiver front end 524, a polyphase de-multiplexor 523 having multiple outputs; a polyphase multiplexor 522 having multiple inputs; and a plurality of multi-symbol-differential-detection (MSDD) modules 521 coupled between the multiple outputs of the polyphase de-multiplexor and the multiple inputs of the polyphase multiplexor. These MSDDs can be of any configuration—especially those illustrates in the specification.

FIG. 31 also illustrates a memory module (M*P symbols memory) 520 that is required for gathering the members of each polyphase group of signals—M symbols each.

There may be provided a receiver that includes a combination of a causal MSDD and a non-causal MSDD. The non-causal MSDD may receive an output signal of the causal MSDD and a delayed version (for example by L/2 cycles) of an input signal. The non-delayed version of the input signal may be provided to the causal MSDD.

The following reference numbers were used to illustrate the following elements. Any combination of any of these elements can be provided.

The elements are coupled to each others are illustrated in the drawings. If a component is repeated in a drawing (for example—delay units are repeated) then different instances of the component can be referred to as "first component", "second component" and the like. A delay unit may be represented by a box that includes a text of Z by the power of a variable (for example $Z^{-1}$, $Z^{-M}$), that variable may represent that amount of delay—number of descrete cycles of delay.

Figure 7:
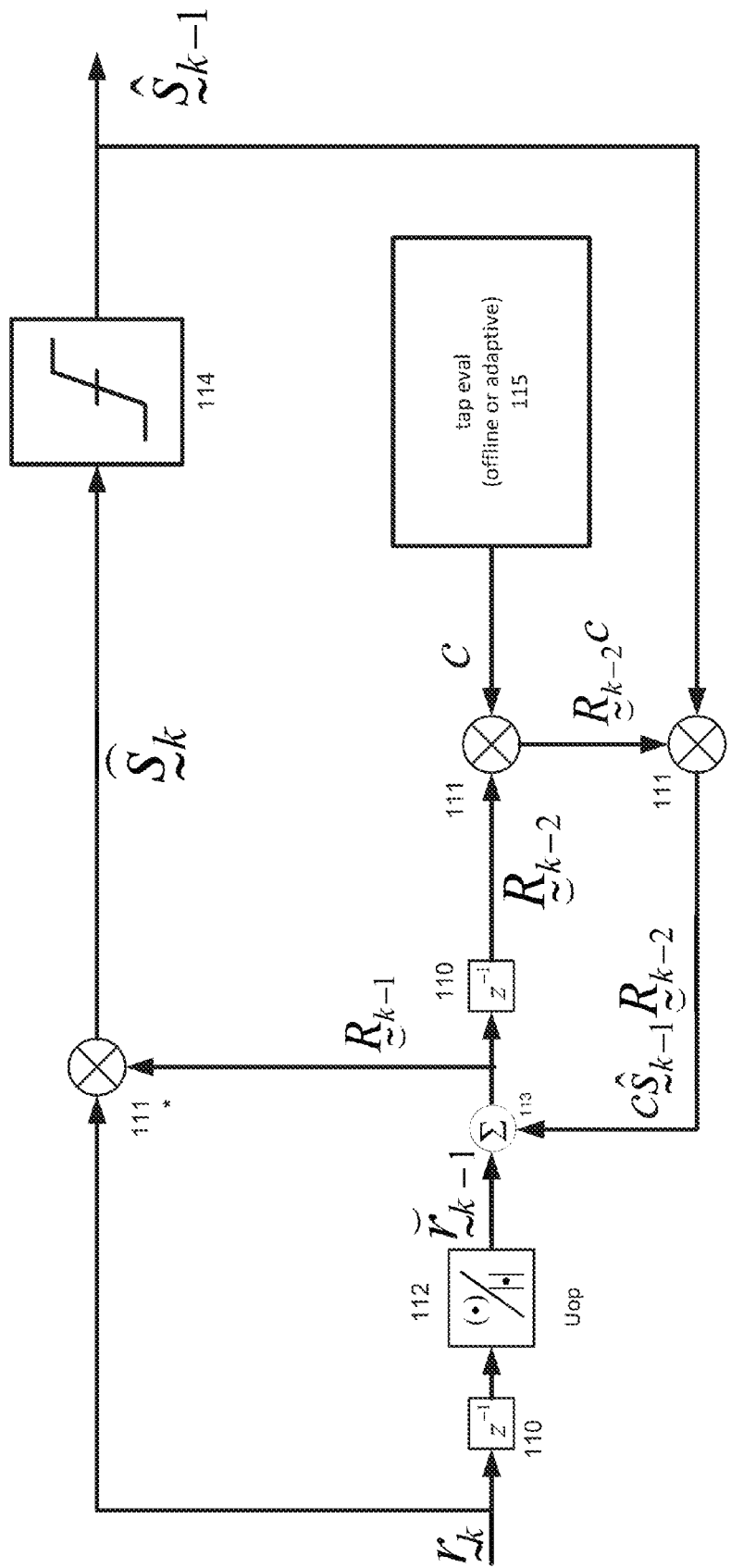

| FIG. 1 | 9 | Rotation and summation circuit |
| --- | --- | --- |
|  | 10 | Coherent front end |
|  | 11 | Polyphase demultiplexor |
|  | 12 | MSDD |
|  | 13 | Delay unit of rotation and summation circuit |
|  | 14 | Multiplier of rotation and summation circuit |
|  | 15 | First circuit of rotation and summation circuit |
|  | 16 | Second circuit of rotation and summation circuit |
|  | 18 | Multiplier |
|  | 19 | Phase difference calculator |
|  | 20 | Output circuit |
|  | 21 | Slicer |
|  | 22 | Delay unit of output circuit |
|  | 23 | Normalizer |
| FIG. 2 | 31 | Mapper of transmitter 30 |
|  | 33 | Delay and normalizer circuit of transmitter |
|  | 34 | Multiplier of transmitter |
|  | 36 | Delay unit of transmitter |
|  | 35 | Normalizer (unimodular) of transmitter |
|  | 37 | Coherent back-end |
|  | 40 | Coherent front end |
|  | 41 | Polyphase demultiplexor |
|  | 43 | MSDD having automatic gain control |
|  | 45 | Delay unit of rotation and summation circuit |
|  | 46 | Multiplier |
|  | 49 | First circuit of rotation and summation circuit |
|  | 50 | Second circuit of rotation and summation circuit |
|  | 46' | Phase difference calculator |
|  | 48 | Subtractor |
| FIG. 3 | 47 | Slicer |
|  | 45 | Delay unit of output circuit |
|  | 44 | Normalizer |
|  | 48' | Coefficient used to be multiplied by previous errors to assist in a coefficient divergence process |
|  | 51 | Mapper of transmitter 30 |
|  | 53' | Multiplier of transmitter and of MSDD |
|  | 54 | Delay unit of transmitter |
|  | 52 | Normalizer (unimodular) of transmitter |
|  | 50' | Coherent back-end |
|  | 57 | Coherent front end |
|  | 58 | Polyphase demultiplexer |
|  | 50" | MSDD having automatic gain control |
|  | 54 | Delay unit of rotation and summation circuit |
|  | 53 | Adder |
|  | 53' | Phase difference calculator |
|  | 55 | Subtractor |
|  | 56 | Slicer |
|  | 54 | Delay unit of output circuit |
|  | 52 | Normalizer |
|  | 48' | Coefficient used to be multiplied by previous errors to assist in a coefficient divergence process |
| FIG. 4 | 67 | Mapper of transmitter |
|  | 71 | Multiplication and delay module of transmitter |
|  | 63 | Coherent back-end |
|  | 66 | Coherent front end |
|  | 65 | Polyphase demultiplexor |
|  | 70 | First circuit of rotation and summation circuit |
|  | 61 | Normalizer |
|  | 60' | Phase difference calculator |
|  | 64 | Slicer |
|  | 64' | Delay unit of output circuit |
|  | 65" | MSDD that acts as a QAM differential precoder (DP) |
| FIG. 5 | 81 | Mapper of transmitter |
|  | 71 | Multiplication and delay module of transmitter |
|  | 82 | Coherent back-end |
|  | 86 | Coherent front end |
|  | 87 | Polyphase demultiplexor |
|  | 70 | First circuit of rotation and summation circuit |
|  | 83 | Normalizer |
|  | 85' | Phase difference calculator |
|  | 84 | Slicer |
|  | 84" | Delay unit of output circuit |
|  | 70' | MSDD that acts as a QAM differential precoder (DP) |
| FIG. 6 | 90 | Coherent front end |
|  | 91 | Adc |
|  | 92 | RX DSP front end |
|  | 93 | Local oscillator laser |
|  | 94 | MSDD CPE |
|  | 95 | Multiplier |
|  | 96 | Delay unit |
|  | 97 | Adder of k point moving average circuit 102 |
|  | 96 | Delay unit of k point moving average circuit 102 |
|  | 99 | First loop filter |
|  | 100 | DAC |
|  | 101 | Second loop filter |
|  | 102 | k point moving average circuit 102 |
|  | 103 | Down sampler |
|  | 104 | Angle extractor circuit |
|  | 90(1) | Angle rotator |
|  | 90(2) | ADC |
| FIG. 7 | 110 | Delay unit |
|  | 112 | Normalizer |
|  | 113 | Adder |
|  | 114 | Slicer |
|  | 115 | Tap evaluation circuit 115 |
| FIG. 8 | 120 | Splitter |
|  | 121 | In phase DI circuits |
|  | 122 | Quadrate DI circuits |
|  | 123 | Balanced receiver module |

Figure 10:
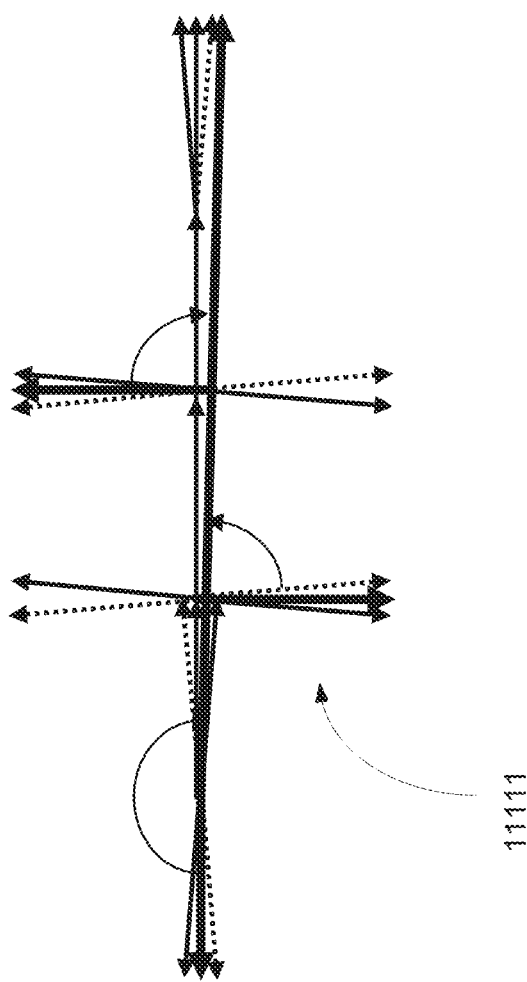

|  |  |  |
|---|---|---|
| | 124 | Equalizer and analog to digital converter |
| | 125(1) | IQ rebalance |
| | 125(2) | IQ rebalance |
| | 126(1) | Field reconstructor |
| | 126(2) | Field reconstructor |
| | 127 | Equalizer |
| | 128(1) | Carrier recovery |
| | 128(2) | Carrier recovery |
| | 129 | Demapper |
| | 130 | Local oscillator |
| | 131 | In phase hybrid DI circuits |
| | 132 | Quadrate hybrid DI circuits |
| FIG. 9 | 140 | Transmitter |
| | 141 | Front end |
| | 142 | Clean up of ISI (inter signal interference) module |
| | 143 | MSDD (acting as currier recovery module) |
| | 145 | Slicer |
| | 146 | Decision unit (Mean least square error or other soft decisions scheme) |
| FIG. 10 | 11111 | Phasors to be rotated and added to each other |
| FIG. 11 | 22222 | Curves representing relationship between bit error rate and signal to noise ratio |
| FIG. 12 | 72 | First circuit of rotation and summation circuit |
| | 152 | Coherent front end |
| | 153 | Polyphase demultiplexor |
| | 155" | MSDD |
| | 156 | Delay unit of rotation and summation circuit |
| | 154 | Multiplier of rotation and summation circuit |
| | 72 | intermediate signals |
| | 155(1) | Coefficient calculator (adaptive circuit) |
| | 155(2) | A single coefficient branch of the coefficient calculator (includes delay unit, adder and multipliers) |
| | 154' | Phase difference calculator |
| | 155 | Output circuit |
| | 156 | Slicer |
| | 156' | Delay unit of output circuit |
| | 155 | Normalizer |
| | 150 | Mapper of transmitter |
| | 73 | Multiplication and delay module of transmitter |
| | 151 | Back-end |
| FIG. 13 | 161 | Delay unit |
| | 160 | Multiplier |
| | 163 | Adder |
| | 162 | Splicer |
| | 160' | Phase difference calculator |
| FIG. 14 | 172' | Switch (for training or non-training selection) |
| | 173 | Splicer |
| | 174 | Coefficient calculator (such as Wiener calculator, LMS adaptive calculator) |
| | 172 | Adder |
| | 171 | Multiplier |
| | 170 | Delay unit |
| FIG. 15 | 181' | Delay unit of field reconstructor |
| | 183 | Multiplier |
| | 184 | Adder |
| FIGS. 16 and 17 | 212 | Coherent front end |
| | 213 | Polyphase demultiplexor |
| | 222(1) | MSDD of FIG. 16 |
| | 232(1) | MSDD of FIG. 17 |
| | 210 | Delay unit of rotation and summation circuit |
| | 215 | Multiplier of rotation and summation circuit |
| | 222(2) | Coefficient calculator (adaptive circuit) |
| | 222(3) | A single coefficient branch of the coefficient calculator (includes delay unit, adder and multipliers) |
| | 213' | Phase difference calculator |
| | 220 | Slicer |
| | 220' | Delay unit of output circuit |
| | 217 | Normalizer |
| | 214 | Mapper of transmitter |
| | 73 | Multiplication and delay module of transmitter |
| | 211 | Back-end |

Figure 18:
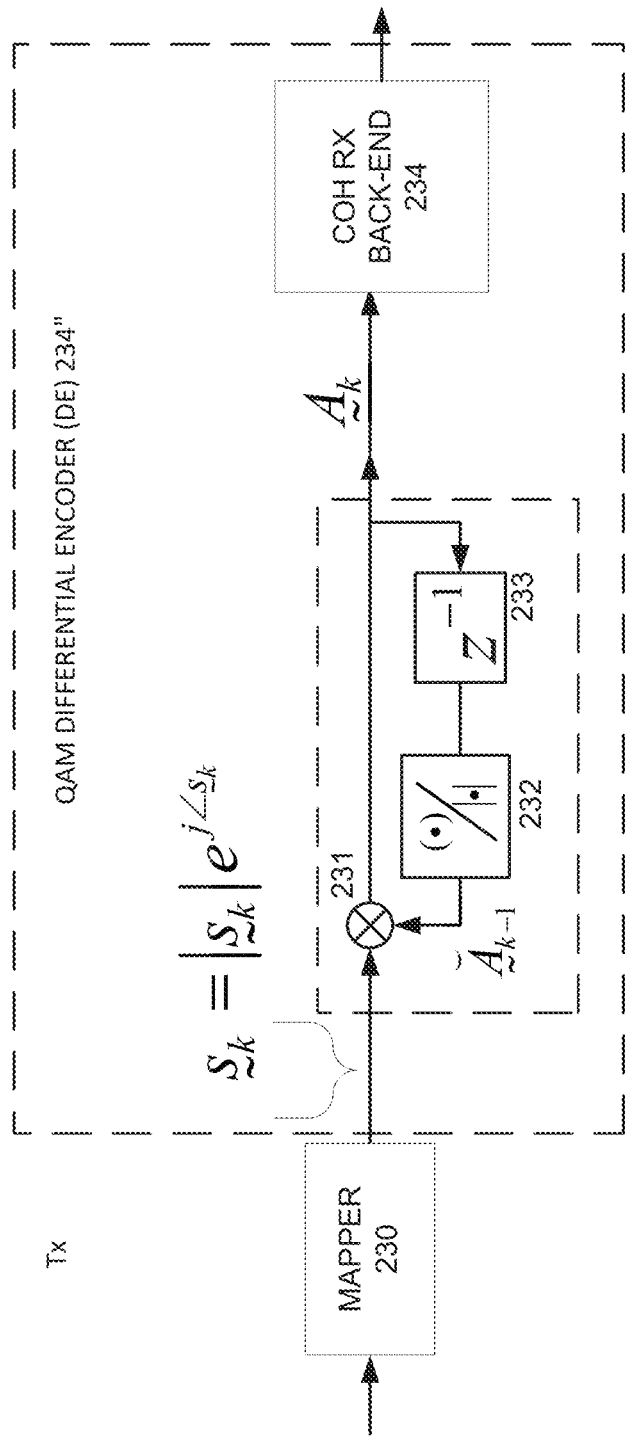
Figure 22:
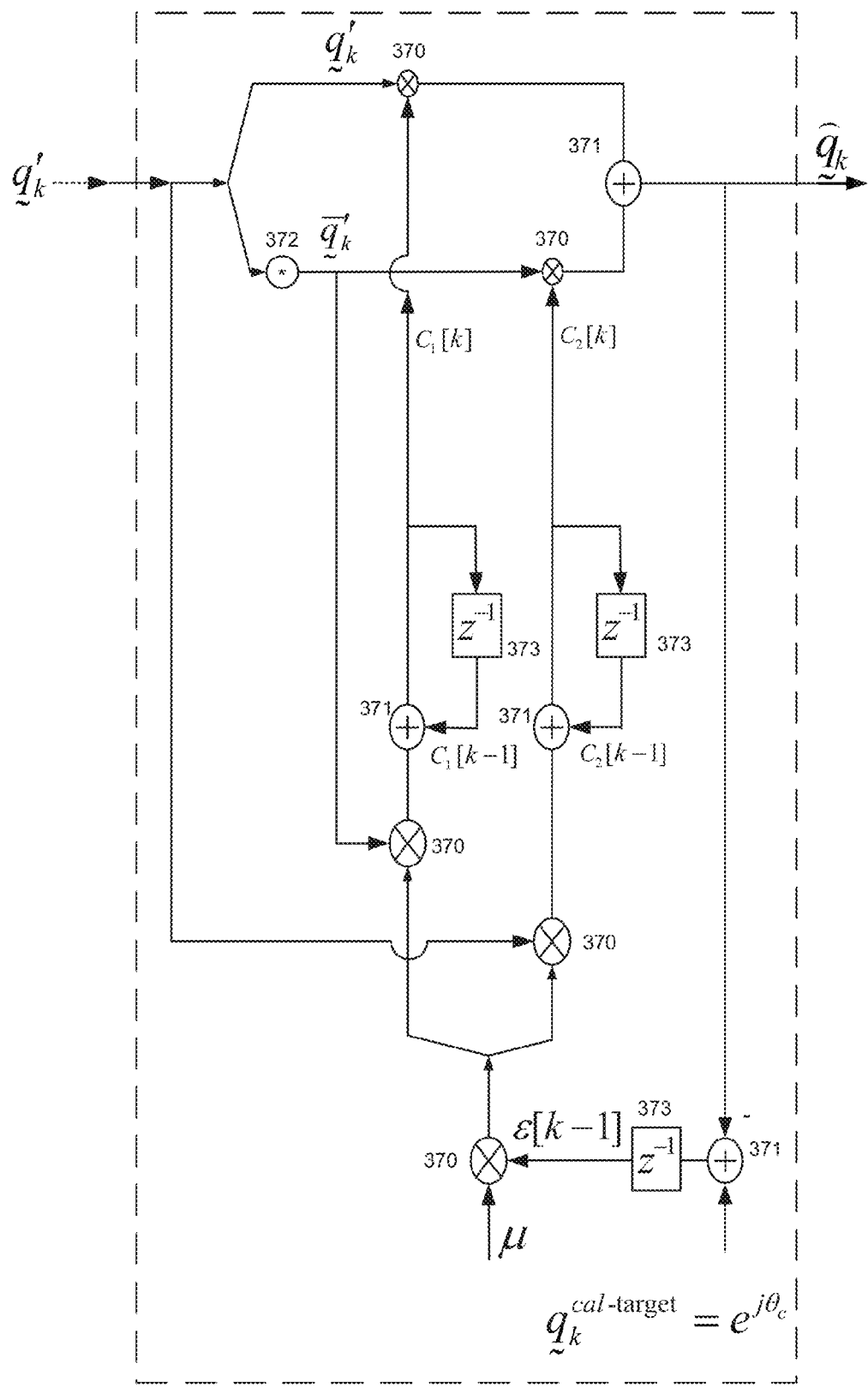
Figure 27:
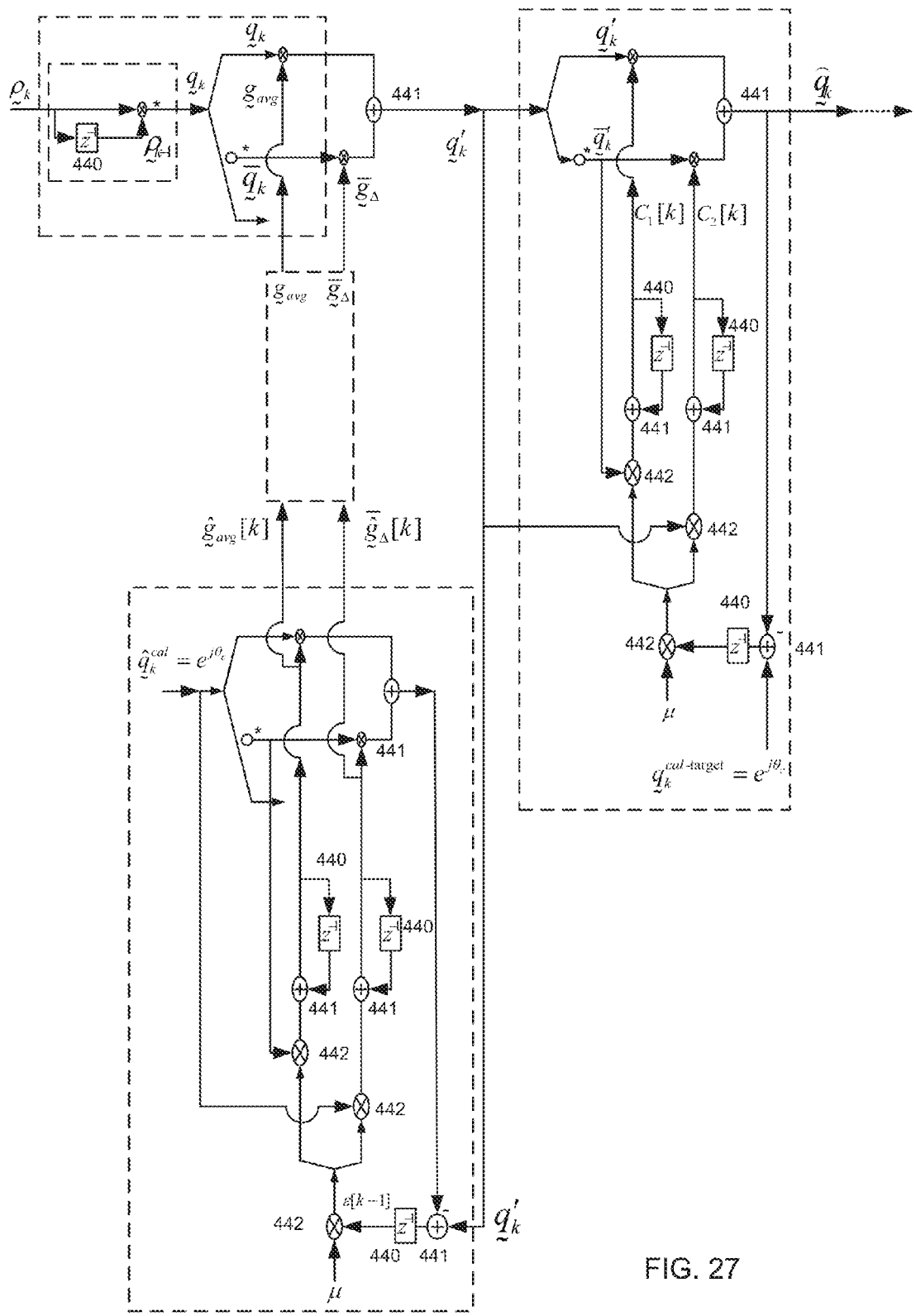
Figure 28:
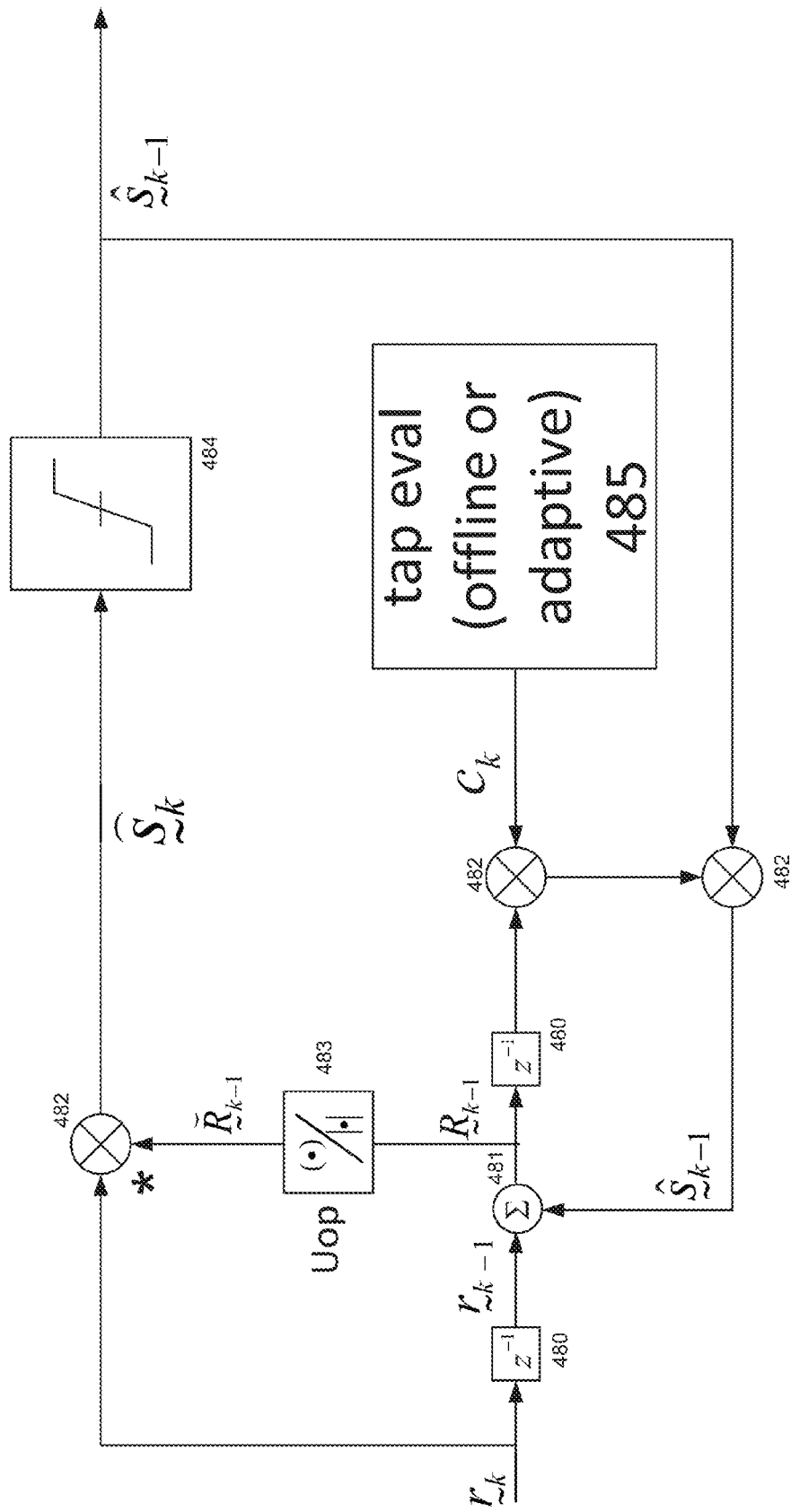

|  |  |  |
|---|---|---|
| | 218 | Inverter (calculates a reciprocal of a complex value) |
| FIG. 18 | 234' | QAM differential encoder of transmitter |
| | 230 | Mapper of transmitter |
| | 231 | Multiplier |
| | 232 | Normalizer |
| | 233 | Delay uni |
| | 234 | Back-end |
| FIG. 19 | 245' | Switch (for training or non-training selection) |
| | 245 | Splicer |
| | 244 | Coefficient calculator (such as Wiener calculator, LMS adaptive calculator) |
| | 243 | Adder |
| | 242 | Multiplier |
| | 240 | Delay unit |
| | 246 | MSDD polyphase sub-module (p'th) |
| FIG. 20 | 250 | Zeroth MSDD polyphase sub-module |
| | 251 | First MSDD polyphase sub |
| | 252 | P'th MSDD polyphase sub |
| FIG. 21 | 280 | Multiplier (demodulator) |
| | 282 | VTO |
| | 283 | Loop filter |
| | 284 | Decision aided phase detector (DA-PD) 284 |
| | 281 | Splicer |
| FIG. 22 | 373 | Delay unit |
| | 370 | Multiplier |
| | 371 | adder |
| FIG. 23 | 380 | Quadrate DI circuit |
| | 381 | In phase DI circuit |
| | 382 | Balanced receiver module |
| | 383 | ADC and equalizer |
| | 384 | IQ rebalance |
| | 385 | Even/odd gain recal |
| | 386 | Divider |
| | 386' | Switch |
| | 387 | Delay unit |
| | 387' | Field reconstructor |
| FIG. 24 | 390 | Quadrate DI circuit |
| | 391 | In phase DI circuit |
| | 392 | Balanced receiver module |
| | 394 | ADC and equalizer |
| | 395 | IQ rebalance |
| | 399 | Conjure circuit |
| | 397 | Divider |
| | 398 | Switch |
| | 396 | Delay unit |
| | 395" | Field reconstructor |
| FIG. 25 | 402 | Delay unit |
| | 404 | Divider |
| | 403 | Conjure circuit |
| | 406 | Multiplier |
| | 406' | switch |
| FIG. 26 | 410 | Down-sampler |
| | 411 | Divider |
| | 412 | Delay unit |
| | 413 | Multiplier |
| | 414 | Adder |
| FIG. 27 | 440 | Delay unit |
| | 442 | Multiplier |
| | 441 | Adder |
| FIG. 28 | 482 | Multiplier |
| | 483 | Normalizer |
| | 480 | Delay unit |
| | 481 | Adder |
| | 484 | Slicer |
| | 285 | Tap evaluation unit |
| FIG. 29 | 505 | Serial buffer |
| | 501 | normalizer |
| | 504 | Multiplier and adder circuit |
| | 503 | Serial buffer for storing reference signals |
| | 503 | Serial buffer |
| | 500" | Multiplier |
| | 500' | splicer |
| | 506 | Casual MSDD |
| | 507 | Delay unit |
| | 508 | Non-casual MSDD (embodiments illustrated in FIGS. 40 and 41) |

-continued

Figure 36:
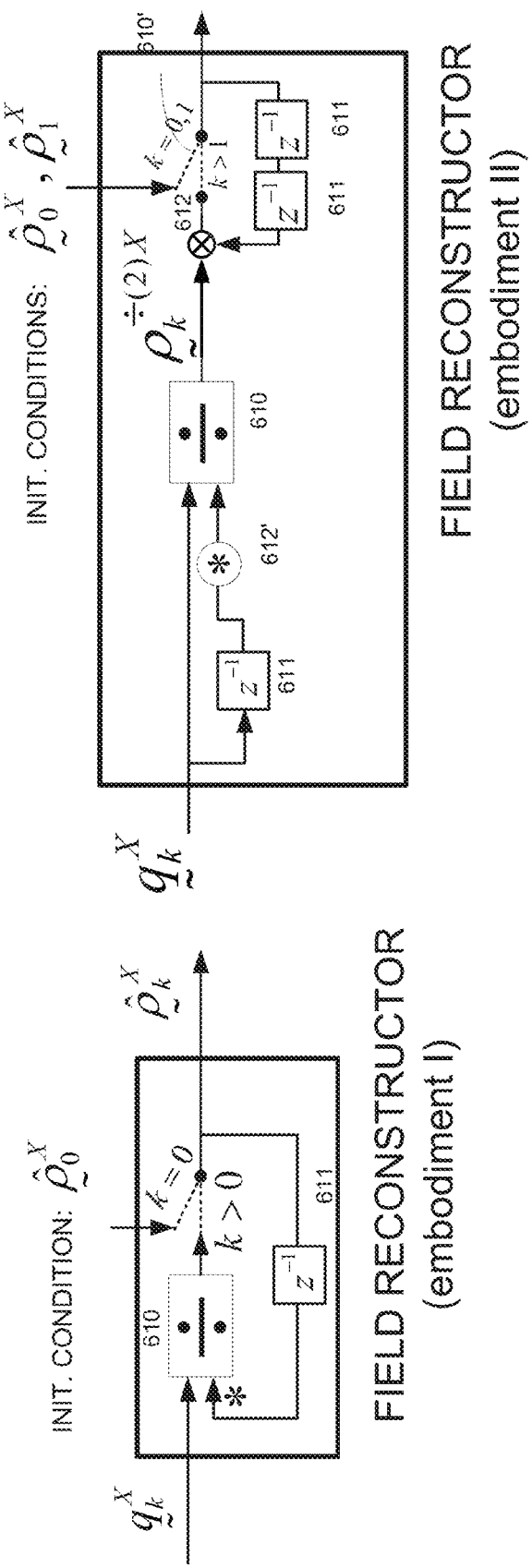
Figure 40:
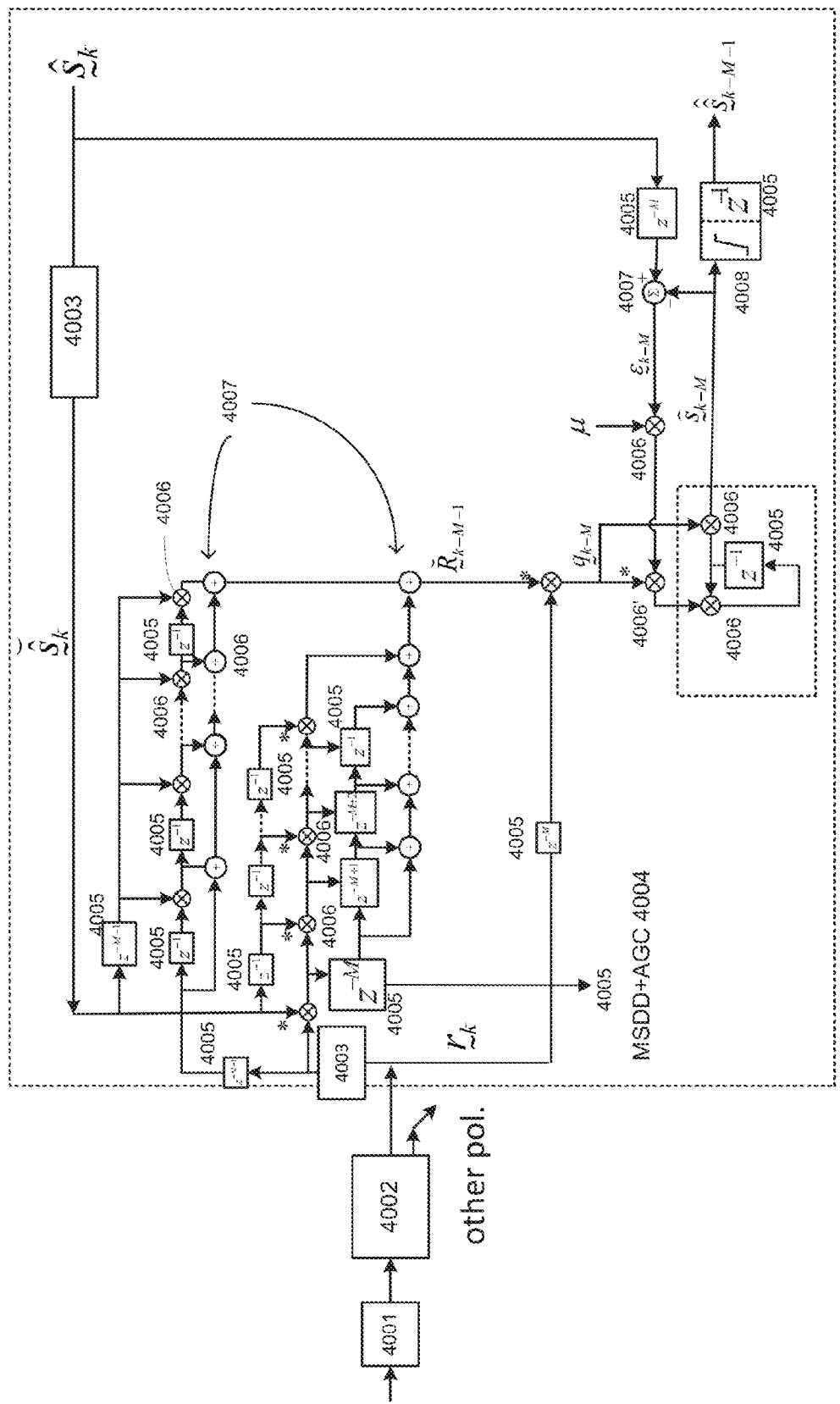
Figure 41:
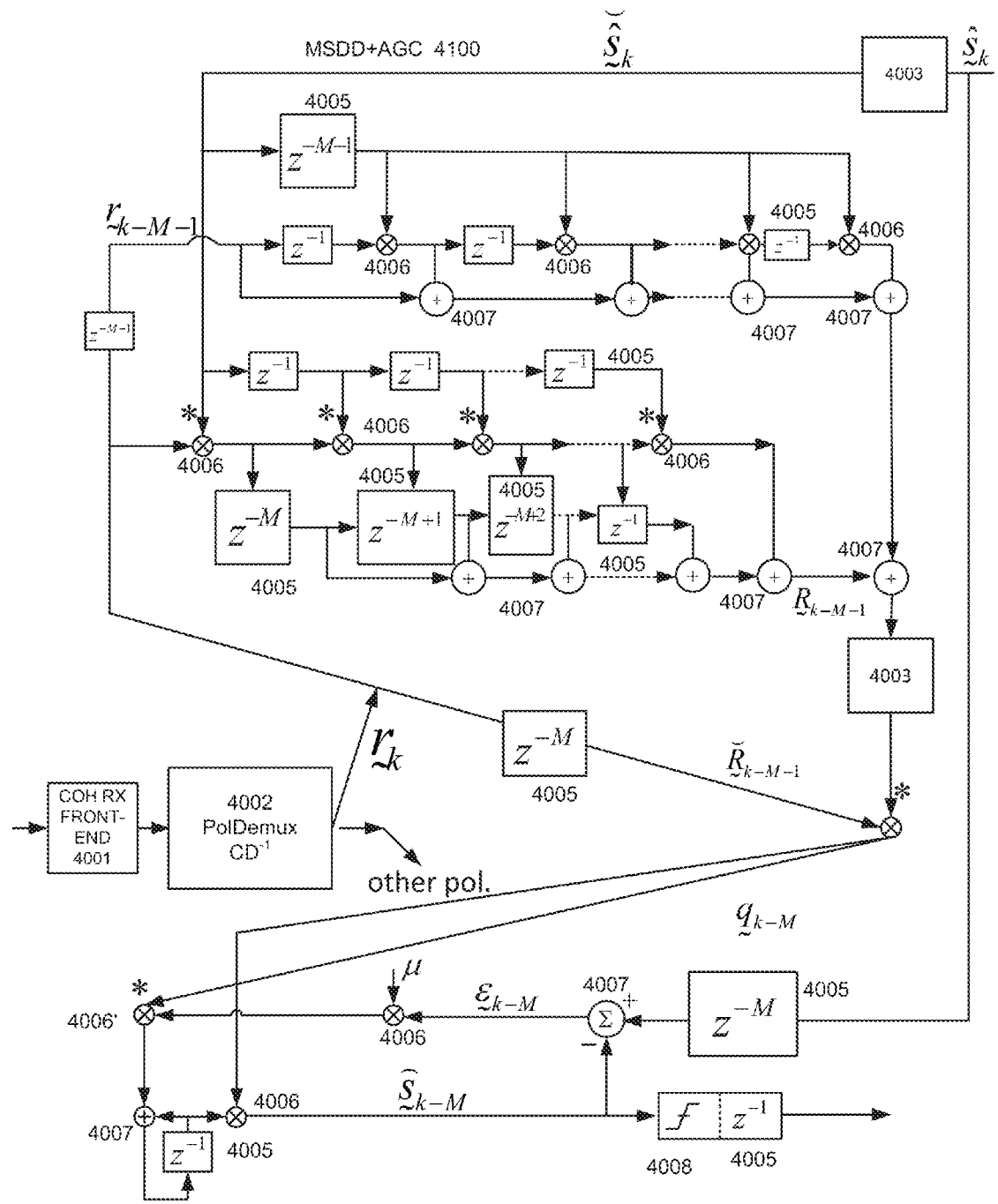

| | | |
|---|---|---|
| FIG. 30 | 517 | Input port |
| | 513 | Symbols memory (includes serial to parallel converter and parallel to serial converter) |
| | 512 | Differential precoder |
| | 517 | Parallel to serial converter |
| | 514 | Coherent receiver back-end |
| FIG. 31 | 524 | Coherent receiver front end |
| | 523 | Equalizer |
| | 520 | Symbol memory |
| | 521 | MSDD |
| | 522 | Parallel to serial converter |
| FIG. 32 | 530 | mapper |
| | 531 | DP |
| | 532 | Serial to parallel converter |
| | 533 | DET |
| | 534 | IFFT |
| | 535 | Parallel to serial converter |
| | 536 | Transmitter front end |
| | 537 | Receiver front end |
| | 538 | FFT |
| | 539 | IDFT |
| | 540 | MSDD |
| | 541 | Splicer |
| FIG. 33 | 570 | mapper |
| | 571 | DP |
| | 572 | Serial to parallel converter |
| | 573 | DET |
| | 574 | IFFT |
| | 575 | Parallel to serial converter |
| | 576 | Transmitter front end |
| | 577 | Receiver front end |
| | 578 | FFT |
| | 579 | IDFT |
| | 580 | MSDD |
| | 581 | Splicer |
| FIG. 34 | 582 | Mapper |
| | 583 | Serial to parallel converter |
| | 584 | DP |
| | 585 | Parallel to serial converter |
| | 586 | Modulator |
| | 587 | Combiner |
| | 588 | Splitter (polyphase) |
| | 589 | In phase DI |
| | 590 | Quadrate DI |
| | 591 | Balanced receiver module |
| | 592 | ADC and equalizer |
| | 593 | IQ rebalance |
| | 594 | Self coherent DSP |
| FIG. 35 | 600(1) | Field reconstructor |
| | 600(2) | Field reconstructor |
| | 601(1) | Serial to parallel converter |
| | 601(2) | Serial to parallel converter |
| | 602(1) | Equalizer |
| | 602(2) | Equalizer |
| | 602(3) | Equalizer |
| | 602(4) | Equalizer |
| | 603(1) | Polyphase demultiplexor 2 × 2 MIMO |
| | 603(2) | Polyphase demultiplexor 2 × 2 MIMO |
| | 604 | Carrier recovery |
| | 604(1) | MSDD |
| | 604(2) | MSDD |
| | 604(3) | MSDD |
| | 604(4) | MSDD |
| | 605(1) | Parallel to serial converter |
| | 605(2) | Parallel to serial converter |
| FIG. 36 | 610 | Divider |
| | 611 | Delay unit |
| | 612' | Conjure circuitry |
| | 612' | multiplier |
| | 610' | Switch |
| FIG. 37 | 620 | Splitter |
| | 622 | In phase DI circuits |
| | 621 | Quadrate DI circuits |
| | 623 | Balanced receiver module |
| | 624 | Equalizer and analog to digital converter |
| | 625 | IQ rebalance |
| | 626 | Digital band limited filter |
| | 627 | Field reconstructor |
| | 629 | Down sampler |
| | 628 | 2 oversampled coherent DSP back-end |
| FIG. 38 | 630 | Equalizer (chromatic dispersion) |
| | 631 | Polyphase demultiplexor 2 × 2 MIMO |
| | 632 | MSDD |
| | 632' | Carrier recovery |
| FIG. 39 | 640 | Splitter (polyphase splitter) |
| | 641 | DI with T/4 delay (IQ delay interferometer) |
| | 642 | IQ imbalance compensator |
| | 643 | I and Q ADC |
| | 644 | Digital band limited filter |
| | 645 | Field reconstructor |
| | 646 | Down sampler |
| | 647 | 2 oversampled coherent DSP back-end |
| | 640 | Splitter (polyphase splitter) |
| FIGS. 40 and 41 | 4001 | Front end |
| | 4002 | Polyphase demultiplexor |
| | 4003 | Normalizer (uninormal) |
| | 4004 | Non-casual MSDD having AGC capabilities (FIG. 40) |
| | 4005 | Delay unit |
| | 4006 | Multiplier |
| | 4006' | Phase difference calculator |
| | 4007 | Adder |
| | 4008 | Splicer |
| | 4100 | Non-casual MSDD having AGC capabilities (FIG. 41) |

The invention may also be implemented in a computer program for running on a computer system, at least including code portions for performing steps of a method according to the invention when run on a programmable apparatus, such as a computer system or enabling a programmable apparatus to perform functions of a device or system according to the invention.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A multi-symbol-differential-detection module, comprising:
   an input node for receiving an input signal having a noisy phase;
   a summation and rotation unit; and
   an output unit;
   wherein the output unit is arranged to output an output signal and a normalized output signal; wherein the output signal represents the input signal but has a reconstructed phase;
   wherein the summation and rotation unit is arranged to receive the input signal and the output signal and to provide a reference signal that reflects a weighted sum of phase rotated and delayed previously received input signals;
   wherein the output unit comprises a phase difference calculator, a slicer, a delay unit and a normalizer;
   wherein the phase difference calculator is arranged to generate a difference signal indicative of a phase difference between the reference signal and the input signal;
   wherein the slicer and the delay unit are arranged to generate the output signal by slicing the difference signal to provide a sliced signal and by delaying the sliced signal; and
   wherein the normalizer is arranged to normalize the output signal to provide the normalized output signal.

2. The multi-symbol-differential-detection module according to claim 1, wherein the summation and rotation unit is arranged to phase rotate each delayed previously received input signal by a multiplication with a corresponding delayed normalized output signal.

3. The multi-symbol-differential-detection module according to claim 1, wherein the summation and rotation unit is arranged to multiply each phase rotated and delayed previously received input signal by a coefficient out of multiple coefficients to provide multiple intermediate signals and to sum the multiple intermediate signals to provide the reference signal.

4. The multi-symbol-differential-detection module according to claim 3, comprising a coefficients calculator arranged to calculate the multiple coefficients in an adaptive manner.

5. The multi-symbol-differential-detection module according to claim 4, wherein the coefficient calculator is arranged to calculate the multiple coefficients such as to optimize a phase estimation point of work of the multi-symbol-differential-detection module.

6. The multi-symbol-differential-detection module according to claim 4, wherein the coefficients calculator is arranged to calculate the multiple coefficients according to a least mean square error algorithm that is responsive to the difference signal.

7. The multi-symbol-differential-detection module according to claim 4, wherein the coefficients calculator is arranged to calculate the multiple coefficients during a training period during which a training sequence is injected to either one of the coefficient calculator or to the input node.

8. The multi-symbol-differential-detection module according to claim 4, wherein the coefficient calculator is arranged to calculate each one of the coefficients.

9. The multi-symbol-differential-detection module according to claim 4, wherein the coefficient calculator is arranged to calculate coefficients so that during at least one point in time one coefficient differs from another coefficient.

10. The multi-symbol-differential-detection module according to claim 3, wherein the summation and rotation unit comprises a normalizer that differs from the normalizer of the output unit and is arranged to normalize the input signal before providing the input signal to a sequence of delay units of the summation and rotation unit.

11. The multi-symbol-differential-detection module according to claim 10, wherein the summation and rotation unit is arranged to normalize the multiple intermediate signals to provide the reference signal.

12. The multi-symbol-differential-detection module according to claim 3, wherein the summation and rotation unit is arranged to normalize the multiple intermediate signals to provide the reference signal.

13. The multi-symbol-differential-detection module according to claim 1, wherein the summation and rotation unit is arranged to multiply each phase rotated and delayed previously received input signal by a coefficient to provide multiple intermediate signals, wherein all phase rotated and delayed previously received input signals are multiplied by the coefficient.

14. The multi-symbol-differential-detection module according to claim 13, wherein the coefficient is fixed.

15. The multi-symbol-differential-detection module according to claim 13, wherein all multipliers of the summation and rotation unit are less complex than a complex multiplier of the phase difference calculator.

16. The multi-symbol-differential-detection module according to claim 13, wherein the summation and rotation units is free of normalizers.

17. The multi-symbol-differential-detection module according to claim 13, wherein the summation and rotation unit comprises a normalizer that differs from the normalizer of the output unit and arranged to normalize each input signal received by the summation and rotation unit.

18. The multi-symbol-differential-detection module according to claim 13, comprising a coefficient calculator arranged to calculate the coefficient in an adaptive manner.

19. The multi-symbol-differential-detection module according to claim 18, wherein the coefficients calculator is arranged to calculate the coefficient according to a least mean square error algorithm that is responsive to the difference signal.

20. The multi-symbol-differential-detection module according to claim 18, wherein the coefficients calculator is arranged to calculate the coefficient during a training period during which a training sequence is injected to either one of the coefficient calculator or to the input node.

* * * * *